US012553914B2

(12) United States Patent
Hayama et al.

(10) Patent No.: US 12,553,914 B2
(45) Date of Patent: Feb. 17, 2026

(54) CONTAINER TRANSFER METHOD AND CONTAINER TRANSFER APPARATUS WITH CLOSEABLE HOLDER

(71) Applicant: Sysmex Corporation, Kobe (JP)

(72) Inventors: Hidetaka Hayama, Kobe (JP); Yuichiro Ohmae, Kobe (JP); Yuji Wakamiya, Kobe (JP); Tomohiro Kuroiwa, Kobe (JP)

(73) Assignee: Sysmex Corporation, Kobe (JP)

( * ) Notice: Subject to any disclaimer, the term of this patent is extended or adjusted under 35 U.S.C. 154(b) by 443 days.

(21) Appl. No.: 18/151,295

(22) Filed: Jan. 6, 2023

(65) Prior Publication Data

US 2023/0228781 A1 Jul. 20, 2023

(30) Foreign Application Priority Data

Jan. 14, 2022 (JP) ................ 2022-004693
Jan. 14, 2022 (JP) ................ 2022-004694
Jan. 14, 2022 (JP) ................ 2022-004695

(51) Int. Cl.
*G01N 35/04* (2006.01)
*G01N 1/28* (2006.01)
(Continued)

(52) U.S. Cl.
CPC .......... *G01N 35/04* (2013.01); *G01N 1/2813* (2013.01); *G01N 35/0092* (2013.01);
(Continued)

(58) Field of Classification Search
CPC .. B01L 2200/18; B01L 2300/021; B01L 9/06; B25J 15/0028; B25J 15/02–0293;
(Continued)

(56) References Cited

U.S. PATENT DOCUMENTS

2009/0325274 A1* 12/2009 Hamada ............... G01N 35/026
422/65
2010/0028214 A1* 2/2010 Howard ................... G01N 1/42
414/322
(Continued)

FOREIGN PATENT DOCUMENTS

CN 215401296 U 1/2022
JP H10-132828 A 5/1998
(Continued)

OTHER PUBLICATIONS

Extended European search report ("EESR") issued on Jun. 15, 2023 in a related European patent application No. 23150652.8.
(Continued)

*Primary Examiner* — David L Singer
(74) *Attorney, Agent, or Firm* — Crowell & Moring LLP

(57) ABSTRACT

A container transfer method for transferring a container from a container holder capable of holding a plurality of containers, by using a holding section capable of performing an opening/closing operation, vertical movement, and horizontal movement. The method includes: moving the holding section downward to a position lower than a head portion of the container, at a position where the container is not held in a plan view; horizontally moving the holding section in an opened state, toward a target container on the container holder; after the horizontal movement of the holding section to the target container, closing the holding section with respect to the target container; and moving upward the holding section in a closed state.

24 Claims, 38 Drawing Sheets

(51) Int. Cl.
  *G01N 35/00* (2006.01)
  *G01N 35/02* (2006.01)
  *G01N 35/10* (2006.01)

(52) U.S. Cl.
  CPC ........... *G01N 35/026* (2013.01); *G01N 35/10* (2013.01); *G01N 2035/00752* (2013.01); *G01N 2035/041* (2013.01); *G01N 2035/0412* (2013.01); *G01N 2035/0424* (2013.01); *G01N 2035/0465* (2013.01); *G01N 2035/1051* (2013.01)

(58) Field of Classification Search
  CPC .................. B25J 15/103; B25J 9/1612; B25J 9/1664–1666; B65B 5/105; G01N 1/2813; G01N 2035/00752; G01N 2035/0406; G01N 2035/041; G01N 2035/0412; G01N 2035/0413; G01N 2035/0415; G01N 2035/0465; G01N 2035/1051; G01N 35/0092; G01N 35/0099; G01N 35/026; G01N 35/04; G01N 35/10
  See application file for complete search history.

(56) References Cited

U.S. PATENT DOCUMENTS

| | | | |
|---|---|---|---|
| 2012/0301358 A1 | 11/2012 | Haechler | |
| 2013/0149079 A1* | 6/2013 | Ohiso | G01N 35/04 414/618 |
| 2013/0197690 A1* | 8/2013 | Suzuki | G01N 35/0092 700/216 |
| 2014/0037517 A1* | 2/2014 | Takai | B65G 65/00 209/552 |
| 2014/0212248 A1* | 7/2014 | Takai | G01N 35/04 414/281 |
| 2015/0093290 A1* | 4/2015 | Takai | G01N 35/04 422/65 |
| 2016/0244269 A1* | 8/2016 | Akutsu | G01N 35/0092 |
| 2017/0030940 A1* | 2/2017 | Nakamura | G01N 35/00584 |
| 2019/0329983 A1 | 10/2019 | Itoh | |
| 2020/0025781 A1* | 1/2020 | Umeki | G01N 35/0099 |
| 2020/0256883 A1 | 8/2020 | Sugiyama et al. | |
| 2021/0061584 A1* | 3/2021 | Silbert | G01N 35/04 |
| 2022/0349910 A1* | 11/2022 | Silbert | B01L 3/5453 |

FOREIGN PATENT DOCUMENTS

| | | |
|---|---|---|
| JP | 2000-088860 A | 3/2000 |
| JP | 2002-357612 A | 12/2002 |
| JP | 2003-066050 A | 3/2003 |
| JP | 3470048 B2 | 11/2003 |
| JP | 2004-061169 A | 2/2004 |
| JP | 2004-077395 A | 3/2004 |
| JP | 2006-038881 A | 2/2006 |
| JP | 2008-076185 A | 4/2008 |
| JP | 2009-186201 A | 8/2009 |
| JP | 4733315 B2 | 7/2011 |
| JP | 2012-093313 A | 5/2012 |
| JP | 2013-140141 A | 7/2013 |
| JP | 2014-029275 A | 2/2014 |
| JP | 2014-062760 A | 4/2014 |
| JP | 2014-149162 A | 8/2014 |
| JP | 2014-167458 A | 9/2014 |
| JP | 2015-068727 A | 4/2015 |
| JP | WO2013/099538 A1 | 4/2015 |
| JP | 2015-087306 A | 5/2015 |
| JP | 5715378 B2 | 5/2015 |
| JP | 2017-515100 A | 6/2017 |
| JP | 6166001 B2 | 7/2017 |
| JP | 6189697 B2 | 8/2017 |
| JP | 6266614 B2 | 1/2018 |
| JP | 2019-520586 A | 7/2019 |
| JP | 6580130 B2 | 9/2019 |
| JP | 2019-174397 A | 10/2019 |
| JP | 2020-128913 A | 8/2020 |
| JP | 6764343 B2 | 9/2020 |
| JP | WO2019/138700 A1 | 1/2021 |
| JP | 6827099 B2 | 2/2021 |
| WO | 2011/040203 A1 | 4/2011 |
| WO | 2012/043261 A1 | 4/2012 |
| WO | 2014/042011 A1 | 3/2014 |
| WO | 2014/196342 A1 | 12/2014 |
| WO | 2015/149055 A2 | 10/2015 |
| WO | 2016/174949 A1 | 11/2016 |
| WO | 2018/013345 A1 | 1/2018 |

OTHER PUBLICATIONS

Extended European search report ("EESR") issued on Jun. 9, 2023 in a related European patent application No. 23150663.5.
Japanese Office Action ("JPOA") issued on Jul. 18, 2023 in a counterpart Japanese patent application No. 2022-004695.
Japanese Office Action ("JPOA") issued on Feb. 7, 2023 in a counterpart Japanese patent application No. 2022-004694.
Japanese Office Action ("JPOA") issued on Feb. 7, 2023 in a counterpart Japanese patent application No. 2022-004695.

* cited by examiner

FIG. 3   27d - reader; 28 - reader

FIG. 7   71d - reader; 73 - reader; 402 - sensor; 412-416 - sensor; 422 - sensor;
         432-438 - sensor; 452 - sensor; 462 - sensor

FIRST TIER

FIG. 8  471 - sensor; 72 - ascending/descending mechanism

FIG. 20
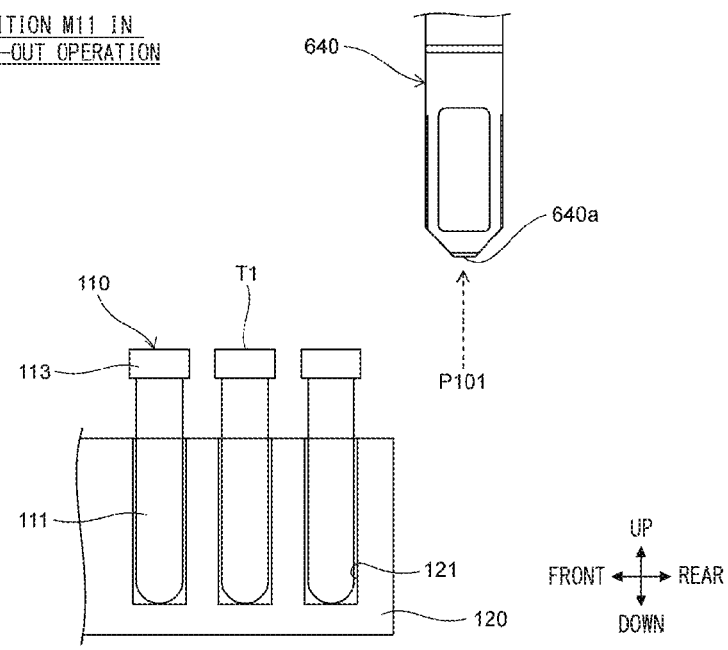
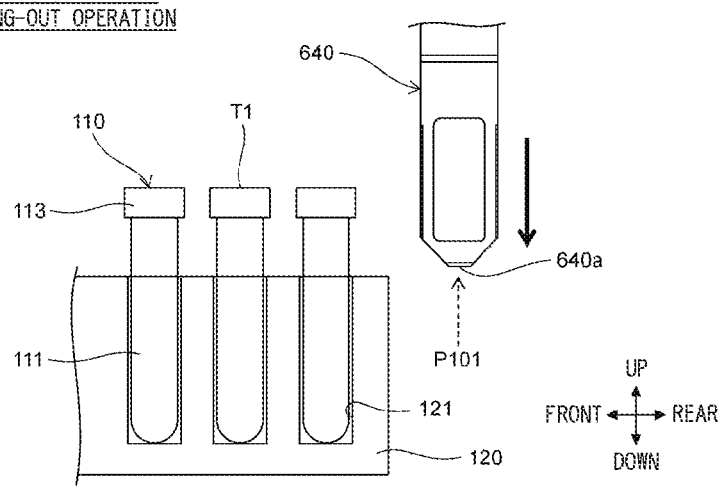

FIG. 21
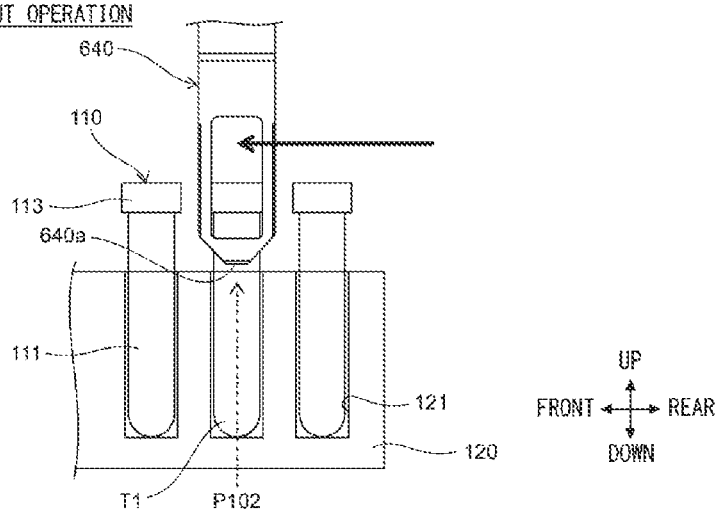
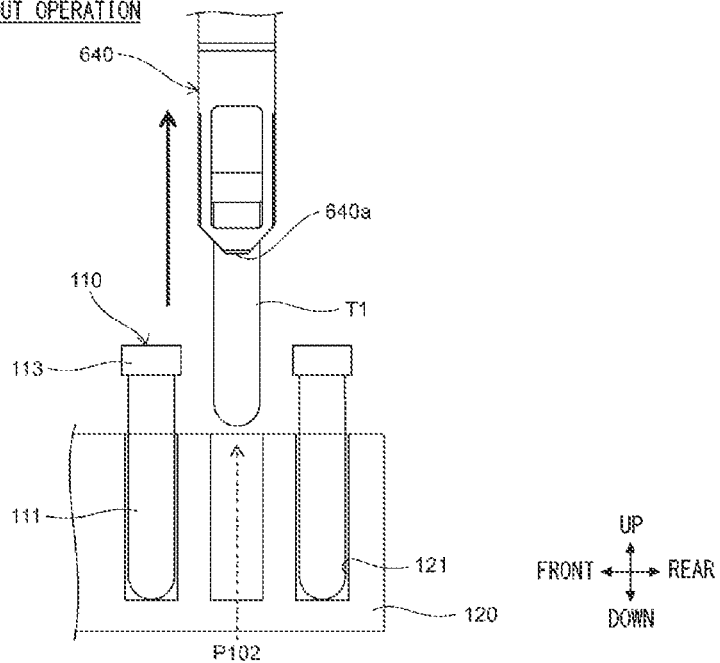

FIG. 25
POSITION M21 IN STORAGE OPERATION
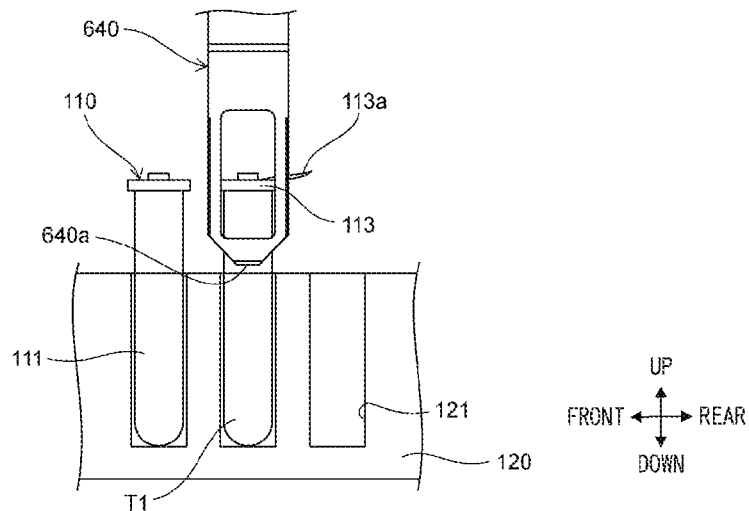
POSITION M22 IN STORAGE OPERATION
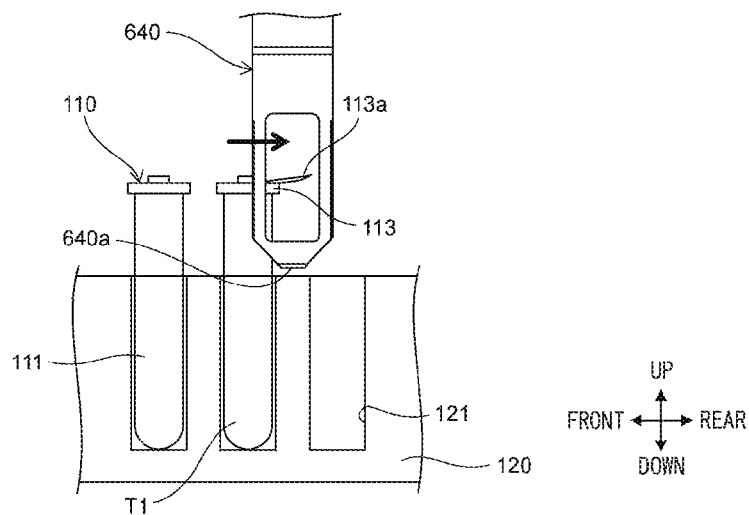

FIG. 26
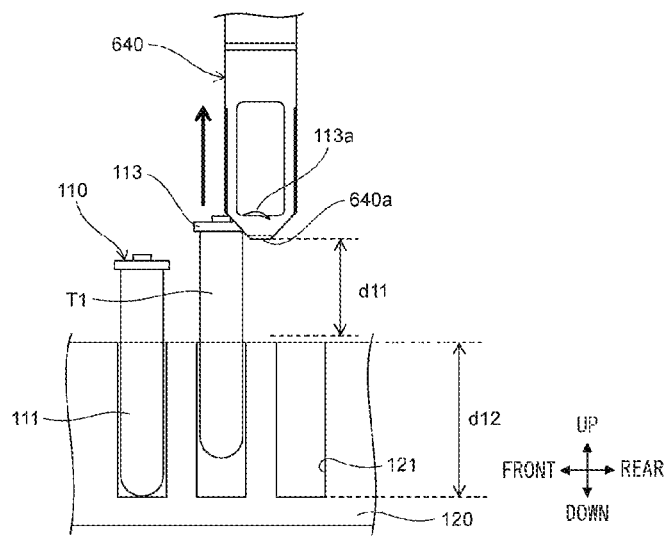
POSITION M23 IN STORAGE OPERATION
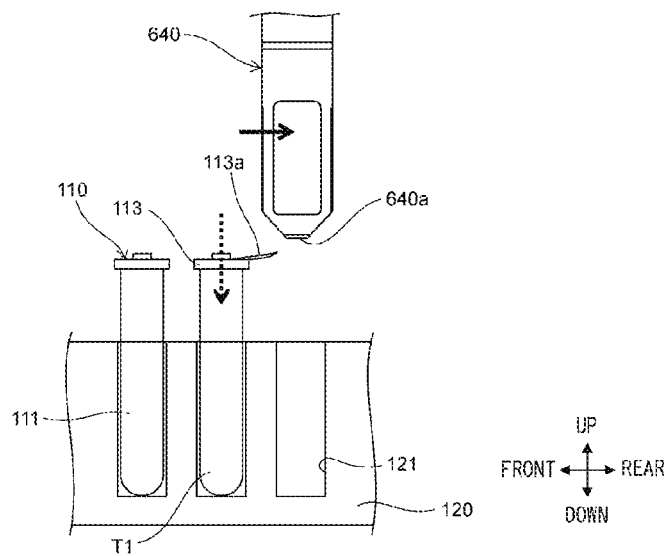
POSITION M24 IN STORAGE OPERATION FIG. 27
POSITION M25 IN STORAGE OPERATION
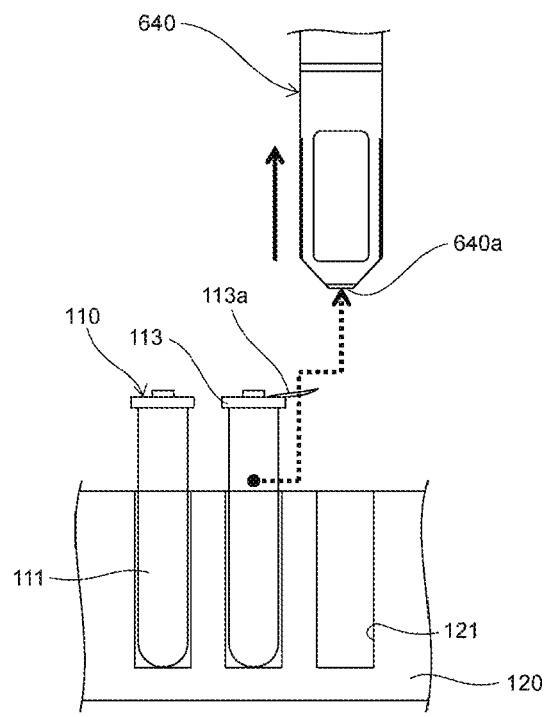
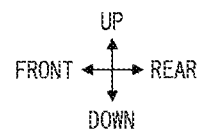

FIG. 36
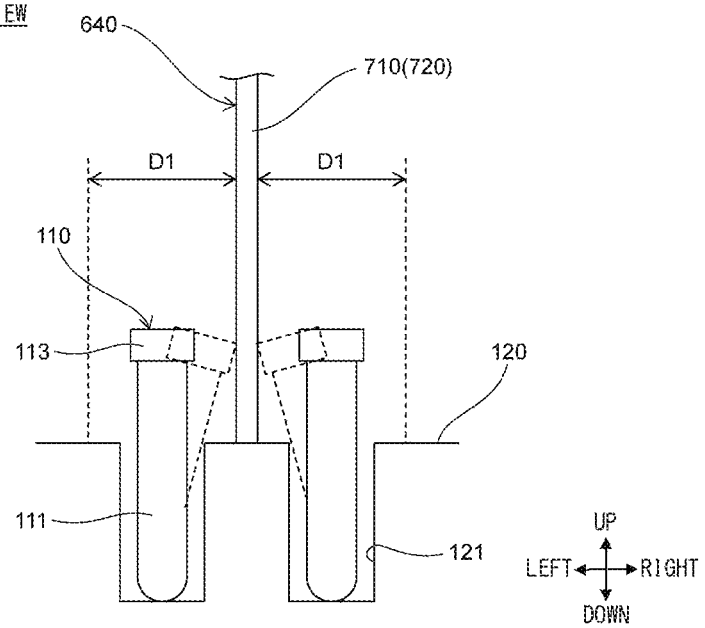
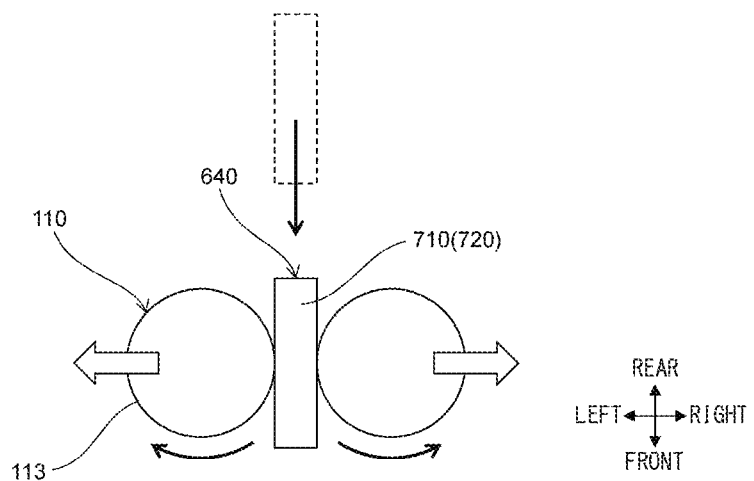

CONTAINER TRANSFER METHOD AND CONTAINER TRANSFER APPARATUS WITH CLOSEABLE HOLDER

RELATED APPLICATIONS

This application claims priority from prior Japanese Patent Application No. 2022-004695, filed on Jan. 14, 2022, to Japanese Patent Application No. 2022-004694, filed on Jan. 14, 2022, and Japanese Patent Application No. 2022-004693, filed on Jan. 14, 2022, the entire contents of which are incorporated herein by reference.

BACKGROUND OF THE INVENTION

1. Field of the Invention

The present invention relates to a container transfer method and a container transfer apparatus.

2. Description of the Related Art

For example, a specimen transfer apparatus disclosed in Japanese Laid-Open Patent Publication No. 2015-087306 has been known as an apparatus for arranging and holding specimen containers in a plurality of arrays. This specimen transfer apparatus is connected to a measurement unit for measuring a specimen contained in each specimen container, via a transportation unit. The specimen transfer apparatus includes a buffer rack for temporarily storing specimen containers therein. The specimen transfer apparatus stores specimen containers taken out from a specimen rack for transportation, into the buffer rack, and stores the specimen containers stored in the buffer rack, into the specimen rack, thereby rearranging the specimens.

The specimen transfer apparatus disclosed in Japanese Laid-Open Patent Publication No. 2015-087306, when taking out a specimen container stored in a rack, positions a holding section in an opened state, at a position directly above a target container to be transferred. From the position, the specimen transfer apparatus moves the holding section downward, closes the holding section to make the holding section hold the target container, and moves the holding section upward. Then, the specimen transfer apparatus transfers the holding section to another place, moves the holding section downward, causes the holding section to release the container, and moves the holding section upward.

In order to effectively utilize a limited space of a laboratory, miniaturization of apparatuses related to specimen testing has been desired. For miniaturization of a specimen transfer apparatus, the distance between specimen containers held in racks in the apparatus needs to be reduced. However, in the method disclosed in Japanese Laid-Open Patent Publication No. 2015-087306 in which the holding section in the opened state is moved downward and inserted between two adjacent specimen containers, in order to realize a stable operation without collision of the holding section with containers, there is a limit to reduction in the distance between specimen containers.

SUMMARY OF THE INVENTION

The scope of the present invention is defined solely by the appended claims, and is not affected to any degree by the statements within this summary.

A container transfer method according to the present invention relates to a container transfer method for transferring a container (110, T1) from a container holder (22, 24, 25, 100, 120, 130) capable of holding a plurality of containers (110), by using a holding section (640) capable of performing an opening/closing operation, vertical movement, and horizontal movement. The method includes: moving the holding section (640) downward to a position lower than a head portion (113) of the container (110, T1), at a position where the container (110, T1) is not held in a plan view (S11); horizontally moving the holding section (640) in an opened state, toward a target container (110, T1) on the container holder (22, 24, 25, 100, 120, 130) (S12); after the horizontal movement of the holding section (640) to the target container (110, T1), closing the holding section (640) with respect to the target container (110, T1) (S13); and moving upward the holding section (640) in a closed state (S14).

A container transfer method according to the present invention relates to a container transfer method for transferring a container (110, T1) to a holding position on a container holder (22, 24, 25, 100, 120, 130) capable of holding a plurality of containers (110), by using a holding section (640) capable of performing an opening/closing operation, vertical movement, and horizontal movement. The method includes: moving downward the holding section (640) that holds a target container (110, T1), toward the holding position on the container holder (22, 24, 25, 100, 120, 130) at which the target container (110, T1) is to be stored (S21); opening the holding section (640) (S22); horizontally moving the holding section (640) in an opened state toward a position where the container (110) is not held (S23); and moving the holding section (640) upward (S24).

A container transfer apparatus (20, 40, 70) according to the present invention relates to a container transfer apparatus configured to transfer a container (110, T1) from a container holder (22, 24, 25, 100, 120, 130) capable of holding a plurality of containers (110). The container transfer apparatus (20, 40, 70) includes: a holding section (640) that is openable and closable; a movement mechanism (610, 620, 630) configured to vertically and horizontally move the holding section (640); and a controller (801, 811, 821) configured to control operations of the holding section (640) and the movement mechanism (610, 620, 630). The controller (801, 811, 821) controls the holding section (640) and the movement mechanism (610, 620, 630) to: move the holding section (640) downward to a position in which the container (110, T1) is not held in a plan view and which is lower than a head portion (113) of the container (110, T1); horizontally move the holding section (640) in an opened state toward a target container (110, T1) on the container holder (22, 24, 25, 100, 120, 130); close the holding section (640) with respect to the target container (110, T1) after the horizontal movement of the holding section (640) to the target container (110, T1); and move upward the holding section (640) in a closed state.

BRIEF DESCRIPTION OF THE DRAWINGS

FIG. 20 is a side view schematically showing the example in which the holding section is moved downward to the position outside the rack in a plan view, according to the embodiment;

FIG. 21 is a side view schematically showing the example in which the holding section is moved downward to the position outside the rack in a plan view, according to the embodiment;

FIG. 25 is a side view schematically showing an example in which the holding section is moved upward in a stepwise manner at the time of storage, according to the embodiment;

FIG. 26 is a side view schematically showing the example in which the holding section is moved upward in a stepwise manner at the time of storage, according to the embodiment;

FIG. 27 is a side view schematically showing the example in which the holding section is moved upward in a stepwise manner at the time of storage, according to the embodiment;

FIG. 36 shows a side view and a plan view illustrating the effects of the embodiment in more detail;

DETAILED DESCRIPTION OF THE PREFERRED EMBODIMENTS

Figure 1:
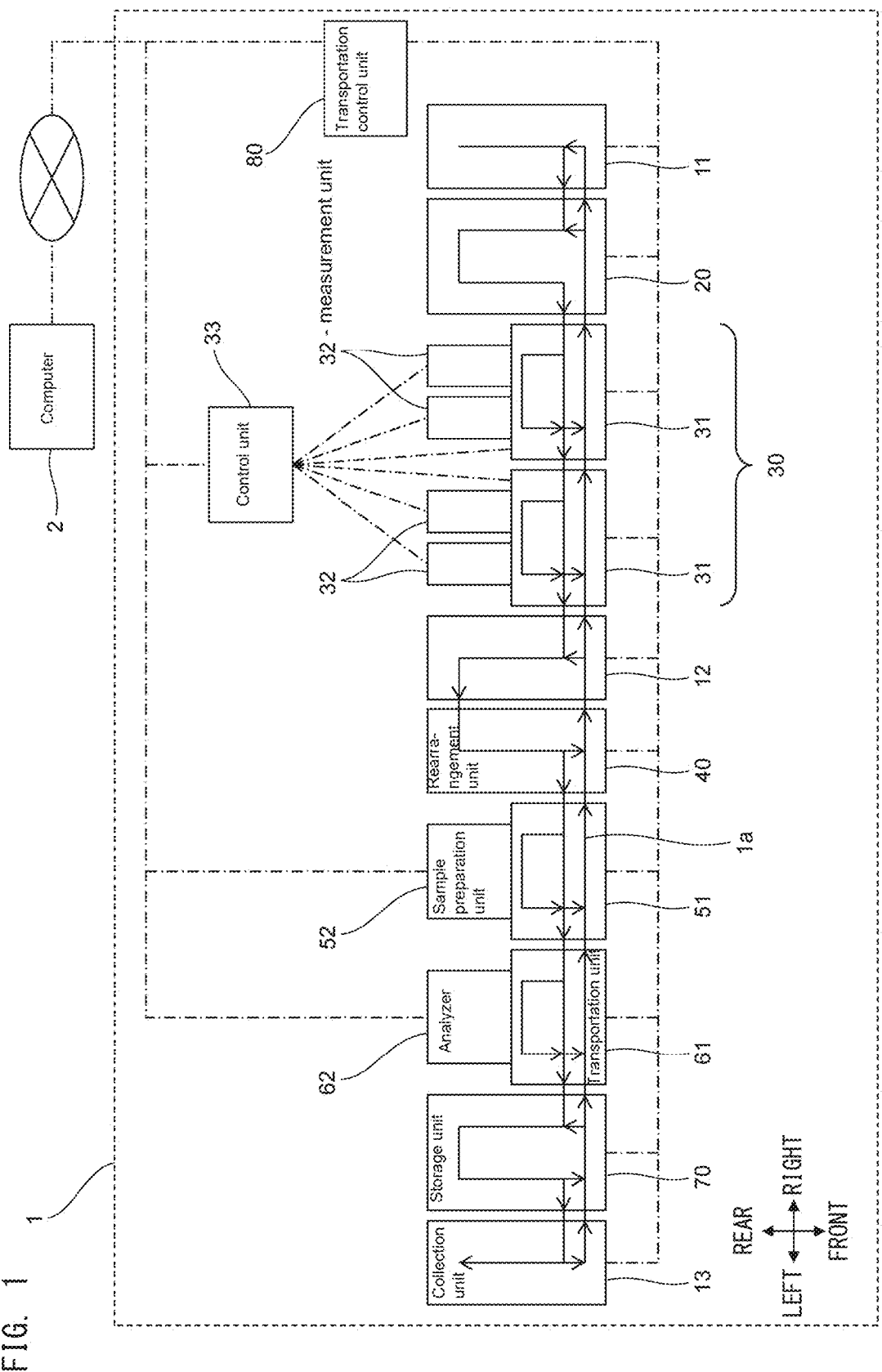
FIG. 1 schematically illustrates a configuration of a specimen testing system according to an embodiment.

FIG. 1 schematically illustrates a configuration of a specimen testing system 1.

FIG. 1 illustrates the configuration of the specimen testing system 1 in a planar view, and indicates the front, the rear, the left, and the right directions in the planar view. The left direction represents the downstream-side direction and the succeeding-side direction, and the right direction represents the upstream-side direction and the preceding-side direction. An operator accesses the specimen testing system 1 from the front side of the specimen testing system 1. The front side of the specimen testing system 1 corresponds to the side in front of the operator.

The specimen testing system 1 includes a feeding unit 11, a transportation unit 12, a collection unit 13, a supply unit 20, a blood cell counting unit 30 for counting blood cells contained in a specimen, a specimen rearrangement unit 40, a transportation unit 51, a smear sample preparation unit 52, a transportation unit 61, an analyzer 62 for measuring measurement items such as CRP, HbA1c, and ESR, a specimen storage unit 70, and a transportation control unit 80. In the blood cell counting unit 30, one transportation unit 31 and two measurement units 32 form one set, and the blood cell counting unit 30 includes one control unit 33, and two sets each including the one transportation unit 31 and the two measurement units 32.

The control unit 33 is connected to the transportation units 31, the measurement units 32, and a host computer 2 so as to be able to communicate therewith. The smear sample preparation unit 52 is connected to the transportation unit 51 and the host computer 2 so as to be able to communicate therewith. The analyzer 62 is connected to the transportation unit 61 and the host computer 2 so as to be able to communicate therewith. The transportation control unit 80 is connected to the feeding unit 11, the transportation unit 12, the collection unit 13, the supply unit 20, the transportation units 31, the specimen rearrangement unit 40, the transportation units 51, 61, the specimen storage unit 70, and the host computer 2 so as to be able to communicate therewith. In FIG. 1, a communication cable for allowing communication among the units is indicated by an alternate long and short dash line.

The specimen testing system 1 automatically measures a specimen, and performs analysis based on measurement data. A specimen is, for example, whole blood collected from a subject. A container 110 (see FIG. 2) containing the specimen is transported in a state where the container 110 is held in a rack 100, the specimen is suctioned from the container 110 by the measurement unit 32, the smear sample preparation unit 52, and the analyzer 62, and the specimen is, for example, measured. The transportation control unit 80 controls each of the units connected to the transportation control unit 80 so as to transport the rack 100 to a target unit.

Figure 2:
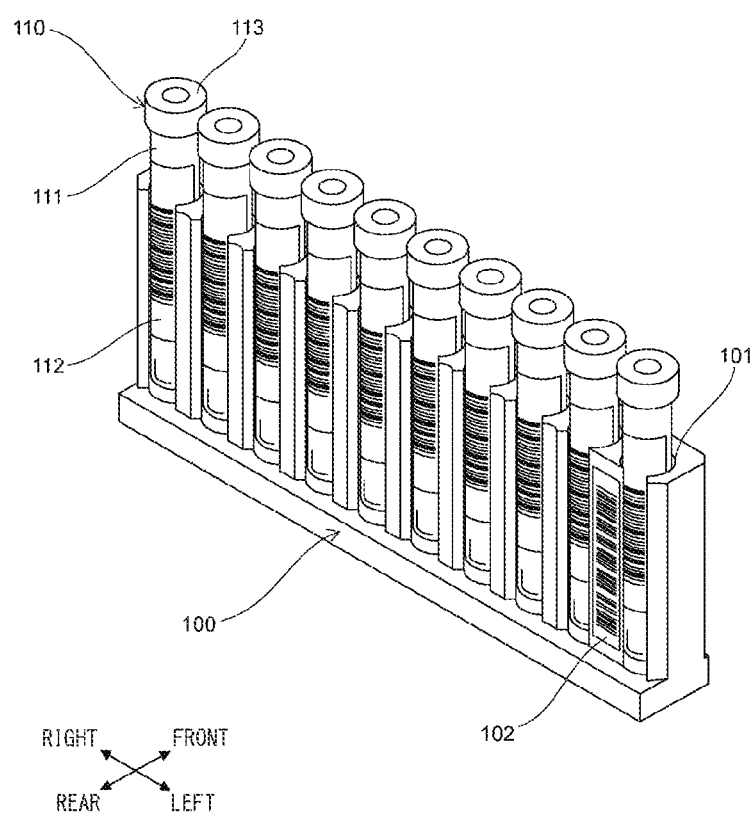
FIG. 2 is a perspective view of structures of a rack and a container according to the embodiment.

FIG. 2 is a perspective view of structures of the rack 100 and the container 110.

The rack 100 has ten holes 101 in which the containers 110 can be held, and a bar code label 102. The bar code label 102 is adhered to a surface on the rear side of the rack 100. On the bar code label 102, a bar code indicating a rack ID is printed as identification information that allows individual identification of the rack 100.

The container 110 incudes a trunk portion 111, a bar code label 112, and a lid portion 113. The trunk portion 111 is formed as a tubular container having an opened upper end, and stores a specimen therein. The bar code label 112 is adhered to the side surface of the trunk portion 111. On the bar code label 112, a bar code indicating a specimen ID is printed as identification information that allows individual identification of the contained specimen. The lid portion 113 is disposed at the upper end of the trunk portion 111 so as to seal the inside of the trunk portion 111. The lid portion 113 is configured to allow piercers disposed at the measurement units 32, the smear sample preparation unit 52, and the analyzer 62 to penetrate therethrough in the up-down direction.

With reference to FIG. 1, in the specimen testing system 1, the feeding unit 11, the supply unit 20, the two transportation units 31, the transportation unit 12, the specimen rearrangement unit 40, the transportation unit 51, the transportation unit 61, the specimen storage unit 70, and the collection unit 13 are aligned in line toward the left direction in order, respectively, so as to be adjacent to each other. The rack 100 is transported mutually between the two adjacent units.

Each of the feeding unit 11, the supply unit 20, the transportation units 31, the transportation unit 12, the specimen rearrangement unit 40, the transportation units 51, 61, the specimen storage unit 70, and the collection unit 13 has a rack transportation path 1a for transporting the rack 100.

The rack transportation path 1a is indicated by an arrow in FIG. 1, and the direction of the arrow indicates a direction in which the rack 100 can be transported in the rack transportation path 1a. The rack transportation paths 1a of the units are connected to each other at the front position of each unit. The rack transportation path 1a is formed of, for example, a conveyor belt that moves in the left-right direction, and a plate member having the upper surface parallel to the horizontal plane.

In the configuration illustrated in FIG. 1, an operator sets, in the rack 100, the containers 110 each of which contains a specimen to be tested, and sets the rack 100 in the feeding unit 11. Thus, the rack 100 is transported along the rack transportation path 1a, and the specimen is suctioned by a target unit according to a test item set for the specimen, thereby testing the specimen. When all of the necessary tests have ended, the rack 100 is collected by the collection unit 13.

With reference to FIG. 1, transportation of the rack 100 from the feeding unit 11 to the collection unit 13 will be described.

The feeding unit 11 carries out the rack 100 put by the operator to the supply unit 20.

The supply unit 20 reads the rack ID and the specimen IDs for the rack 100 carried in from the feeding unit 11, and carries out the rack 100 to the transportation unit 31 disposed adjacently on the left side. The supply unit 20 holds containers 110 containing a quality control specimen, and containers 110 containing a washing liquid. The quality control specimen is a specimen that contains a known component at a known concentration, and is used for controlling measurement accuracy of a specimen collected from a subject. Hereinafter, when simply referred to as a "specimen", this specimen indicates a specimen collected from a subject. The washing liquid is used for washing predetermined parts of the respective units. On the bar code label 102 of each container 110 containing the quality control specimen, a bar code indicating an ID that allows identification of the quality control specimen is printed. Also, on the bar code label 112 of each container 110 containing the washing liquid, a bar code indicating an ID that allows identification of the washing liquid is printed. The IDs of the quality control specimen and the washing liquid are read out similarly to the specimen IDs.

The supply unit 20 carries out the rack 100 holding the specimen containers 110, the rack 100 holding the quality control specimen containers 110, and the rack 100 holding the washing liquid containers 110 to the transportation unit 31 disposed adjacently on the left side.

The transportation unit 31 transports each rack 100 carried in from the unit that is disposed adjacently on the right side, to the front of the measurement unit 32. The measurement unit 32 suctions the specimen and the quality control specimen from the containers 110 held in the transported racks 100, and counts blood cell particles included in the specimen and the quality control specimen. The control unit 33 analyzes the specimen and the quality control specimen based on the measurement data obtained by each of the measurement units 32. The measurement unit 32 also suctions the washing liquid from the container 110 held in the transported rack 100, and washes the inside thereof.

As for the rack 100 holding the containers 110 containing the specimens, when necessary measurements in the measurement units 32 have been done, this rack 100 is carried out to the unit disposed adjacently on the left side. Meanwhile, as for the rack 100 holding the containers 110 containing the quality control specimen or the washing liquid, when necessary processes in the measurement units 32 have been done, this rack 100 is transported rightward and stored in the supply unit 20.

The transportation unit 12 transports rearward the rack 100 carried in from the transportation unit 31 that is disposed adjacently on the right side, and carries out the rack 100 to the specimen rearrangement unit 40 at a rear position.

In the specimen rearrangement unit 40, the container 110 to be processed by the succeeding specimen processing unit, that is, the smear sample preparation unit 52 and/or the analyzer 62, is transferred from the rack 100 carried in from the transportation unit 12, to an empty rack 100 held in the specimen rearrangement unit 40. The specimen rearrangement unit 40 transports forward the rack 100 that holds the transferred containers 110, and carries out the rack 100 to the transportation unit 51 disposed adjacently on the left side, at a front position. The specimen rearrangement unit 40 transports forward the rack 100 holding the containers 110 that are not required to be processed by the succeeding specimen processing unit and have not been transferred to the rack 100, and carries out the rack 100 to the transportation unit 51 disposed adjacently on the left side, at the front position. The rack 100 that has become empty by transfer of all of the containers 110 is held in the specimen rearrangement unit 40.

The transportation unit 51 transports the rack 100 holding the containers 110 to be processed by the smear sample preparation unit 52, among the racks 100 carried in from the specimen rearrangement unit 40 that is disposed adjacently on the right side, to the front of the smear sample preparation unit 52. The smear sample preparation unit 52 suctions a specimen from the container 110 held in the transported rack 100, and prepares a smear sample. The transportation unit 51 carries out the rack 100 that has been processed by the smear sample preparation unit 52 to the transportation unit 61 disposed adjacently on the left side. The transportation unit 51 does not transport the rack 100 that holds only the containers 110 for which smear samples are not required to be prepared by the smear sample preparation unit 52, to the front of the smear sample preparation unit 52, and carries out the rack 100 to the transportation unit 61 disposed adjacently on the left side.

The transportation unit 61 transports the rack 100 holding the containers 110 to be processed by the analyzer 62, among the racks 100 carried in from the transportation unit 51 that is disposed adjacently on the right side, to the front of the analyzer 62. The analyzer 62 is, for example, a unit capable of measuring measurement items such as CRP, HbA1c, and ESR. The analyzer 62 suctions a specimen from the container 110 held in the transported rack 100, and analyzes the specimen. The transportation unit 61 carries out the rack 100 that has been processed by the analyzer 62 to the specimen storage unit 70 disposed adjacently on the left side. The transportation unit 61 does not transport the rack 100 that holds only the containers 110 which do not require analysis by the analyzer 62, to the front of the analyzer 62, and carries out the rack 100 to the specimen storage unit 70 disposed adjacently on the left side.

The specimen storage unit 70 transports the rack 100 carried in from the transportation unit 61 that is disposed adjacently on the right side to an ascending/descending position P25 described below in the specimen storage unit 70, and transfers the containers 110 held in the rack 100 to an archive rack 130 described below in the specimen storage unit 70. The specimen storage unit 70 carries out the empty rack 100 to the transportation unit 61 disposed adjacently on the right side or the collection unit 13 disposed adjacently on the left side.

The collection unit 13 transports rearward the empty rack 100 carried in from the specimen storage unit 70 that is disposed adjacently on the right side and reserves the empty rack 100.

The transportation control unit 80 determines a destination to which the rack 100 is to be transported, and controls each unit that transports the rack 100 so as to transport the rack 100 to the determined destination.

Figure 3:
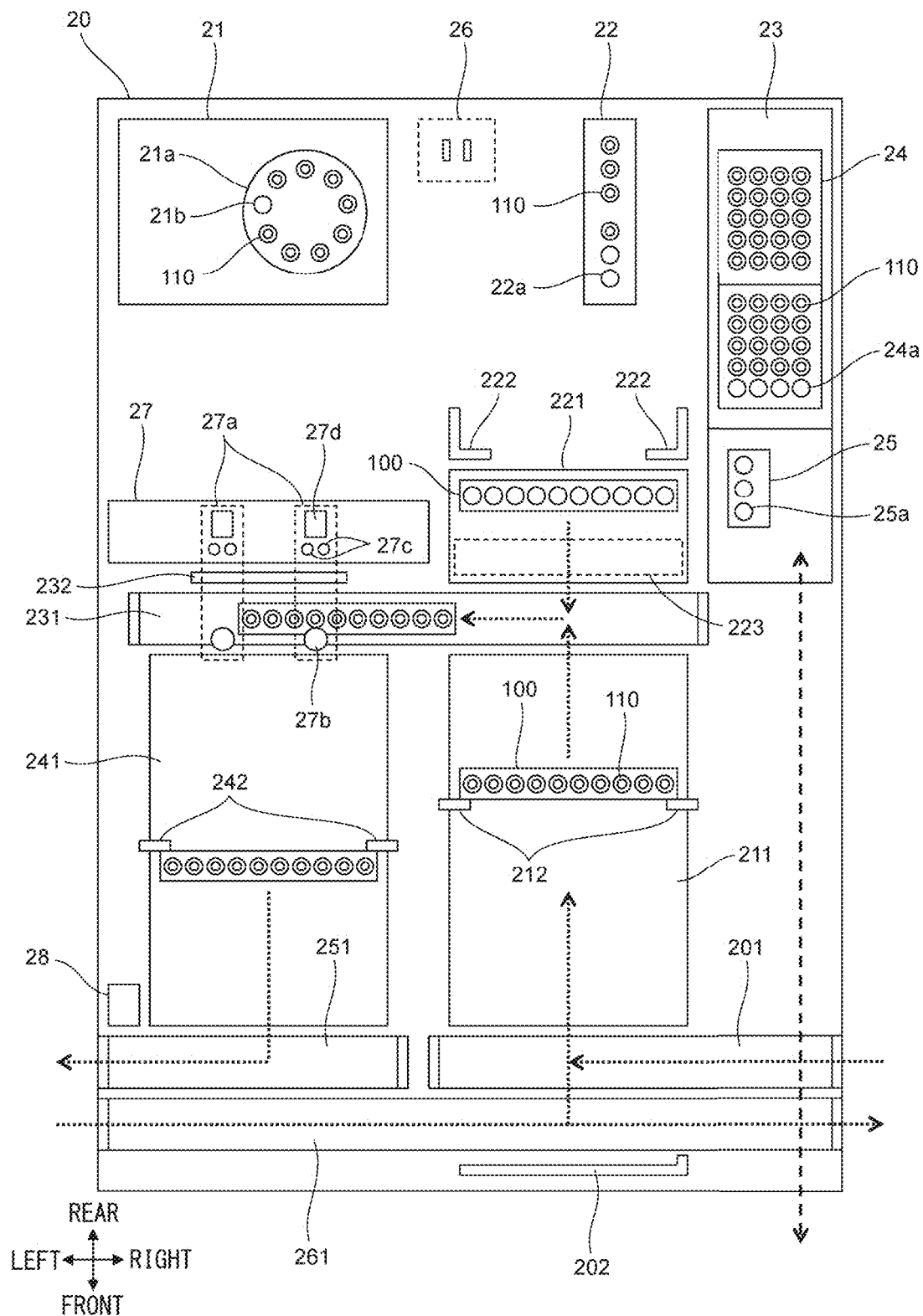
FIG. 3 is a plan view schematically showing a configuration of a supply unit according to the embodiment.

FIG. 3 is a plan view schematically showing a configuration of the supply unit 20.

The supply unit 20 includes a preservation section 21, a heating section 22, a tray 23, a washing liquid rack 24, a quality control specimen rack 25, a container transfer mechanism 26, a reading unit 27, and a reader 28. Further, as components for transporting the racks 100, the supply unit 20 includes a carrying-in path 201, a rack reserving section 211, a transportation path 231, a rack reserving section 241, a carrying-out path 251, and the like as described below.

The containers 110 containing the quality control specimen are held in holes 21b formed in a heat conducting member 21a disposed in the preservation section 21. The preservation section 21 cools and stores the containers 110 held in the holes 21b.

The heating section 22 includes an aluminum block heater. In the aluminum block heater, a plurality of holes 22a capable of holding the containers 110 are formed in the front-rear direction. The heating section 22 heats the containers 110 held in the holes 22a according to need. The quality control specimen in each container 110 is at a normal temperature while the container 110 is held in the hole 22a.

In the tray 23, the washing liquid rack 24 and the quality control specimen rack 25 are disposed. In the washing liquid rack 24, a plurality of holes 24a capable of holding the containers 110 containing the washing liquid are formed. In the quality control specimen rack 25, a plurality of holes 25a capable of holding the containers 110 containing the quality control specimen are formed. The tray 23 is movable in the front-rear direction. The operator draws the tray 23 forward, sets a container 110 containing the washing liquid in a hole 24a, and sets a container 110 containing the quality control specimen in a hole 25a.

The container transfer mechanism 26 has a mechanism for holding and transferring the containers 110. The container transfer mechanism 26 takes out a container 110 containing the quality control specimen from a hole 21b of the preservation section 21, and stores the taken-out container 110 in a hole 22a of the heating section 22. The container transfer mechanism 26 takes out the container 110 held in the hole 22a of the heating section 22, and stores the taken-out container 110 into a hole 101 of a rack 100 positioned at a transfer position 223. The container transfer mechanism 26 takes out a container 110 containing the washing liquid from a hole 24a of the washing liquid rack 24, and stores the taken-out container 110 into a hole 101 of a rack 100 positioned at the transfer position 223. Thus, the rack 100 that holds the containers 110 containing the quality control specimen or the washing liquid is carried out to the transportation unit 31 disposed adjacently on the left side.

After having been processed at the succeeding stage, the rack 100 that holds the containers 110 containing the quality control specimen or the washing liquid is returned to the supply unit 20, and is positioned at the transfer position 223. The container transfer mechanism 26 takes out a container 110 containing the quality control specimen from the rack 100 positioned at the transfer position 223 and stores it in a hole 21b of the preservation section 21, or takes out a container 110 containing the washing liquid from the rack 100 and stores it in a hole 24a of the washing liquid rack 24. Meanwhile, the container transfer mechanism 26 takes out a container 110 containing the quality control specimen from the quality control specimen rack 25, and stores the taken-out container 110 in a hole 21b of the preservation section 21.

The carrying-in path 201 transports leftward the rack 100 carried out from the feeding unit 11. A transportation mechanism 202 transports the rack 100 on the carrying-in path 201 to the rack reserving section 211. A transportation mechanism 212 transports the rack 100 in the rack reserving section 211 to the transportation path 231.

A transportation mechanism 222 draws the rack 100 disposed at the right end of the transportation path 231 into the rack reserving section 221, and transports the rack 100 in the rack reserving section 221 to the transportation path 231. The rack 100 positioned at the transfer position 223 in front of the rack reserving section 221 is subjected to taking-out and storage of the containers 110 containing the quality control specimen or the washing liquid, as described above.

The transportation path 231 transports, in the left-right direction, the racks 100 transported from the rack reserving sections 211, 221. When the rack 100 is positioned at the left end of the transportation path 231, the reading unit 27 reads the rack ID and the specimen IDs from the rack 100 on the transportation path 231. The reading unit 27 includes two movable portions 27a that move in the left-right direction. Each movable portion 27a includes a drive roller 27b for rotating the container 110 held in the rack 100 in the circumferential direction, two driven rollers 27c for pressing the container 110 from the side opposite to the drive roller 27b side so as to allow the container 100 to be rotatable, and a reader 27d for reading the specimen ID from the container 110 held between the drive roller 27b and the driven rollers 27c. The container 110 is rotated in the hole 101 by the drive roller 27b around a rotation axis extending in the vertical direction, whereby the bar code is assuredly read. The rack ID is read by the reader 27d on the left side. The reader 27d is a bar code reader.

The transportation mechanism 232 transports the rack 100 disposed at the left end of the transportation path 231 to the rack reserving section 241. The transportation mechanism 242 transports the rack 100 in the rack reserving section 241 to the carrying-out path 251. The carrying-out path 251 carries out the rack 100 transported from the rack reserving section 241, to the transportation unit 31 disposed adjacently on the left side. At this time, the reader 28 reads the rack ID of the carried-out rack 100. The reader 28 is a bar code reader.

The transportation path 261 transports rightward the rack 100 carried out from the transportation unit 31 disposed adjacently on the left side. The transportation mechanism 202 transports the rack 100 disposed at the right end of the transportation path 261, to the rack reserving section 211 through the carrying-in path 201.

Figure 4:
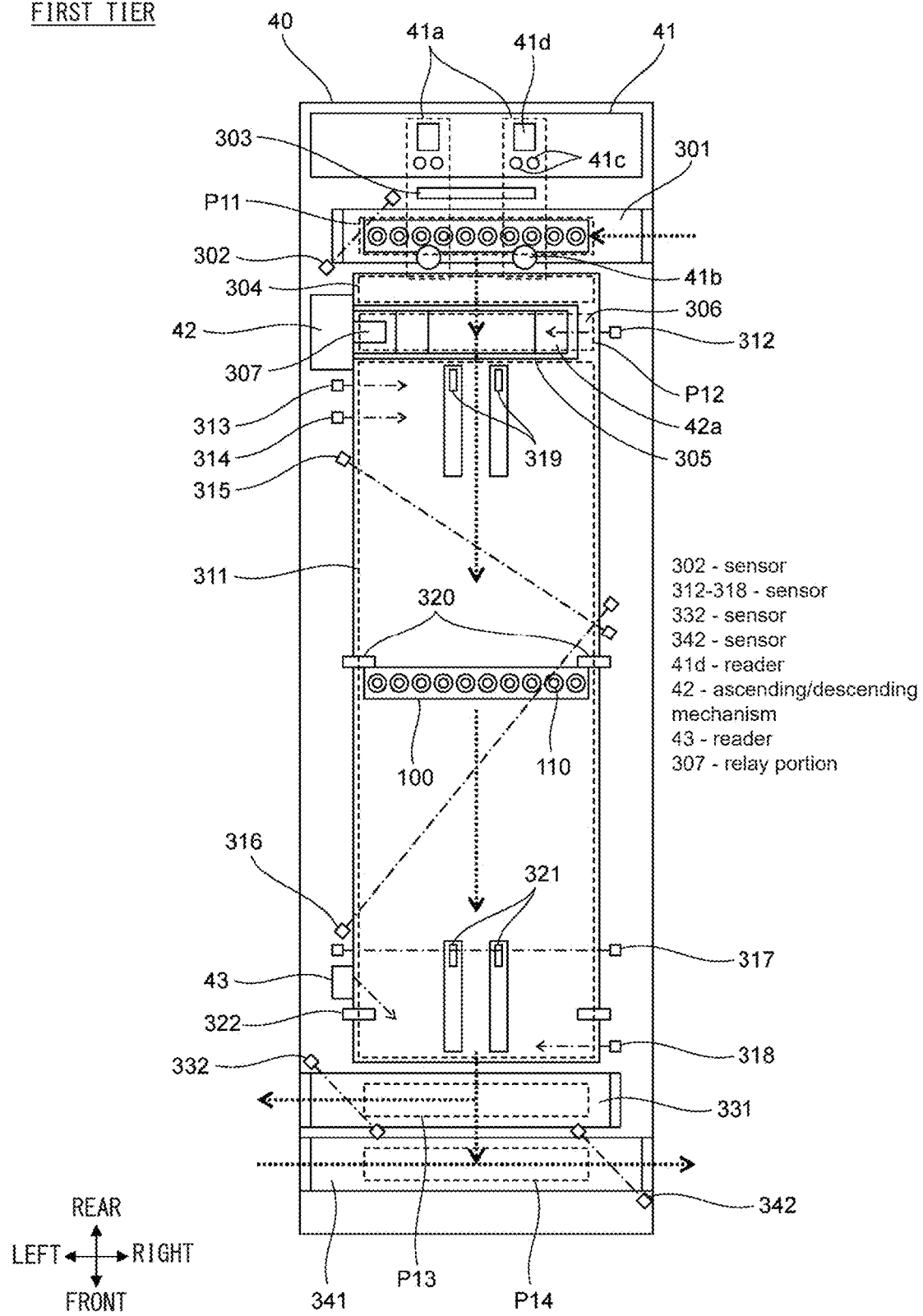
FIG. 4 is a plan view schematically showing a configuration of a first tier of the specimen rearrangement unit according to the embodiment.
Figure 5:
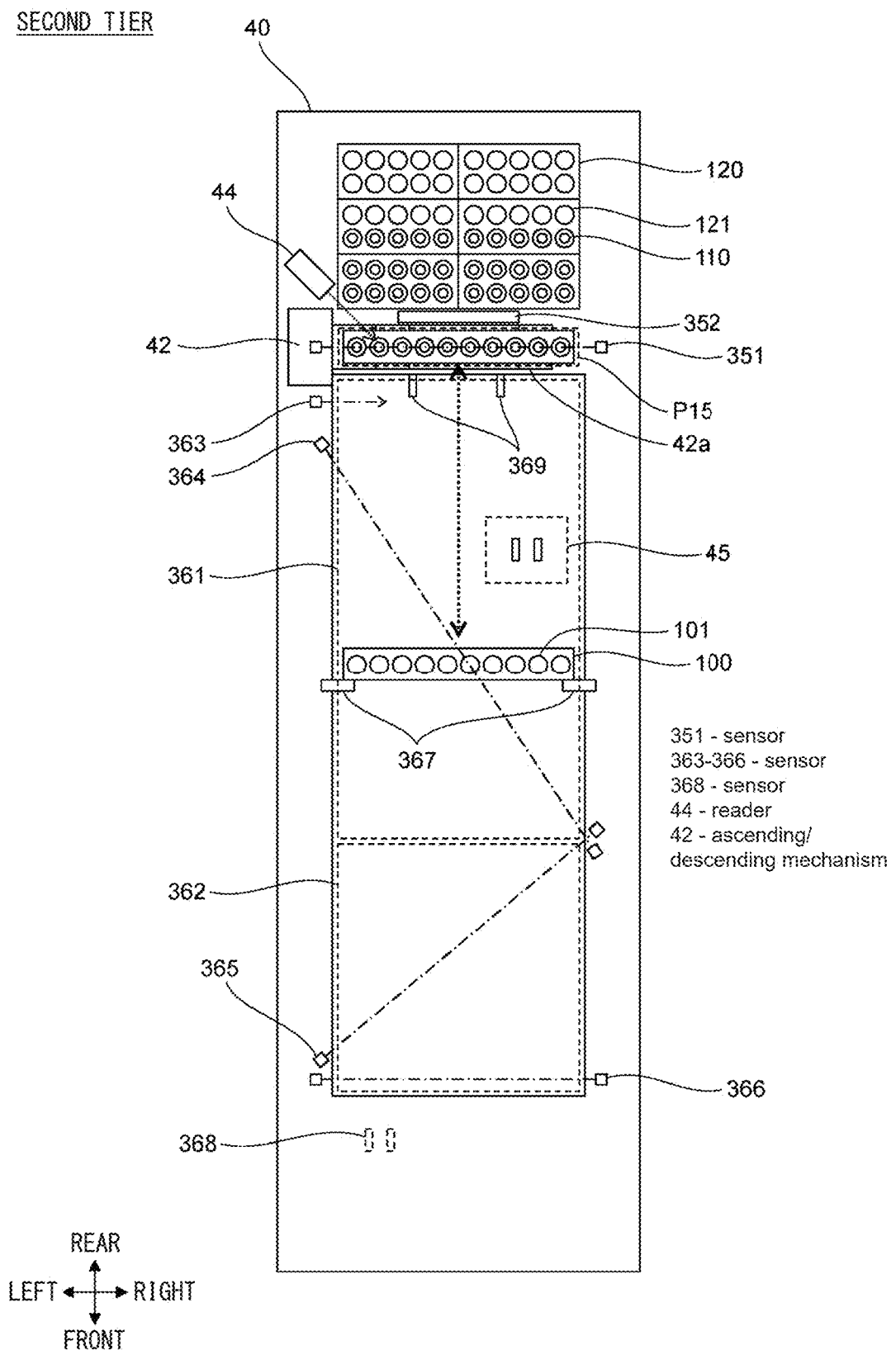
FIG. 5 is a plan view schematically showing a configuration of a second tier of the specimen rearrangement unit according to the embodiment.
Figure 6:
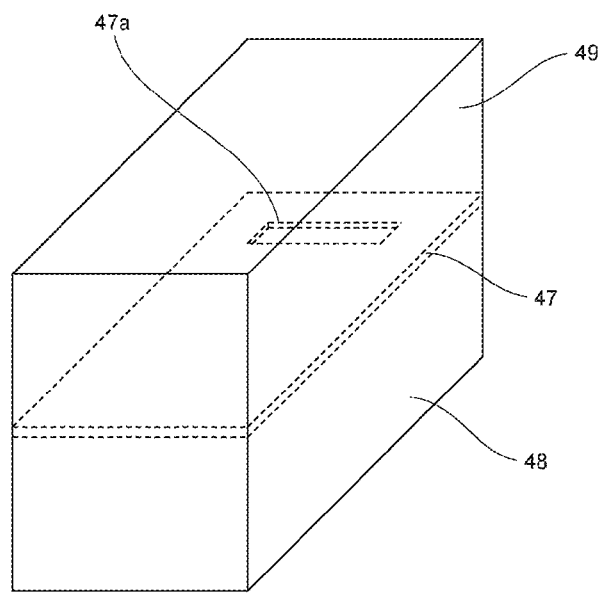
FIG. 6 is a perspective view schematically showing an outer appearance of the specimen rearrangement unit according to the embodiment.

FIGS. 4 and 5 are each a plan view schematically showing a configuration of the specimen rearrangement unit 40 for rearranging specimens. FIGS. 4 and 5 show a first tier and a second tier, respectively, of the specimen rearrangement unit 40. FIG. 6 is a perspective view schematically showing an outer appearance of the specimen rearrangement unit 40. As shown in FIG. 6, the specimen rearrangement unit 40 has a two-tiered structure. The inner portion of the specimen rearrangement unit 40 is divided into two tiers, that is, upper and lower tiers, by a partition 47 that forms a bottom of the second tier and a ceiling of the first tier. The lower tier is a first tier 48 and the upper tier is a second tier 49. The first tier 48 and the second tier 49 overlap each other in a planar view. The partition 47 has an opening 47a that allows one rack 100 to pass therethrough. The partition 47 may have, for example, an opening or a cut portion other than the opening 47a. The first tier 48 and the second tier 49 may not necessarily be formed by the partition 47, and may be structured by disposing a casing of the second tier 49 on a casing of the first tier 48.

With reference to FIG. 4, in the first tier of the specimen rearrangement unit 40, a reading unit 41, an ascending/descending mechanism 42, a reader 43, a carrying-in path 301, a sensor 302, a transportation mechanism 303, an intermediate path 304, an opening 305, a connection portion 306, a relay portion 307, a rack waiting region 311, sensors 312 to 318, transportation mechanisms 319 to 322, a carrying-out path 331, a sensor 332, a carrying-out path 341, and a sensor 342 are provided.

The transportation unit 12 that is disposed adjacent to the specimen rearrangement unit 40 to the right thereof transports the rack 100 rearward and carries out the rack 100 to the specimen rearrangement unit 40 at the rear position.

The carrying-in path 301 extends in the left-right direction and is disposed on the rear side of the specimen rearrangement unit 40. The carrying-in path 301 is implemented by a conveyor belt that moves in the left-right direction, and transports leftward the rack 100 carried out from the transportation unit 12. The rack 100 is carried into the carrying-in path 301 in the longitudinal direction (the left-right direction) of the rack 100. The sensor 302 is a transmission-type photoelectric sensor, and detects the rack 100 positioned at a carrying-in position P11 on the carrying-in path 301. The reading unit 41 reads the rack ID and the specimen IDs from the rack 100 positioned at the carrying-in position P11.

The reading unit 41 includes two movable portions 41a that move in the left-right direction. Each movable portion 41a includes a driving roller 41b for rotating the container 110 held in the rack 100 in the circumferential direction, two driven rollers 41c for pressing the container 110 from the side opposite to the driving roller 41b side so as to allow the container 110 to be rotatable, and a reader 41d for reading the specimen ID from the container 110 held between the driving roller 41b and the driven rollers 41c. The container 110 is rotated in the hole 101 by the driving roller 41b around a rotation axis extending in the vertical direction, whereby the bar cord is assuredly read. The rack ID is read by the reader 41d on the left side. The reader 41d is a bar code reader.

The transportation mechanism 303 includes a member for pushing the side surface of the rack 100, transports the rack 100 disposed at the carrying-in position P11 in the transverse direction (front-rear direction) of the rack 100, and transports the rack 100 via the intermediate path 304 to an ascending/descending position P12 of the ascending/descending mechanism 42, and the rack waiting region 311.

The intermediate path 304, the connection portion 306, the relay portion 307, and the rack waiting region 311 are each formed of a plate member having the upper surface parallel to the horizontal plane. The intermediate path 304 and the rack waiting region 311 are connected to each other via the connection portion 306. The connection portion 306, the relay portion 307, and the ascending/descending position P12 of the ascending/descending mechanism 42 are disposed between the intermediate path 304 and the rack waiting region 311.

The intermediate path 304 is disposed between the carrying-in position P11 and the ascending/descending position P12 at which the rack 100 in the first tier is disposed. The width, in the front-rear direction, of the intermediate path 304 is almost equal to the width, in the front-rear direction (transverse direction), of one rack 100. That is, the ascending/descending position P12 is positioned forward of the carrying-in path 301 so as to be spaced therefrom over about a distance equivalent to the width, in the front-rear direction, of one rack 100.

The rack waiting region 311 is a region where the rack 100 stays in a waiting state when another rack 100 stays in the transportation unit 51 disposed adjacently on the left side or the transportation unit 12 disposed adjacently on the right side, and the rack 100 cannot be carried out from a carrying-out position P13 or a carrying-out position P14, and the rack waiting region 311 is also a movement path for moving the rack 100 from the ascending/descending position P12 to the carrying-out position P13. The rack waiting region 311 is a rectangular region having long sides along the front-rear direction, and extends forward from the ascending/descending position P12 in the front-rear direction. The rack waiting region 311 has such a length that twenty racks 100 are aligned in the rack transverse direction between the ascending/descending position P12 of the rack 100 in the first tier and the carrying-out position P13 to the rack transportation path 1a of a unit disposed on the left side.

The rack waiting region 311 may be at least a region in which the racks 100 can stay in a waiting state. From the viewpoint of reducing an area in which the specimen testing system 1 is installed, the number of the racks 100 that can stay in a waiting state in the region is preferably greater than or equal to 10, more preferably greater than or equal to 15, and even more preferably greater than or equal to 20. From the viewpoint of reducing a length, in the front-rear direction, of the specimen testing system 1, the number of the racks 100 that can stay in a waiting state in the rack waiting region 311 may be 50 or less and preferably may be 40 or less.

The ascending/descending mechanism 42 is disposed between the intermediate path 304 and the rack waiting region 311. The ascending/descending mechanism 42 moves the rack 100 positioned at the ascending/descending position P12 upward to the second tier. The transportation mechanism 303 places the rack 100 on the carrying-in path 301 at the ascending/descending position P12. The sensor 312 is a reflection-type photoelectric sensor, and detects the rack 100 positioned at the ascending/descending position P12.

The opening 305 is formed between the intermediate path 304 and the rack waiting region 311. The opening 305 is a hole that penetrates in the up-down direction through the plate member forming the intermediate path 304, the connection portion 306, and the rack waiting region 311. The connection portion 306 is disposed to the right of the opening 305. The relay portion 307 is disposed at the left end in the opening 305. The lower surface of the rack 100 positioned at the ascending/descending position P12 is supported by the connection portion 306 and the relay portion 307. A support portion 42a of the ascending/descending mechanism 42 is disposed within the opening 305 in a planar view, and is shaped so as not to interfere with the connection portion 306 and the relay portion 307.

In a case where the rack 100 is moved upward from the first tier to the second tier, the ascending/descending mechanism 42 positions, in advance, the support portion 42a at a position lower than the rack waiting region 311. Thereafter, when the rack 100 has been transported to a position of the upper surface of each of the connection portion 306 and the relay portion 307, that is, the ascending/descending position P12, the ascending/descending mechanism 42 moves the support portion 42a upward to place the rack 100 on the upper surface of the support portion 42a and moves the rack 100 upward to the second tier. As described below, in the second tier, the containers 110 held in the rack 100 are rearranged. When the rearrangement of the containers 110 has ended, the ascending/descending mechanism 42 moves the support portion 42a downward, and positions the support portion 42a at a position lower than the rack waiting region 311. Thus, the rack 100 is positioned at the position of the upper surface of each of the connection portion 306 and the relay portion 307, that is, at the ascending/descending position P12.

The rack 100 positioned at the ascending/descending position P12 is transported along the rack waiting region 311 toward the front of the specimen rearrangement unit 40 in the transverse direction (front-rear direction) of the rack 100. The rack 100 returned to the ascending/descending position P12 is transported forward of the ascending/descending position P12 by the transportation mechanism 303. The rack 100 having the containers that are not required to be rearranged is not moved to the second tier and is transported forward of the ascending/descending position P12 after the rack 100 is positioned at the ascending/descending position P12.

In a case where, when the reading unit 41 ends reading of the rack 100 at the carrying-in position P11, no rack 100 is at the ascending/descending position P12 and no rack 100 is being moved upward to the second tier by the ascending/descending mechanism 42, the transportation mechanism 303 positions the rack 100 positioned at the carrying-in position P11, at the ascending/descending position P12. In a case where, when the reading unit 41 ends reading of the rack 100 at the carrying-in position P11, the rack 100 returned from the second tier or the rack 100 that is not required to be moved upward to the second tier is positioned at the ascending/descending position P12, the transportation mechanism 303 pushes out the rack 100 positioned at the carrying-in position P11 forward, and thus collectively transports forward the rack 100 at the carrying-in position P11 and the rack 100 at the ascending/descending position P12. Thus, the rack 100 positioned at the carrying-in position P11 is positioned at the ascending/descending position P12, and the rack 100 positioned at the ascending/descending position P12 is transported forward of the ascending/descending position P12.

In a case where, when the reading unit 41 ends reading of the rack 100 positioned at the carrying-in position P11, the rack 100 positioned at the carrying-in position P11 is not required to be moved upward to the second tier and another rack 100 is being moved upward to the second tier by the ascending/descending mechanism 42, the transportation mechanism 303 may transport the rack 100 positioned at the carrying-in position P11, forward of the ascending/descending position P12, through the ascending/descending position P12.

The sensors 313 to 318 each detect the rack 100 on the rack waiting region 311. A state of the racks 100 staying on the rack waiting region 311 is detected based on detection signals of the sensors 313 to 318. The sensors 313, 314, and 318 are reflection-type photoelectric sensors, and the sensors 315 to 317 are transmission-type photoelectric sensors.

The transportation mechanisms 319 to 322 move the rack 100 transported forward of the ascending/descending position P12 by the transportation mechanism 303, along the rack waiting region 311, in the transverse direction (front-rear direction) of the rack 100, and transport the rack 100 to the carrying-out position P13, P14. At this time, the rack 100 on the carrying-out position P13 is caused to stay in a waiting state at the carrying-out position P13 as appropriate according to a processing state on the succeeding side. The rack 100 on the carrying-out position P14 is caused to stay in a waiting state at the carrying-out position P14 as appropriate according to a processing state on the preceding side.

The transportation mechanism 319 has a member that protrudes upward from the upper surface of the rack waiting region 311 and pushes the lower portion of the rack 100, and further transports forward the rack 100 transported forward of the ascending/descending position P12. The transportation mechanism 320 includes a pair of members for pushing the side surface of the rack 100, and further transports forward the rack 100 transported forward by the transportation mechanism 319. The transportation mechanism 321 has the same configuration as the transportation mechanism 319, and further transports forward the rack 100 transported forward by the transportation mechanism 320. The transportation mechanism 322 has the same configuration as the transportation mechanism 320, and transports the rack 100 transported forward by the transportation mechanism 321 to the carrying-out path 331 or the carrying-out path 341. The reader 43 reads the rack ID of the rack 100 positioned near the front end of the rack waiting region 311. The reader 43 is a bar code reader.

The carrying-out path 331 is implemented by a conveyor belt that moves in the left-right direction, and carries out the rack 100 carried out from the rack waiting region 311 to the transportation unit 51 disposed adjacently on the left side. The sensor 332 is a transmission-type photoelectric sensor, and detects the rack 100 positioned at the carrying-out position P13 on the carrying-out path 331. The carrying-out path 341 is implemented by a conveyor belt that moves in the left-right direction, and carries out the rack 100 that is carried out from the transportation unit 51 disposed adjacently on the left side, and the rack 100 carried out through the carrying-out path 331 from the rack waiting region 311, to the transportation unit 12 disposed adjacently on the right side. The sensor 342 is a transmission-type photoelectric sensor, and detects the rack 100 positioned at the carrying-out position P14 on the carrying-out path 341.

With reference to FIG. 5, in the second tier of the specimen rearrangement unit 40, a reader 44, a container transfer mechanism 45, a sensor 351, a transportation mechanism 352, a rack reserving section 361, a rack setting section 362, sensors 363 to 366, a transportation mechanism 367, a sensor 368, a stopper 369, and a buffer rack 120 are provided.

The ascending/descending mechanism 42 positions the rack 100 moved upward from the ascending/descending position P12 in the first tier, at an ascending/descending position P15 at which the rack 100 in the second tier is disposed. The sensor 351 is a transmission-type photoelectric sensor, and detects the rack 100 positioned at the ascending/descending position P15. The reader 44 reads the rack ID of the rack 100 positioned at the ascending/descending position P15. The reader 44 is a bar code reader.

The container transfer mechanism 45 can transfer the container 110 between the rack 100 and the buffer rack 120. The container transfer mechanism 45 transfers the container 110, to the buffer rack 120 disposed in the second tier, from the rack 100 moved by the ascending/descending mechanism 42 from the ascending/descending position P12 in the first tier to the ascending/descending position P15 in the second tier. The container transfer mechanism 45 rearranges the containers 110 by using the buffer rack 120 such that the rack 100 holds only the containers 110 containing specimens to be processed by the succeeding units (the smear sample preparation unit 52 and the analyzer 62) or only the containers 110 containing specimens that are not required to be processed by the succeeding units. When the rearrangement of the containers 110 has ended, the ascending/descending mechanism 42 moves the rack 100 positioned at the ascending/descending position P15 downward to the first tier, and positions the rack 100 at the ascending/descending position P12.

The transportation mechanism 352 includes a member for pushing the side surface of the rack 100, and transports the rack 100 positioned at the ascending/descending position P15 to the rack reserving section 361. In a case where all of the containers 110 have been transferred to the buffer rack 120 from the rack 100 positioned at the ascending/descending position P15, the rack 100 becomes the rack 100 (hereinafter, referred to as "empty rack") that does not hold the containers 110. In this case, the transportation mechanism 352 transports the empty rack that has become empty at the ascending/descending position P15 to the rack reserving section 361.

The rack reserving section 361 and the rack setting section 362 are formed as a rear-side portion and a front-side portion, respectively, of a plate member having the upper surface parallel to the horizontal plane. The plate member of the rack reserving section 361 and the rack setting section 362 extends from the rear side to the front side in the front-rear direction. The upper portion of the rack setting section 362 is opened outward through an opening formed in the casing of the specimen rearrangement unit 40.

The sensors 363, 364 detect the rack 100 on the rack reserving section 361. A state of an empty rack reserved on the rack reserving section 361 is detected based on detection signals of the sensors 363, 364. The sensor 363 is a reflection-type photoelectric sensor, and the sensor 364 is a transmission-type photoelectric sensor. The sensors 365, 366 detect the rack 100 on the rack setting section 362. A state of an empty rack set on the rack setting section 362 is detected based on detection signals of the sensors 365, 366. The sensors 365, 366 are transmission-type photoelectric sensors.

The transportation mechanism 367 includes a pair of members for pushing the side surface of the rack 100, and transports the rack 100 on the rack reserving section 361 and the rack setting section 362 in the front-rear direction. The sensor 368 is a transmission-type photoelectric sensor, and detects that the transportation mechanism 367 is positioned at an originating position. When the transportation mechanism 367 moves a movement portion of the transportation mechanism 367 to the forefront position, the movement portion is positioned at the sensor 368. The sensor 368 detects that the transportation mechanism 367 is positioned at the originating position by detecting the movement portion.

The buffer rack 120 has a plurality of holes 121 in which the containers 110 containing specimens can be held. In the buffer rack 120 in FIG. 5, sixty holes 121 in total are formed in a grid-like shape such that six rows of the holes 121 are formed in the front-rear direction and ten lines of the holes 121 are formed in the left-right direction. In a case where a predetermined number N of the containers 110 are held in the buffer rack 120, or in a case where a predetermined time T elapses from a time when the first specimen has been stored in the buffer rack 120, the containers 110 are transferred from the buffer rack 120 to the rack 100 positioned at the ascending/descending position P15 such that only the containers 110 to be transported to the same destination are held in the rack 100. The predetermined number N can be, for example, set in a range of one to ten through a display input section 813 (see FIG. 17). The predetermined time T can be, for example, set in a range of one minute to 30 minutes through the display input section 813.

In a case where, when the container is transferred from the buffer rack 120 to the rack 100, the rack 100 to which the container is to be transferred is not at the ascending/descending position P15, the transportation mechanism 367 pushes the front surface of an empty rack on the forefront side among empty racks reserved in the rack reserving section 361 and the rack setting section 362, and pushes out a rearmost empty rack among the empty racks reserved in the rack reserving section 361 and the rack setting section 362 to the ascending/descending position P15. At this time, since the stopper 369 protrudes upward from the upper surface of the rack reserving section 361, the rearmost empty rack and an empty rack that is disposed adjacent to and forward of the rearmost empty rack are separated. Thereafter, the container 110 is transferred from the buffer rack 120 to the empty rack positioned at the ascending/descending position P15 by the container transfer mechanism 45.

When the transfer of the containers 110 to the rack 100 positioned at the ascending/descending position P15 has ended, the rack 100 is moved to the ascending/descending position P12 in the first tier by the ascending/descending mechanism 42, and carried out to the transportation unit 51 disposed adjacently on the left side or the transportation unit 12 disposed adjacently on the right side.

When the number of empty racks reserved in the rack reserving section 361 becomes less than or equal to a predetermined number, the transportation control unit 80 controls each unit so as to transport the rack 100 that has become empty since all of the containers 110 have been taken out by the specimen storage unit 70, through the transportation unit 12, to the specimen rearrangement unit 40. The specimen rearrangement unit 40 transports the empty rack carried in from the transportation unit 12 to the rack reserving section 361 in the second tier.

An operator may set empty racks in the rack setting section 362 at which the upper portion is opened outward, with reference to notification on the display input section 813 (see FIG. 17) indicating that the empty racks are insufficient. The transportation mechanism 367 transports the empty racks that have been set in the rack setting section 362 by the operator, to the rack reserving section 361 and the ascending/descending position P15 as appropriate.

The number of the empty racks reserved in the rack reserving section 361 and the rack setting section 362 is detected according to the number of steps of a stepping motor which is counted until return to the originating position detected by the sensor 368 from a drive position for positioning the empty rack at the ascending/descending position P15 when the transportation mechanism 367 transports the empty rack to the ascending/descending position P15. The number of steps of the stepping motor is counted by a rotary encoder or the like.

Figure 7:
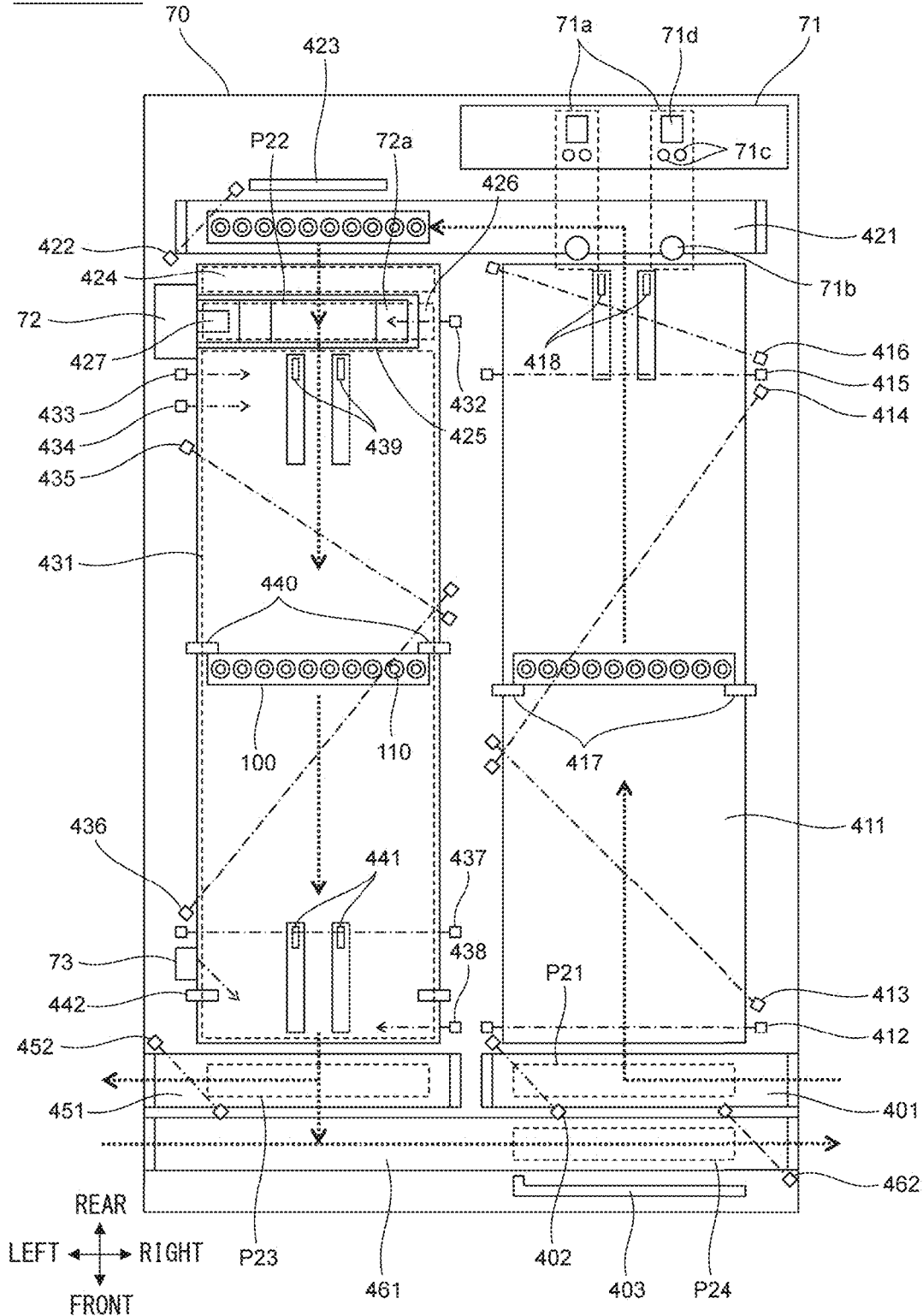
FIG. 7 is a plan view schematically showing a configuration of a first tier of a specimen storage unit according to the embodiment.
Figure 8:
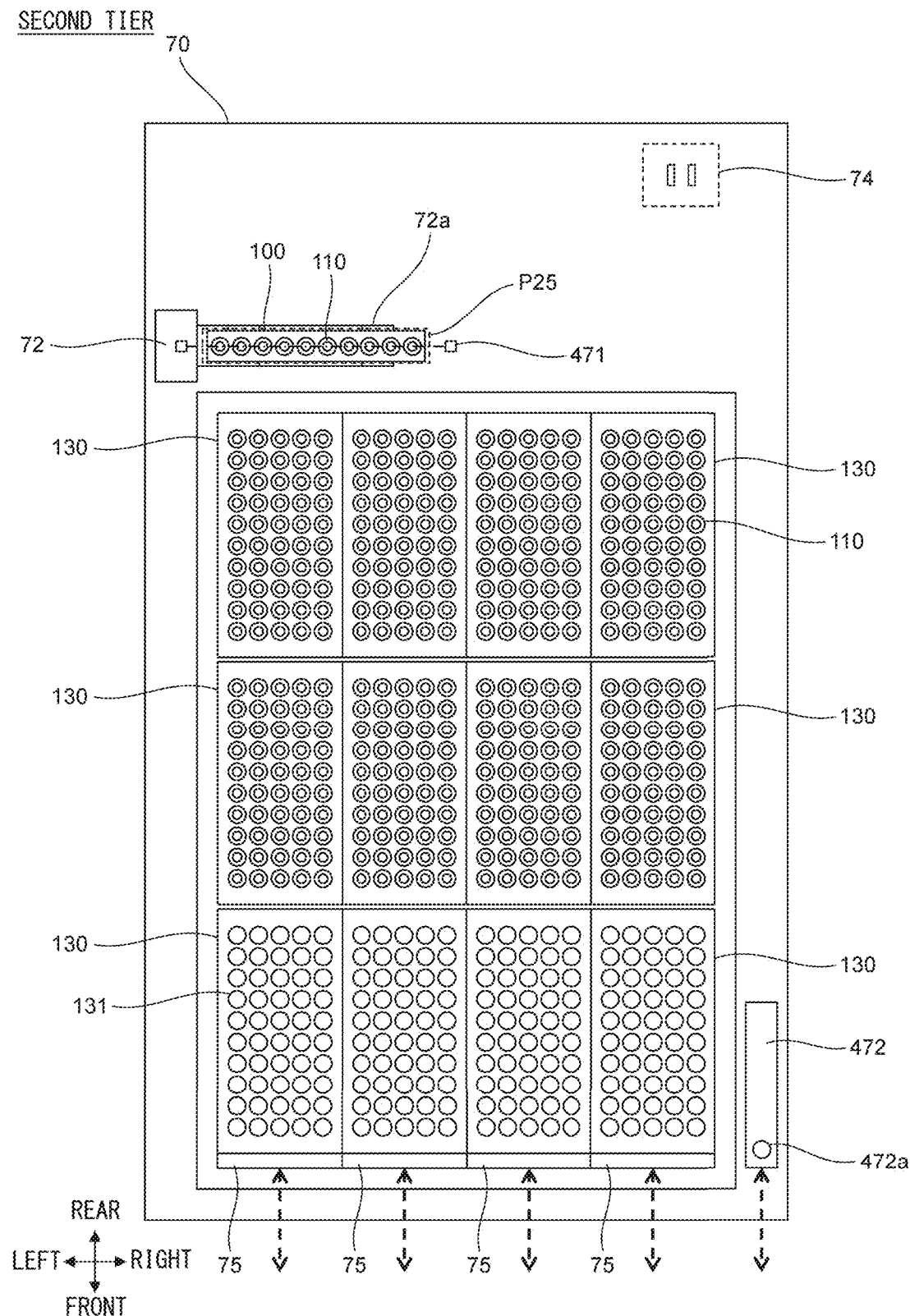
FIG. 8 is a plan view schematically showing a configuration of a second tier of the specimen storage unit according to the embodiment.
Figure 9:
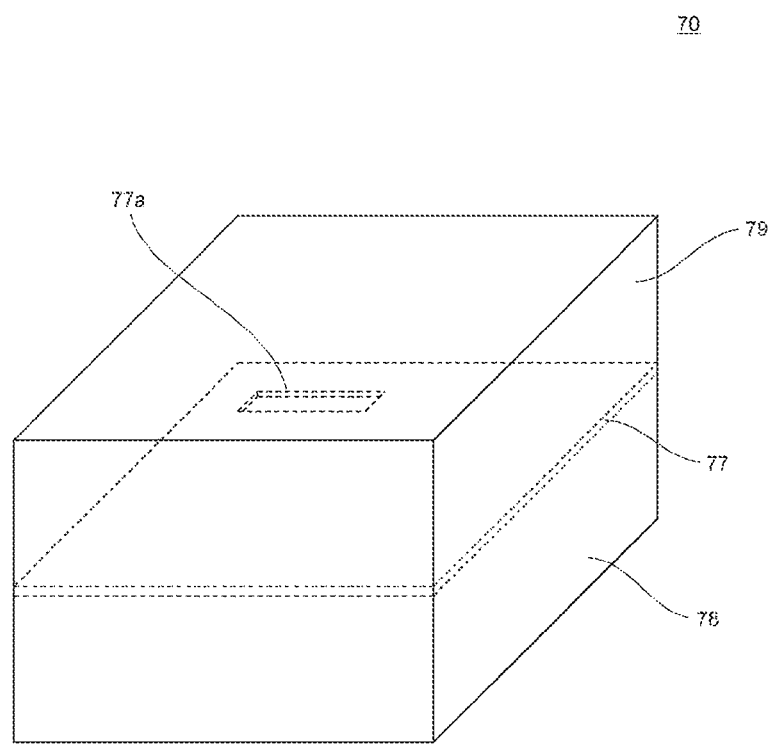
FIG. 9 is a perspective view schematically showing an outer appearance of the specimen storage unit according to the embodiment.

FIGS. 7 and 8 are each a plan view schematically showing a configuration of the specimen storage unit 70 for storing specimens. FIGS. 7 and 8 show the first tier and the second tier, respectively, of the specimen storage unit 70. FIG. 9 is a perspective view schematically showing an outer appearance of the specimen storage unit 70. As shown in FIG. 9, the specimen storage unit 70 has a two-tiered structure similarly to the specimen rearrangement unit 40. The inner portion of the specimen storage unit 70 is divided into two tiers, that is, upper and lower tiers, by a partition 77 that forms a bottom of the second tier and a ceiling of the first tier. The lower tier is a first tier 78 and the upper tier is a second tier 79. The first tier 78 and the second tier 79 overlap each other in a planar view. The partition 77 has an opening 77a that allows one rack 100 to pass therethrough. The partition 77 may have, for example, an opening or a cut portion other than the opening 77a. The first tier 78 and the second tier 79 may not necessarily be formed by the partition 77 and may be structured by disposing a casing of the second tier 79 on a casing of the first tier 78.

With reference to FIG. 6, in the first tier of the specimen storage unit 70, a reading unit 71, an ascending/descending mechanism 72, a reader 73, a carrying-in path 401, a sensor 402, a transportation mechanism 403, a movement path 411, sensors 412 to 416, transportation mechanisms 417, 418, a carrying-in path 421, a sensor 422, a transportation mechanism 423, an intermediate path 424, an opening 425, a connection portion 426, a relay portion 427, a rack waiting region 431, sensors 432 to 438, transportation mechanisms 439 to 442, a carrying-out path 451, a sensor 452, a carrying-out path 461, and a sensor 462 are provided.

The transportation unit 61 that is disposed adjacent to the specimen storage unit 70 to the right thereof carries out the rack 100, along the rack transportation path 1a (see FIG. 1) disposed on the front side, to the specimen storage unit 70, at a front position.

The carrying-in path 401 is implemented by a conveyor belt that moves in the left-right direction, and transports leftward the rack 100 carried out from the transportation unit 61. The sensor 402 is a transmission-type photoelectric sensor, and detects the rack 100 positioned at a carrying-in position P21 on the carrying-in path 401. The transportation mechanism 403 includes a member for pushing the side surface of the rack 100, and transports the rack 100 positioned at the carrying-in position P21 to the movement path 411.

The movement path 411 is formed by a plate member having the upper surface parallel to the horizontal plane, and extends from the front side to the rear side of the specimen storage unit 70 in the front-rear direction. The sensors 412 to 416 detect the rack 100 on the movement path 411. A state of the rack 100 staying on the movement path 411 is detected based on detection signals of the sensors 412 to 416. The sensors 412 to 416 are transmission-type photoelectric sensors.

The transportation mechanisms 417 and 418 move the rack 100 along the movement path 411 in the transverse direction (front-rear direction) of the rack 100, and transport the rack 100 to the carrying-in path 421. The transportation mechanism 417 includes a pair of members for pushing the side surface of the rack 100, and moves the rack 100 on the movement path 411 to the position of the sensor 415. The transportation mechanism 418 includes a member that protrudes upward from the upper surface of the movement path 411 and pushes the lower portion of the rack 100, and transports the rack 100 positioned at the sensor 415 to the right end of the carrying-in path 421.

The reading unit 71 reads the rack ID and the specimen IDs from the rack 100 positioned at the right end of the carrying-in path 421. The reading unit 71 has a configuration similar to the configuration of the reading unit 41 in FIG. 4.

The reading unit 71 includes two movable portions 71a, and each movable portion 71a includes a driving roller 71b, two driven rollers 71c, and a reader 71d. The reader 71d is a bar code reader.

The carrying-in path 421 extends in the left-right direction and is disposed on the rear side of the specimen storage unit 70. The carrying-in path 421 is implemented by a conveyor belt that moves in the left-right direction, and moves leftward the rack 100 transported from the movement path 411. The sensor 422 is a transmission-type photoelectric sensor and detects the rack 100 positioned at the left end of the carrying-in path 421. The transportation mechanism 423 includes a member for pushing the side surface of the rack 100, and transports the rack 100 disposed at the left end of the carrying-in path 421 through the intermediate path 424 to the rack waiting region 431.

The intermediate path 424, the opening 425, the connection portion 426, the relay portion 427, the rack waiting region 431, the sensors 432 to 438, the transportation mechanisms 439 to 442, the ascending/descending mechanism 72, and the reader 73 have configurations similar to the configurations of the intermediate path 304, the opening 305, the connection portion 306, the relay portion 307, the rack waiting region 311, the sensors 312 to 318, the transportation mechanisms 319 to 322, the ascending/descending mechanism 42, and the reader 43, respectively, in FIG. 4. The width, in the front-rear direction, of the intermediate path 424 is almost equal to the width, in the front-rear direction (transverse direction), of one rack 100.

The rack waiting region 431 is a region where the rack 100 stays in a waiting state when another rack 100 stays in the collection unit 13 disposed adjacently on the left side or the transportation unit 61 disposed adjacently on the right side, and the rack 100 cannot be carried out from a carrying-out position P23 or a carrying-out position P24, and the rack waiting region 431 is also a movement path for moving the rack 100 from an ascending/descending position P22 to the carrying-out position P23. The rack waiting region 431 is a rectangular region having long sides along the front-rear direction, and extends forward from the ascending/descending position P22 at which the rack 100 in the first tier is disposed, in the front-rear direction. The rack waiting region 431 has such a length that twenty racks 100 are aligned in the rack transverse direction between the ascending/descending position P22 of the rack 100 in the first tier and the carrying-out position P23 to the rack transportation path 1a of a unit disposed on the left side The rack waiting region 431 may be at least a region in which the racks 100 can stay in a waiting state. From the viewpoint of reducing an area in which the specimen testing system 1 is installed, the number of the racks 100 that can stay in a waiting state in the region is preferably greater than or equal to 10, more preferably greater than or equal to 15, and even more preferably greater than or equal to 20. From the viewpoint of reducing the length, in the front-rear direction, of the specimen testing system 1, the number of the racks 100 that can stay in a waiting state in the rack waiting region 431 may be 50 or less and preferably may be 40 or less.

The ascending/descending mechanism 72 moves the rack 100 in the up-down direction by moving a support portion 72a that supports the lower surface of the rack 100, in the up-down direction.

The rack 100 carried out from the carrying-in path 421 is positioned at the ascending/descending position P22 through the intermediate path 424, and the rack 100 positioned at the ascending/descending position P22 is moved to the second tier by the ascending/descending mechanism 72. In the second tier, as described below, the containers 110 held in the rack 100 are taken out from the rack 100 and stored. Thus, the rack 100 moved to the second tier becomes an empty rack. When the storage of the containers 110 has ended, the ascending/descending mechanism 72 moves the rack 100 positioned in the second tier downward to the first tier, and positions again the rack 100 at the ascending/descending position P22.

The rack 100 positioned at the ascending/descending position P22 is transported toward the front side of the specimen storage unit 70 along the rack waiting region 431 in the transverse direction (front-rear direction) of the rack 100. The rack 100 returned to the ascending/descending position P22 is transported forward of the ascending/descending position P22 by the transportation mechanism 423.

In a case where, when the rack 100 has arrived at the left end of the carrying-in path 421, no rack 100 is at the ascending/descending position P22 and no rack 100 is being moved upward to the second tier by the ascending/descending mechanism 72, the transportation mechanism 423 positions the rack 100 positioned at the left end of the carrying-in path 421, at the ascending/descending position P22. In a case where, when the rack 100 has arrived at the left end of the carrying-in path 421, the rack 100 returned from the second tier to the ascending/descending position P22 or the rack 100 that is not required to be moved upward to the second tier is positioned, the transportation mechanism 423 pushes out the rack 100 positioned at the left end of the carrying-in path 421 forward and thus collectively transports forward the rack 100 positioned at the left end of the carrying-in path 421 and the rack 100 positioned at the ascending/descending position P22. Thus, the rack 100 positioned at the left end of the carrying-in path 421 is positioned at the ascending/descending position P22, and the rack 100 positioned at the ascending/descending position P22 is transported forward of the ascending/descending position P22.

The transportation mechanisms 439 to 442 move an empty rack transported forward of the ascending/descending position P22 by the transportation mechanism 423, along the rack waiting region 431, in the transverse direction (front-rear direction) of the rack 100, and transport the empty rack to the carrying-out position P23, P24. At this time, the rack 100 on the carrying-out position P23 is caused to stay in a waiting state at the carrying-out position P23 as appropriate according to a processing state on the succeeding side. The rack 100 on the carrying-out position P24 is caused to stay in a waiting state at the carrying-out position P24 as appropriate according to a processing state on the preceding side. The reader 73 reads the rack ID from the rack 100 positioned near the front end of the rack waiting region 431. The reader 73 is a bar code reader.

The carrying-out path 451 is implemented by a conveyor belt that moves in the left-right direction, and carries out the rack 100 carried out from the rack waiting region 431 to the collection unit 13 disposed adjacently on the left side. The sensor 452 is a transmission-type photoelectric sensor, and detects the rack 100 positioned at the carrying-out position P23 on the carrying-out path 451. The carrying-out path 461 is implemented by a conveyor belt that moves in the left-right direction, and carries out the rack 100 carried out from the collection unit 13 disposed adjacently on the left side and the rack 100 carried out from the rack waiting region 431 through the carrying-out path 451, to the transportation unit 61 disposed adjacently on the right side. The sensor 462 is a transmission-type photoelectric sensor, and detects the rack 100 positioned at the carrying-out position P24 at the right end of the carrying-out path 461. The transportation mechanism 403 can also transport the rack 100 positioned at the carrying-out position P24 to the movement path 411.

With reference to FIG. 8, in the second tier of the specimen storage unit 70, a container transfer mechanism 74, a tray 75, the archive rack 130, a sensor 471, and a take-out section 472 are provided.

The ascending/descending mechanism 72 positions the rack 100 moved upward from the ascending/descending position P22 in the first tier, at the ascending/descending position P25 at which the rack 100 in the second tier is disposed. The sensor 471 is a transmission-type photoelectric sensor and detects the rack 100 positioned at the ascending/descending position P25.

The container transfer mechanism 74 can transfer the container 110 between the rack 100 and the archive rack 130. The container transfer mechanism 74 transfers the container 110, from the rack 100 moved from the first tier to the second tier by the ascending/descending mechanism 72, to the archive rack 130 disposed in the second tier. The container transfer mechanism 74 takes out all of the containers 110 from the rack 100 positioned at the ascending/descending position P25, and stores the taken-out containers 110 in the archive rack 130. When all of the containers 110 have been taken out from the rack 100, the ascending/descending mechanism 72 moves the rack 100 that has become empty to the ascending/descending position P22 in the first tier. The empty rack returned to the first tier is transported to the collection unit 13 or the specimen rearrangement unit 40.

The archive rack 130 is detachably set to the tray 75 that can be drawn forward of the specimen storage unit 70. The archive rack 130 has a plurality of holes 131 in which the containers 110 containing specimens can be held. In the archive rack 130 in FIG. 8, fifty holes 131 in total are formed in a grid-like shape such that ten rows of the holes 131 are formed in the front-rear direction, and five lines of the holes 131 are formed in the left-right direction. In FIG. 8, four trays 75 are disposed in the left-right direction, and one tray 75 can hold three archive racks 130 aligned in the front-rear direction. When the operator inputs an instruction for taking out the tray 75, the target tray 75 is unlocked. Thus, the operator is allowed to draw the target tray 75 forward and take out the target archive rack 130.

The take-out section 472 can be drawn forward of the specimen storage unit 70. The take-out section 472 has a hole 472a in which the container 110 can be held. The container transfer mechanism 74 can transfer the container 110 between the archive rack 130 and the take-out section 472. When the operator inputs an instruction for taking out a predetermined container 110 through a display input section 823 (see FIG. 18), the container transfer mechanism 74 transfers the target container 110 from the archive rack 130 to the take-out section 472, and the take-out section 472 is pushed forward. Thus, the operator is allowed to take out the target container 110 from the take-out section 472.

Next, a configuration of the container transfer mechanism 45 of the specimen rearrangement unit 40 will be described with reference to FIGS. 10 and 15.

The container transfer mechanism 26 of the supply unit 20 and the container transfer mechanism 74 of the specimen storage unit 70 have configurations similar to that of the container transfer mechanism 45 of the specimen rearrangement unit 40. That is, the container transfer mechanisms 26, 45, 74 each include a forward-rearward moving section 610, a leftward-rightward moving section 620, an upward-downward moving section 630, and a holding section 640 as shown in FIGS. 10 to 15. Hereinafter, for convenience sake, the configuration of the container transfer mechanism 45 will be merely described.

Figure 10:
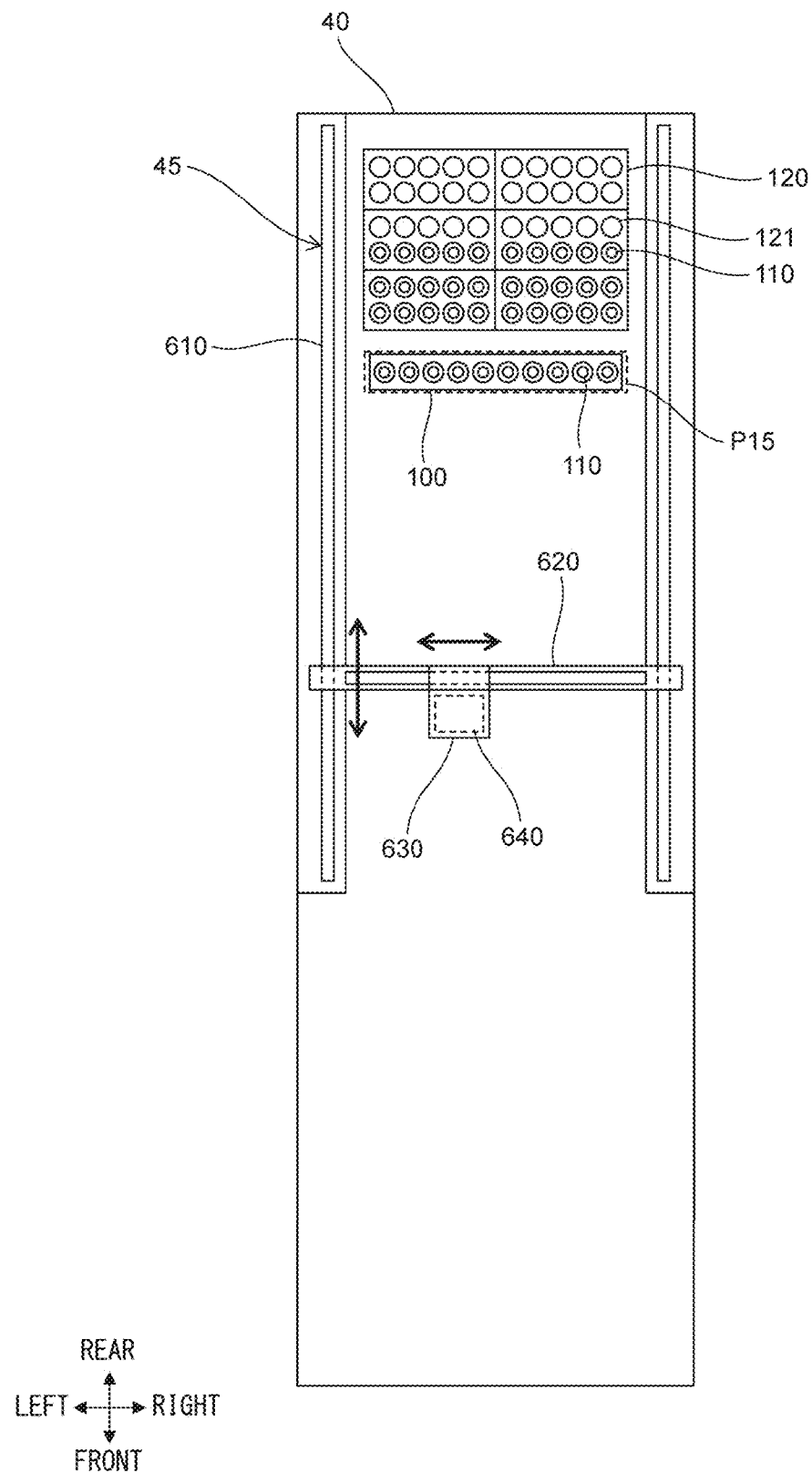
FIG. 10 is a plan view schematically showing a configuration of a container transfer mechanism of the specimen rearrangement unit according to the embodiment.

FIG. 10 is a plan view schematically showing a configuration of the container transfer mechanism 45 of the specimen rearrangement unit 40. In FIG. 10, components other than the rack 100, the container 110, and the buffer rack 120 are not shown for convenience sake.

The container transfer mechanism 45 includes the forward-rearward moving section 610, the leftward-rightward moving section 620, the upward-downward moving section 630, and the holding section 640. The container transfer mechanism 45 moves one container 110 from the buffer rack 120 in which a plurality of the containers 110 can be held, by using the holding section 640.

The forward-rearward moving section 610 includes a motor and a rail extending in the front-rear direction, and moves the leftward-rightward moving section 620 in the front-rear direction. The leftward-rightward moving section 620 includes a motor and a rail extending in the left-right direction, and moves the upward-downward moving section 630 in the left-right direction. The upward-downward moving section 630 includes a motor and a rail extending in the up-down direction, and moves the holding section 640 in the up-down direction. The holding section 640 is openable and closable, and can be moved in the vertical direction and can be moved in the horizontal direction by the forward-rearward moving section 610, the leftward-rightward moving section 620, and the upward-downward moving section 630. The vertical direction is synonymous with the up-down direction. The holding section 640 is configured to be openable and closable and holds the container 110.

Figure 11:
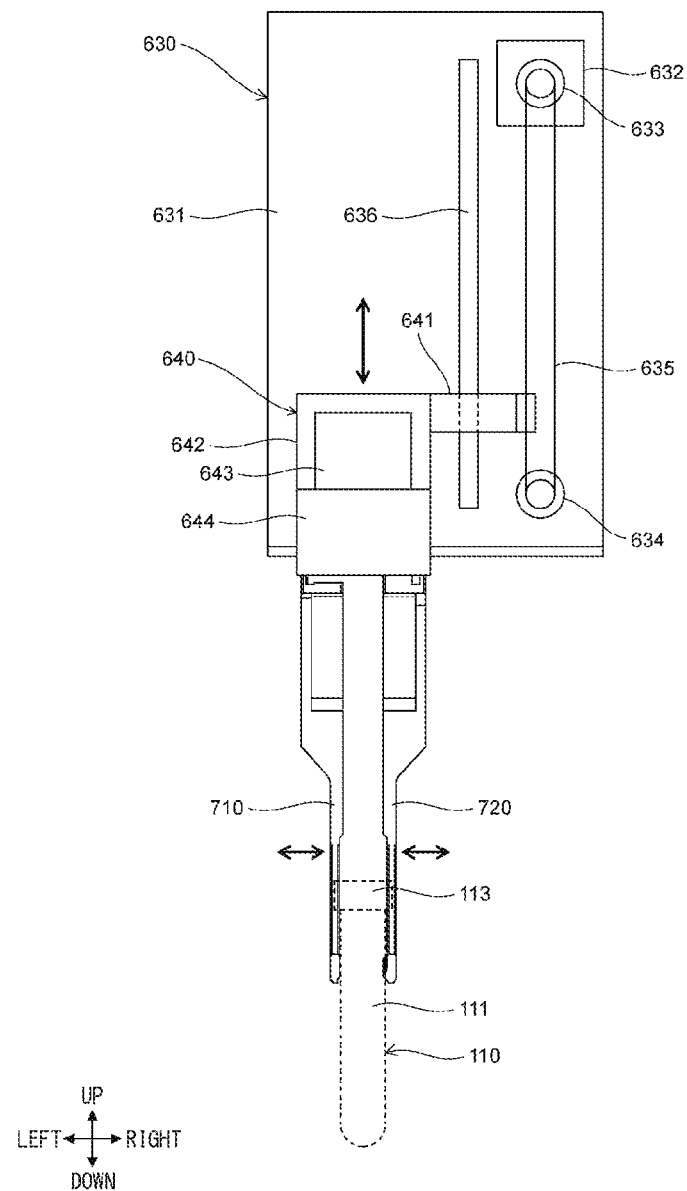
FIG. 11 is a side view schematically showing configurations of an upward-downward transfer unit and a holding section according to the embodiment.

FIG. 11 is a side view schematically showing configurations of the upward-downward moving section 630 and the holding section 640.

The upward-downward moving section 630 includes a base plate 631, a motor 632, pulleys 633, 634, a belt 635, and a rail 636.

The motor 632 is implemented by a stepping motor, and disposed at the base plate 631. The pulley 633 is disposed at a shaft, of the motor 632, extending in the front-rear direction. The pulley 634 is disposed at the base plate 631 below the pulley 633. The belt 635 is connected to the pulleys 633, 634, and is moved in the up-down direction according to driving of the motor 632. The rail 636 extends in the up-down direction and is disposed at the base plate 631.

The holding section 640 includes a connection member 641, a base plate 642, a motor 643, a conversion mechanism section 644, and a pair of holding members 710, 720.

The right end of the connection member 641 is fixed to the belt 635. When the belt 635 is moved in the up-down direction, the connection member 641 is moved in the up-down direction while being supported by the rail 636. The connection member 641 is fixed to the base plate 642.

The motor 643 is implemented by a stepping motor, and is disposed at the base plate 642. The rotation shaft of the motor 643 extends in the up-down direction. The conversion mechanism section 644 is disposed at the base plate 642, and the holding members 710, 720 are disposed at the conversion mechanism section 644. The conversion mechanism section 644 is configured to convert the direction in which the motor 643 rotates to directions in which the holding member 710 and the holding member 720 approach each other and separate from each other. Therefore, by driving the motor 643, the holding member 710 and the holding member 720 approach each other and separate from each other. Thus, as shown in FIG. 11, the trunk portion 111 of the container 110 is held by the inner surface of the holding member 710 and the inner surface of the holding member 720.

Figure 12:
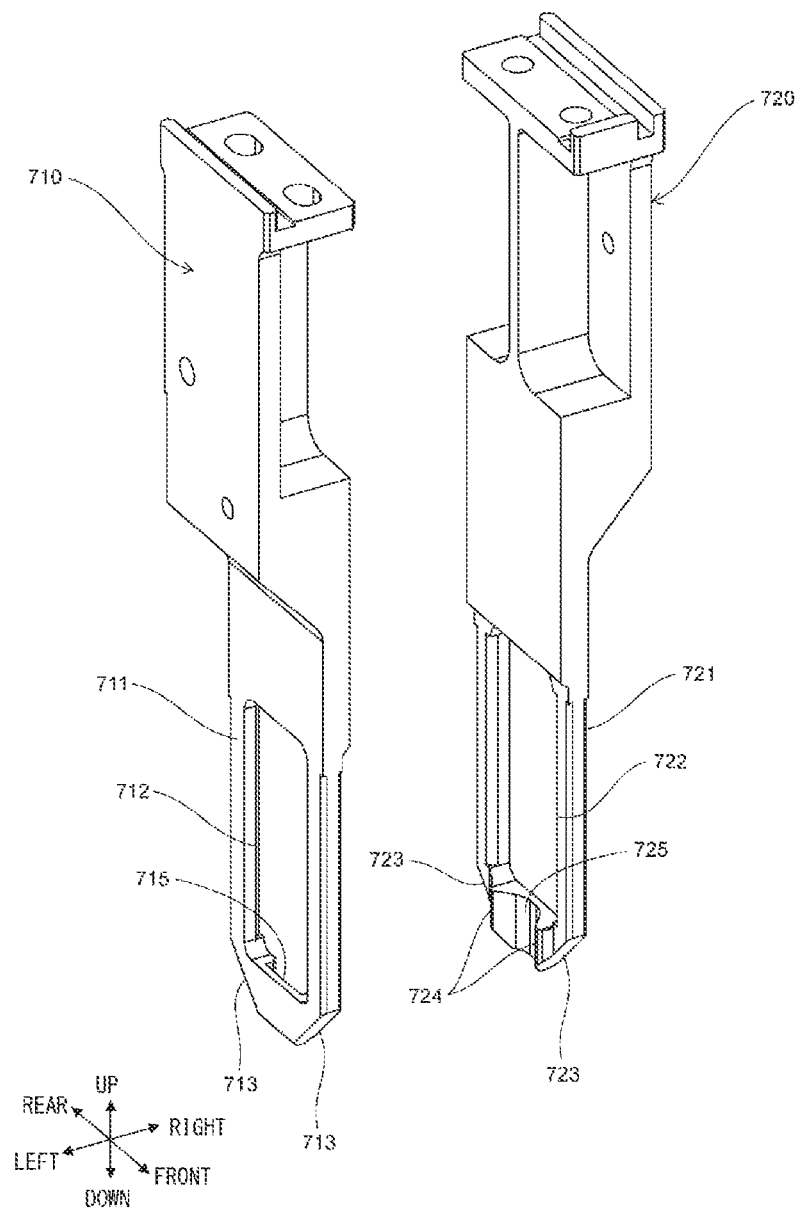
FIG. 12 is a perspective view showing the configuration of the holding section viewed from the front side, according to the embodiment.
Figure 13:
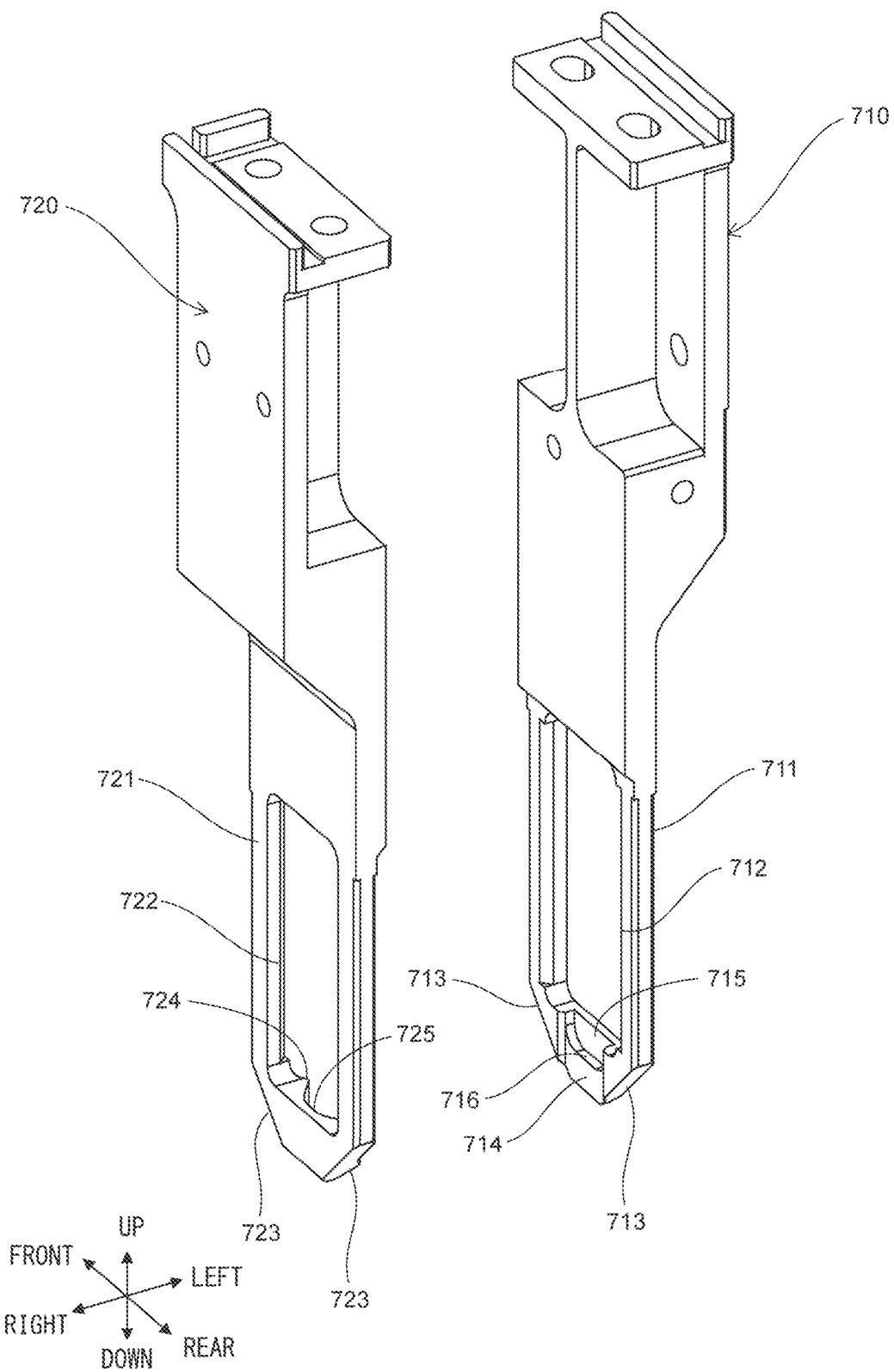
FIG. 13 is a perspective view showing the configuration of the holding section viewed from the rear side, according to the embodiment.

FIGS. 12, 13 are perspective views each showing configurations of the holding members 710, 720. FIG. 12 shows the holding members 710, 720 as viewed from the front side, and FIG. 13 shows the holding members 710, 720 as viewed from the rear side.

With reference to FIG. 12, the holding member 720 includes, in a lower portion thereof, a thin plate portion 721, an opening 722, a pair of cutouts 723, a pair of projections 724, and a recess 725.

The thin plate portion 721 is thinner in the left-right direction than an upper portion of the holding member 720. The thickness of the thin plate portion 721 in the left-right direction is about several millimeters, for example. The opening 722 is formed in the thin plate portion 721 so as to penetrate the thin plate portion 721 in the left-right direction. The pair of cutouts 723 are formed at a front end side surface and a rear end side surface of a lower end of the holding member 720, respectively, and are sloped with respect to the up-down direction so as to gradually approach each other in the downward direction. Furthermore, as shown in FIG. 15, cutouts 726, 727 are formed at a right side surface and a left side surface of the lower end of the holding member 720, and are sloped with respect to the up-down direction so as to gradually approach each other in the downward direction.

The pair of projections 724 are positioned below the opening 722, and are formed at a left side surface of a lower end of the thin plate portion 721. The pair of projections 724 are apart from each other in the front-rear direction, and each projection 724 has a projecting thread shape extending in the up-down direction. That is, a leftmost portion of each projection 724 extends parallel to the up-down direction. The recess 725 is formed between the pair of projections 724. The recess 725 has a shape similar to a side surface of a cylinder whose generatrix extends in the up-down direction.

With reference to FIG. 13, the holding member 710 includes, in a lower portion thereof, a thin plate portion 711, an opening 712, a pair of cutouts 713, a flat portion 714, a recess 715, and a step 716.

The thin plate portion 711 is thinner in the left-right direction than an upper portion of the holding member 710. The thickness of the thin plate portion 711 in the left-right direction is several millimeters, for example, and is the same as the thickness of the thin plate portion 721. The opening 712 is formed in the thin plate portion 711 so as to penetrate the thin plate portion 711 in the left-right direction. The pair of cutouts 713 are formed at a front end side surface and a rear end side surface of a lower end of the holding member 710, respectively, and are sloped with respect to the up-down direction so as to gradually approach each other in the downward direction. Furthermore, as shown in FIG. 15, a cutout 717 is formed at a left side surface of the lower end of the holding member 710. The cutout 717 is sloped with respect to the up-down direction so as to gradually approach an inner surface in the downward direction.

The flat portion 714 is positioned below the opening 712, and is formed at a right side surface of a lower end of the thin plate portion 711. The flat portion 714 is parallel to a plane formed by the front-rear direction and the up-down direction. The recess 715 is formed between the opening 712 and the flat portion 714. The recess 715 is parallel to the flat portion 714, and is positioned at a position shifted leftward from the flat portion 714. The step 716 is formed between the flat portion 714 and the recess 715, and is parallel to a plane (horizontal plane) formed by the front-rear direction and the left-right direction.

Figure 14:
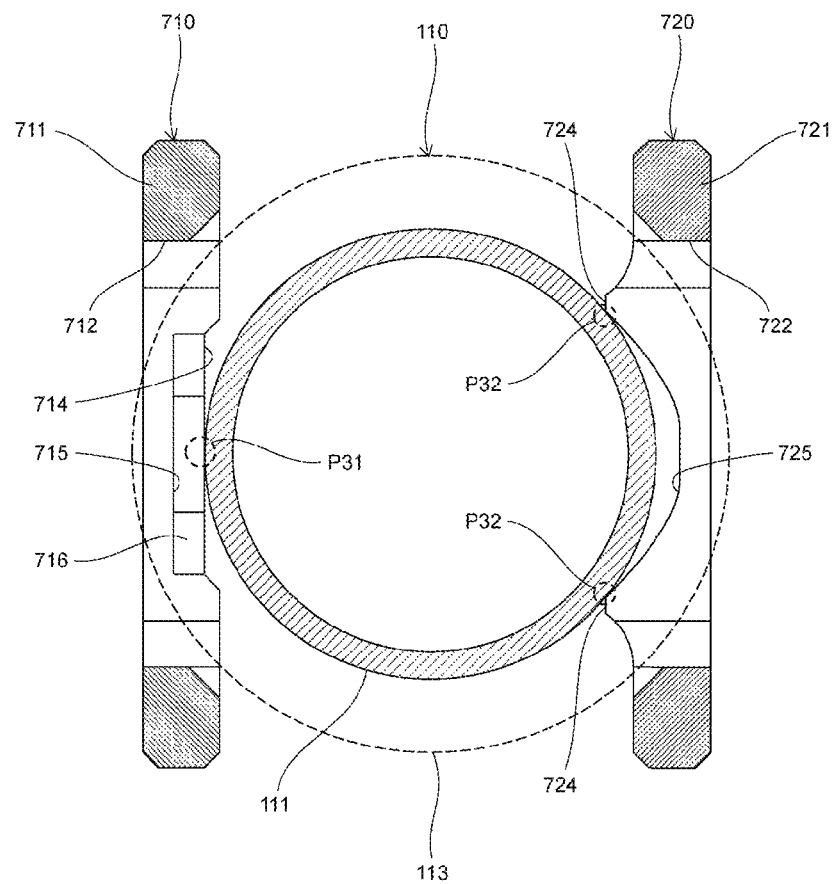
FIG. 14 is a plan view schematically showing a state where the holding section holds a container, according to the embodiment.

FIG. 14 is a plan view schematically showing a state where the holding members 710, 720 hold a container 110.

FIG. 14 shows cross sections of the holding members 710, 720, taken along a plane parallel to a horizontal plane that passes the openings 712, 722. FIG. 14 also shows a cross section of the container 110, taken along a plane parallel to a horizontal plane that passes a position where the trunk portion 111 of the container 110 is in contact with the holding members 710, 720. For convenience sake, the lid portion 113 of the container 110 is indicated by a broken line.

When the holding members 710, 720 hold the container 110, the holding members 710, 720 sandwich an upper end and its vicinity of the trunk portion 111 of the container 110 from the left and right sides. At this time, a left end of the trunk portion 111 is supported at a point on a boundary between the flat portion 714 and the step 716, and a right end and its vicinity of the trunk portion 111 is linearly supported by the projecting thread shape, of the projection 724, extending in the up-down direction.

In the state where the container 110 is being held, the lid portion 113 of the container 110 is stored in the openings 712, 722. Thus, when the lid portion 113 having a larger diameter than the trunk portion 111 is stored in the openings 712, 722, the width from the left side surface of the holding member 710 to the right side surface of the holding member 720 can be reduced.

Figure 15:
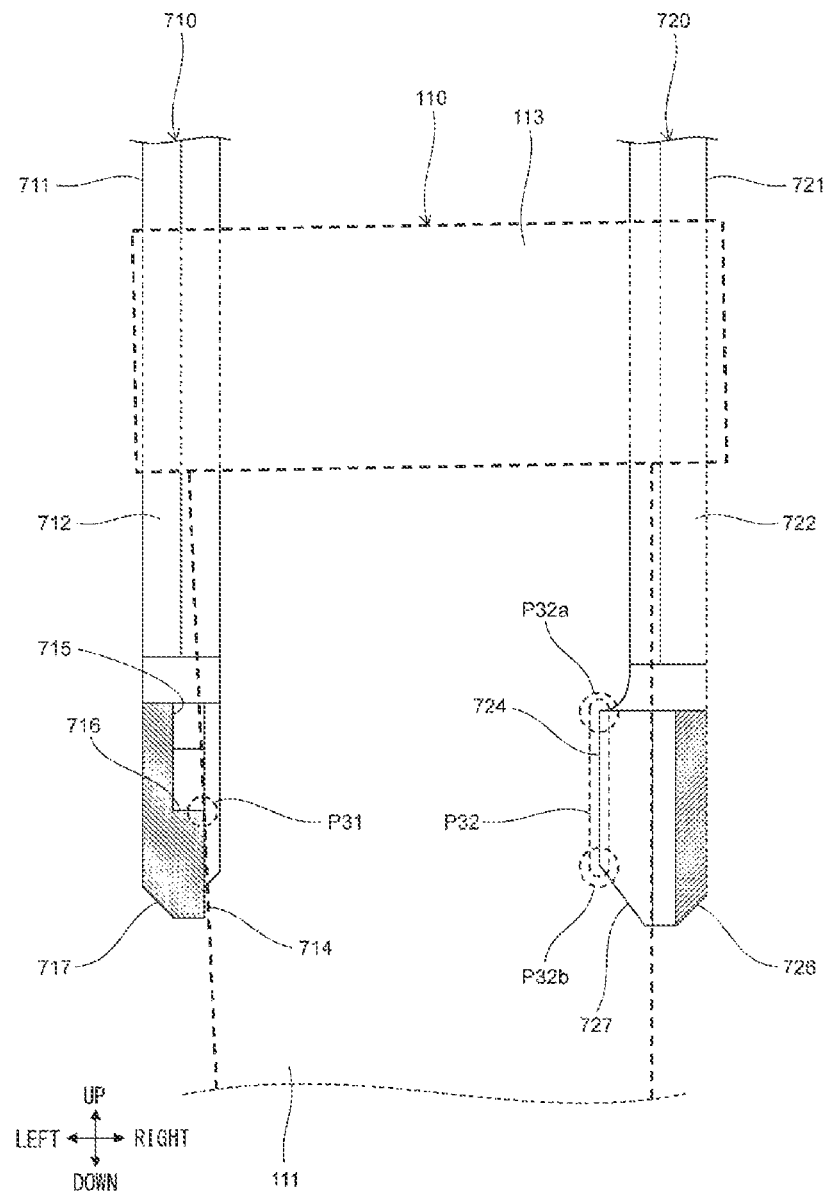
FIG. 15 is a side view schematically showing the state where the holding section holds a container, according to the embodiment.

FIG. 15 is a side view schematically showing a state where the holding members 710, 720 hold a container 110.

FIG. 15 shows cross sections of the holding members 710, 720, taken along a plane that passes a center position in the front-rear direction of the holding members 710, 720 and is parallel to the up-down and left-right directions. In FIG. 15, the shape of the container 110, taken along the plane that passes the center position in the front-rear direction of the holding members 710, 720 and is parallel to the up-down and left-right directions, is indicated by a broken line.

The trunk portion 111 of the container 110 shown in FIG. 15 has a diameter that is slightly reduced gradually in the downward direction. In the case where the diameter of the container 110 is gradually reduced in the downward direction, if it is tried to hold the container 110 only by lines or planes parallel to the up-down direction, it is difficult to appropriately hold the container 110 so as not to move. Meanwhile, in the embodiment, the step 716 is disposed between the flat portion 714 and the recess 715 on the holding member 710 side, and the pair of projections 724 having the projecting thread shape extending in the up-down direction are disposed on the holding member 720 side. Thus, the left side of the container 110 is supported at a position P31 on the boundary between the flat portion 714 and the step 716, and the right side of the container 110 is supported at positions P32 of the projections 724. The position P31 is a point, and the positions P32 are lines.

As shown in FIG. 14, in a plan view, a portion (corresponding to position P31), of the holding member 710, contacting the container 110 is positioned on a straight line that perpendicularly bisects a straight line connecting two portions (corresponding to positions P32), of the holding member 720, contacting the container 110. Thus, the container 110 can be stably held.

As shown in FIG. 15, in the up-down direction, the position P31 is positioned between an upper end P32a and a lower end P32b of the position P32. Thus, the container 110 held by the holding members 710, 720 can be inhibited from rotating around the front-rear direction.

Figure 16:
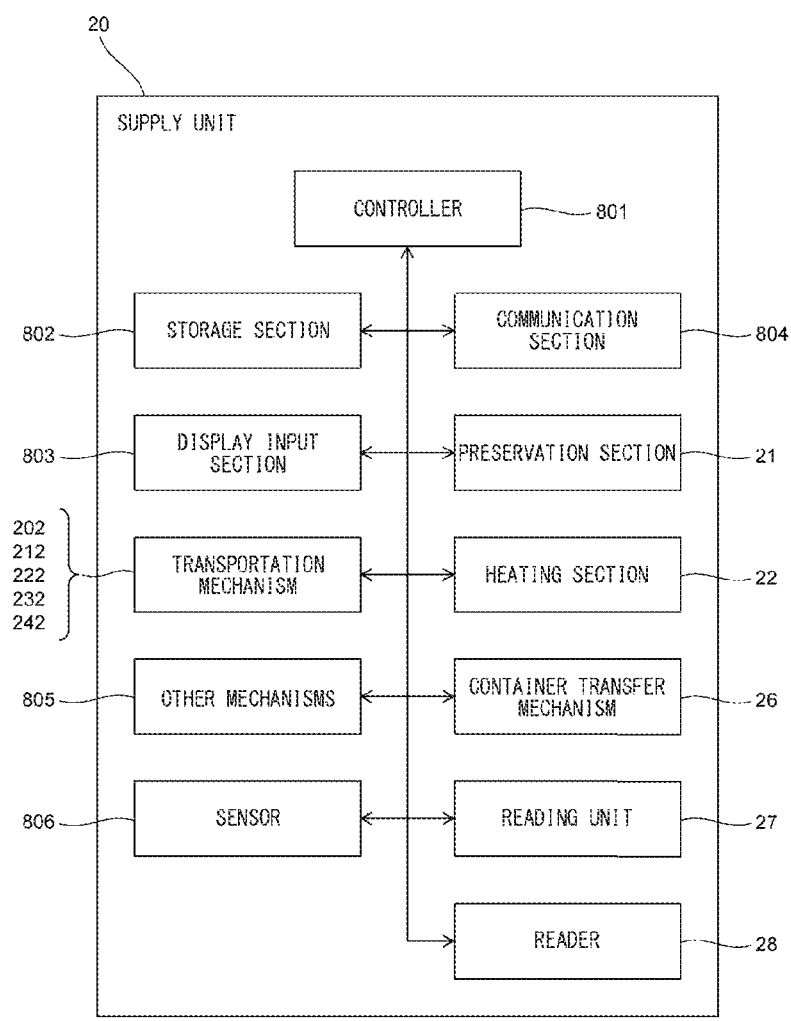
FIG. 16 is a block diagram showing a configuration of a supply unit according to the embodiment.

FIG. 16 is a block diagram showing a configuration of the supply unit 20.

The supply unit 20 includes a controller 801, a storage section 802, the display input section 803, a communication section 804, the transportation mechanisms 202, 212, 222, 232, and 242, other mechanisms 805, a sensor 806, the preservation section 21, the heating section 22, the container transfer mechanism 26, the reading unit 27, and the reader 28.

The controller 801 is, for example, implemented by a CPU. The controller 801 controls each component of hardware of the supply unit 20 by executing a computer program stored in the storage section 802. The storage section 802 is, for example, implemented by an SSD, an HDD, a RAM, or the like. The display input section 803 is, for example, implemented by a touch-panel type display. The display input section 803 may be configured so as to be divided into a display section such as a liquid crystal display and an organic EL display, and an input section such as a mouse and a keyboard. The communication section 804 is, for example, implemented by a network card and is connected to the transportation control unit 80 so as to be able to communicate therewith. Other mechanisms 805 include mechanisms for driving the conveyor belts in the supply unit 20. The sensor 806 includes a sensor for detecting a rack 100 in the supply unit 20.

Figure 17:
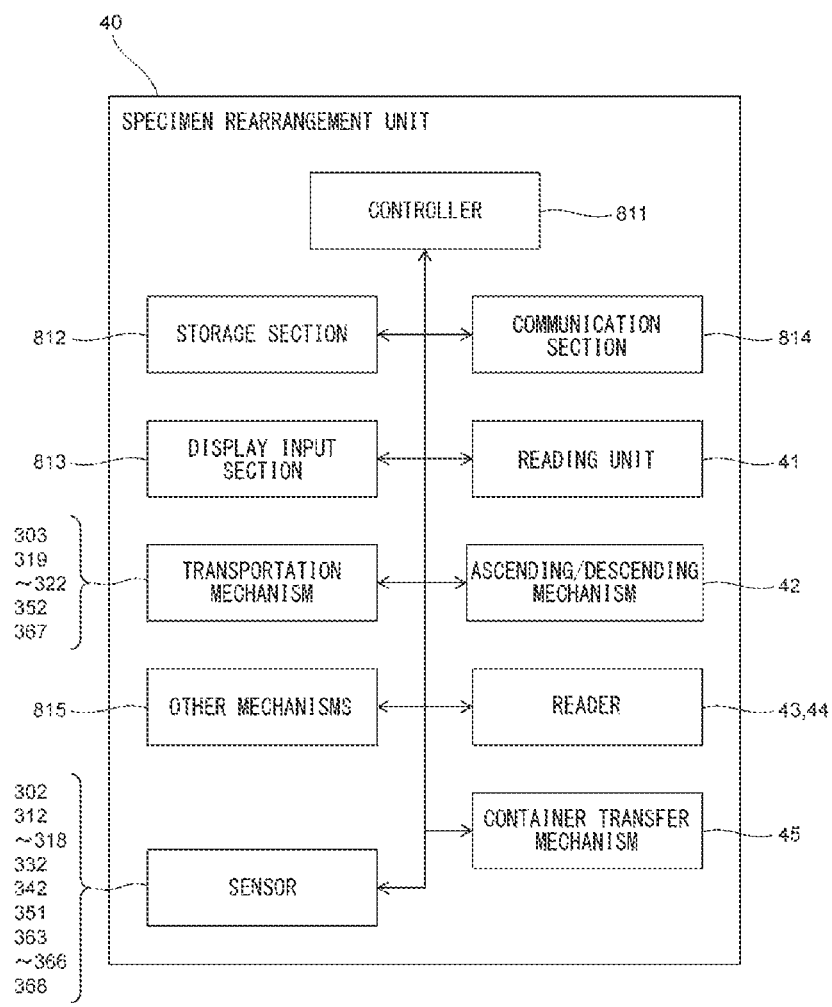
FIG. 17 is a block diagram showing a configuration of the specimen rearrangement unit according to the embodiment.

FIG. 17 is a block diagram illustrating the configuration of the specimen rearrangement unit 40.

The specimen rearrangement unit 40 includes a controller 811, a storage section 812, the display input section 813, a communication section 814, the transportation mechanisms 303, 319 to 322, 352, 367, other mechanisms 815, the sensors 302, 312 to 318, 332, 342, 351, 363 to 366, 368, the reading unit 41, the ascending/descending mechanism 42, the readers 43, 44, and the container transfer mechanism 45.

The controller 811 is, for example, implemented by a CPU. The controller 811 controls each component of hardware of the specimen rearrangement unit 40 by executing a computer program stored in the storage section 812. The storage section 812 is, for example, implemented by an SSD, an HDD, a RAM, or the like. The display input section 813 is, for example, implemented by a touch-panel-type display. The display input section 813 may be configured so as to be divided into a display section such as a liquid crystal display and an organic EL display, and an input section such as a mouse and a keyboard. The communication section 814 is, for example, implemented by a network card, and is connected to the transportation control unit 80 so as to be able to communicate therewith. Other mechanisms 815 include mechanisms for driving the conveyor belts in the specimen rearrangement unit 40, and mechanisms for driving the stopper 369.

Figure 18:
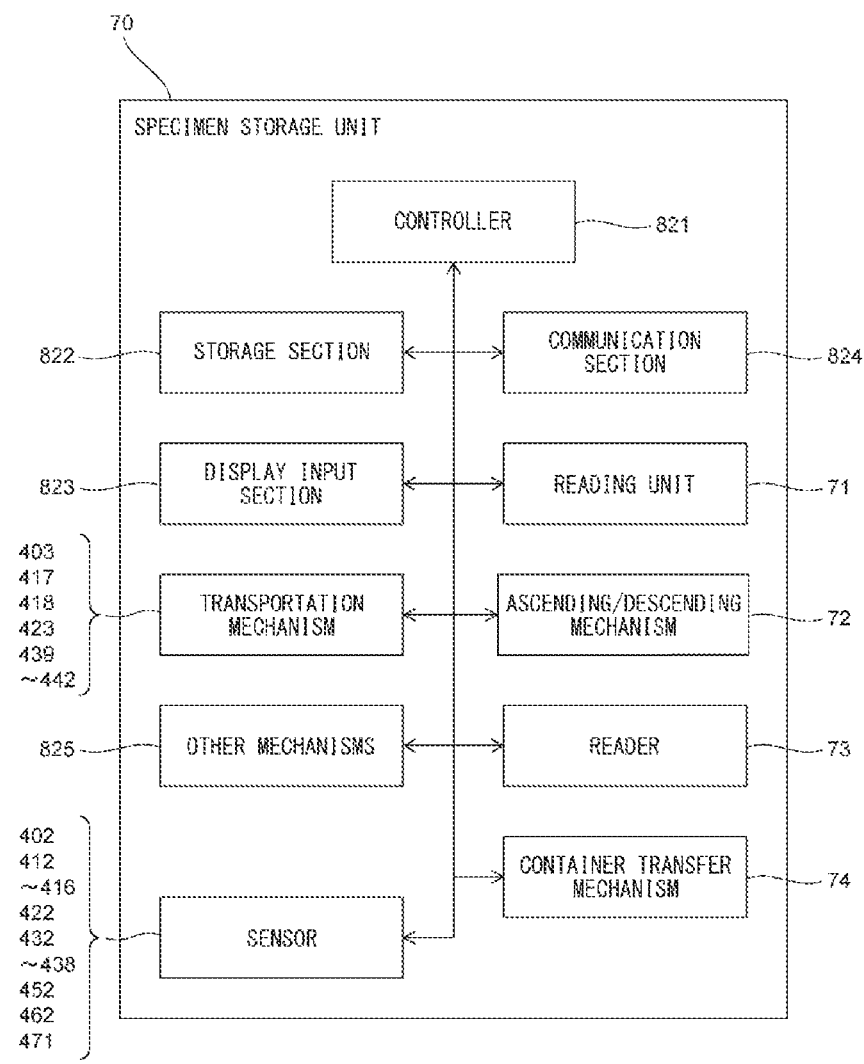
FIG. 18 is a block diagram showing a configuration of the specimen storage unit according to the embodiment.

FIG. 18 is a block diagram illustrating a configuration of the specimen storage unit 70.

The specimen storage unit 70 includes a controller 821, a storage section 822, a display input section 823, a communication section 824, the transportation mechanisms 403, 417, 418, 423, 439 to 442, other mechanisms 825, sensors 402, 412 to 416, 422, 432 to 438, 452, 462, 471, the reading unit 41, the ascending/descending mechanism 72, the reader 73, and the container transfer mechanism 74.

The controller 821 is, for example, implemented by a CPU. The controller 821 controls each component of hardware of the specimen storage unit 70 by executing a computer program stored in the storage section 822. The storage section 822 is, for example, implemented by an SSD, an HDD, a RAM, or the like. The display input section 823 is, for example, implemented by a touch-panel-type display. The display input section 823 may be configured so as to be divided into a display section such as a liquid crystal display and an organic EL display, and an input section such as a mouse and a keyboard. The communication section 824 is, for example, implemented by a network card, and is connected to the transportation control unit 80 so as to be able to communicate therewith. Other mechanisms 825 include mechanisms for driving the conveyor belts in the specimen storage unit 70.

Meanwhile, in the specimen testing system 1, various types of containers 110 having different diameters are used. In this case, a container 110 having a small diameter is likely to be tilted when being held in a hole formed in a rack. If the holding members 710, 720 move downward from above the container 110 to take out the container 110 in this state from the rack, the lower ends of the holding members 710, 720 may collide with the upper portion of the container 110. If the holding members 710, 720 are opened wider and moved downward in order to avoid such a collision, the lower ends of the holding members 710, 720 may collide with other containers adjacent to the container 110. This problem becomes more apparent when the containers 110 are held as close to each other as possible in the rack in order to reduce the installation area of the apparatus.

Meanwhile, in the embodiment, the holding members 710, 720 in the opened state are moved downward to a position where no container 110 is held. Examples of the "position where no container 110 is held" include: a position outside the rack in a plan view; a position between two adjacent holes on the rack; the position of a hole, on the rack, where no container 110 is held; a position between an outermost hole on the rack and an outer edge of the rack in a plan view; and a position on the outer edge of the rack. That is, the "position where no container 110 is held" is a position different from a position, on the rack, where a container 110 is held. Thus, the lower ends of the holding members 710, 720 are positioned at a position lower than a head portion (lid portion 113) of the container 110 held in the rack.

Then, the holding members 710, 720 in the opened state are horizontally moved toward a target container 110. Thereafter, the target container 110 is held by the holding members 710, 720 being closed, and furthermore, the target container 110 is taken out by the holding members 710, 720 being moved upward. Thus, the target container 110 can be smoothly taken out.

The holding members 710, 720 may not necessarily be in the opened state when being moved downward. That is, the holding members 710, 720 in the closed state may be moved downward, and thereafter, may be opened and horizontally moved.

With reference to FIGS. 19 to 30, outlines of an operation of taking out a container 110 and an operation of storing a container 110 will be described. In FIGS. 19 to 30, for convenience sake, a buffer rack 120 is used as an example of a rack that holds a plurality of containers 110.

Figure 19:
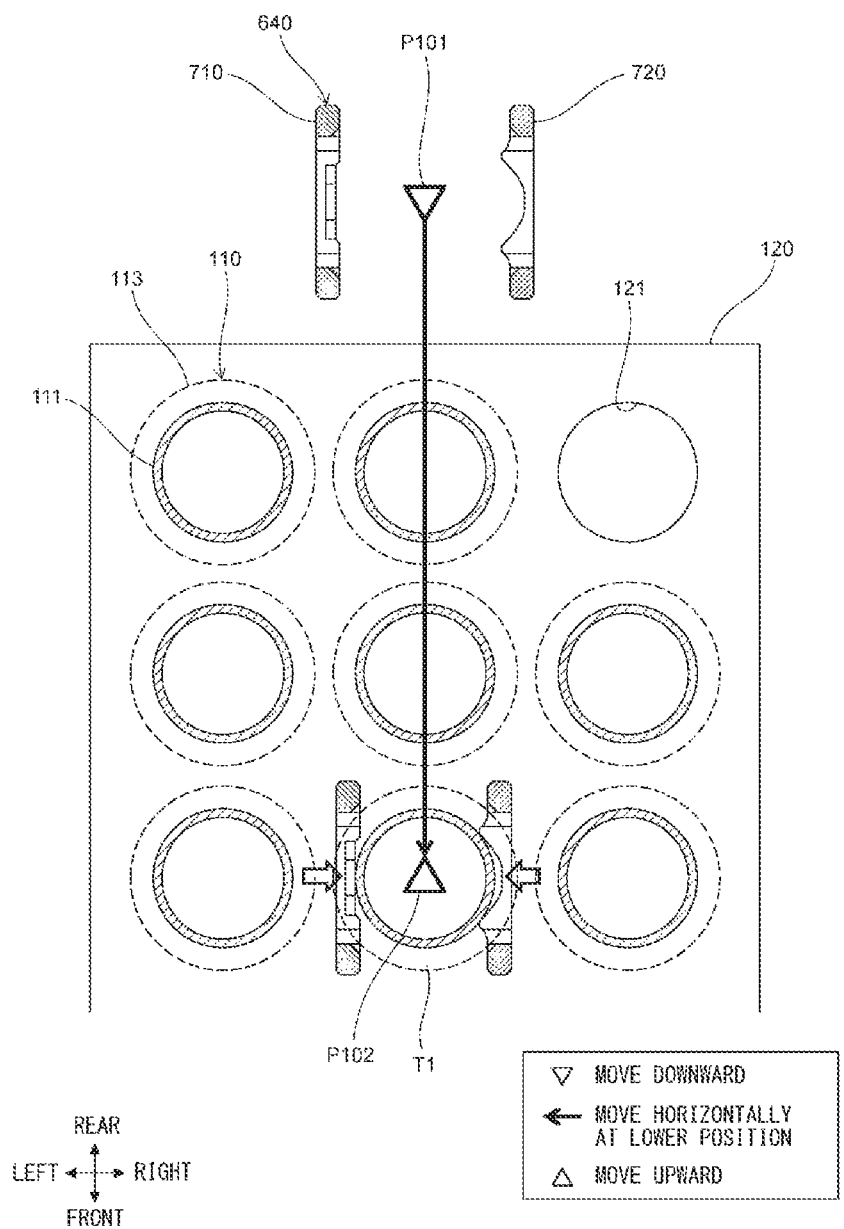
FIG. 19 is a plan view schematically showing an example in which the holding section is moved downward to a position outside a rack in a plan view, according to the embodiment.

FIG. 19 is a plan view schematically showing an example in which the holding section 640 is moved downward to a position outside the buffer rack 120 in a plan view. FIGS. 20, 21 are side views each schematically showing the example in which the holding section 640 is moved downward to the position outside the buffer rack 120 in a plan view.

In FIGS. 19 to 21, a container 110 to be taken out is a container T1. The center position of the holding section 640 and the holding members 710, 720 in a plan view is hereinafter referred to as the position of the holding section 640 and the holding members 710, 720. Furthermore, in FIG. 19, in the operation of taking out the container 110, a position at which the holding section 640 is moved downward is represented by a downward-facing triangle, a direction in which the holding section 640 is horizontally moved at the lower position is represented by a thick arrow, and a position at which the holding section 640 holding the container 110 is moved upward is represented by an upward-facing triangle.

In the example shown in FIGS. 19 to 21, firstly, a lower end 640a of the holding section 640 is positioned above an upper end of the container T1, and furthermore, the holding section 640 is positioned to the rear of the center position of the container T1 and outside the buffer rack 120 in a plan view. Thus, the holding section 640 is positioned at a position P101, as shown in FIG. 19 and "position M11 in taking-out operation" in FIG. 20. Subsequently, the holding section 640 is moved downward at the position P101, as shown in FIG. 19 and "position M12 in taking-out operation" in FIG. 20.

Subsequently, the holding section 640 is horizontally moved forward and is positioned at a position P102 corresponding to the center position of the container T1, as shown in FIG. 19 and "position M13 in taking-out operation" in FIG. 21. Subsequently, as shown in FIG. 19, the holding members 710, 720 are closed and the container T1 is held by the holding members 710, 720 at the position P102. Then, the holding members 710, 720 are moved upward such that the lower end 640a of the container T1 is positioned at a position higher than the lid portions 113 of the other containers 110 held in the buffer rack 120, as shown in FIG. 19 and "position M14 in taking-out operation" in FIG. 21. Thus, the taking-out operation for the container T1 is completed.

When the container T1 held by the holding section 640 is stored in a hole 121 of the buffer rack 120, an operation reverse to the above taking-out operation is performed. That is, the holding section 640 holding the container T1 is positioned above the position P102. Subsequently, the holding section 640 is moved downward, and the holding section 640 is opened, whereby the container T1 is stored in the hole 121. Subsequently, the holding section 640 in the opened state is positioned at the position P101 outside the buffer rack 120 in a plan view. Then, the holding section 640 is moved upward. Thus, the storage operation for the container T1 is completed.

Figure 22:
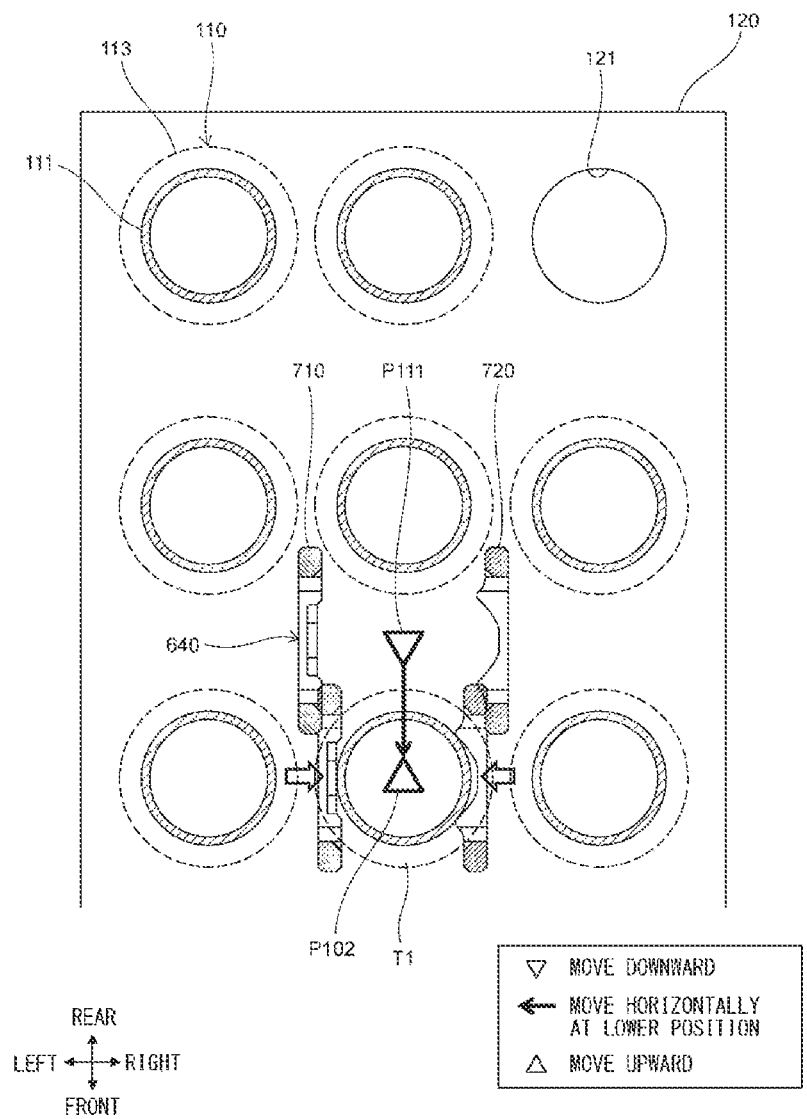
FIG. 22 is a plan view schematically showing an example in which the holding section is moved downward to a position between two adjacent holes on the rack, according to the embodiment.

FIG. 22 is a plan view schematically showing an example in which the holding section 640 is moved downward to a position between two adjacent holes 121 on the buffer rack 120.

In the buffer rack 120 shown in FIG. 22, the distance between holes in the front-rear direction is wider than that in the buffer rack 120 shown in FIG. 19. Therefore, when the taking-out operation is performed, the holding section 640 may be moved downward at a position P111 between two holes 121 adjacent in the front-rear direction on the buffer rack 120 as shown in FIG. 22, instead of being moved downward at the position outside the buffer rack 120 as shown in FIGS. 19 to 21. Also, in this case, the subsequent taking-out operation is similar to that described with reference to FIGS. 19 to 21. When the container T1 is stored by the holding section 640, an operation reverse to the taking-out operation is performed.

In the taking-out operation, the holding section 640 is preferably moved downward at a wider position, out of positions between two holes 121 adjacent in the front-rear direction on the buffer rack 120.

Figure 23:
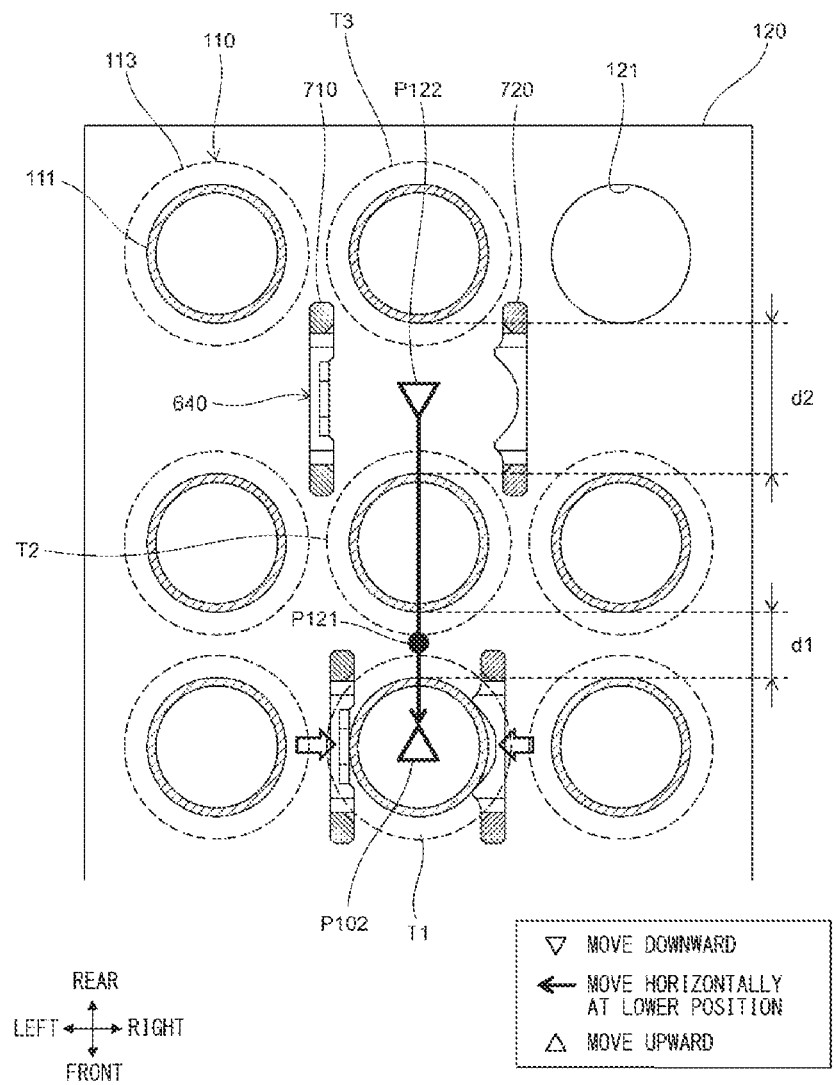
FIG. 23 is a plan view schematically showing an example in which the holding section is moved downward to a wider position, out of positions between two adjacent holes on the rack, according to the embodiment.

FIG. 23 is a plan view schematically showing an example in which the holding section 640 is moved downward to a wider position, out of positions between two adjacent holes 121 on the buffer rack 120.

A container T2 is held in a hole 121 positioned to the rear of the container T1, and a container T3 is held in a hole 121 positioned to the rear of the container T2. In the example shown in FIG. 23, a distance between the hole 121 holding the container T1 and the hole 121 holding the container T2 is d1 while a distance between the hole 121 holding the container T2 and the hole 121 holding the container T3 is d2 that is larger than d1. In this case, the holding section 640 is moved downward not at a position P121 between the hole 121 holding the container T1 and the hole 121 holding the container T2 but at a position P122 between the hole 121 holding the container T2 and the hole 121 holding the container T3. Thus, the holding section 640 can be smoothly moved downward. Also, in this case, the subsequent taking-out operation is similar to that described with reference to FIGS. 19 to 21. When the container T1 is stored by the holding section 640, an operation reverse to the taking-out operation is performed.

The position at which the holding members 710, 720 are moved downward in the taking-out operation may be the position of a hole 121, on the buffer rack 120, where no container 110 is held.

Figure 24:
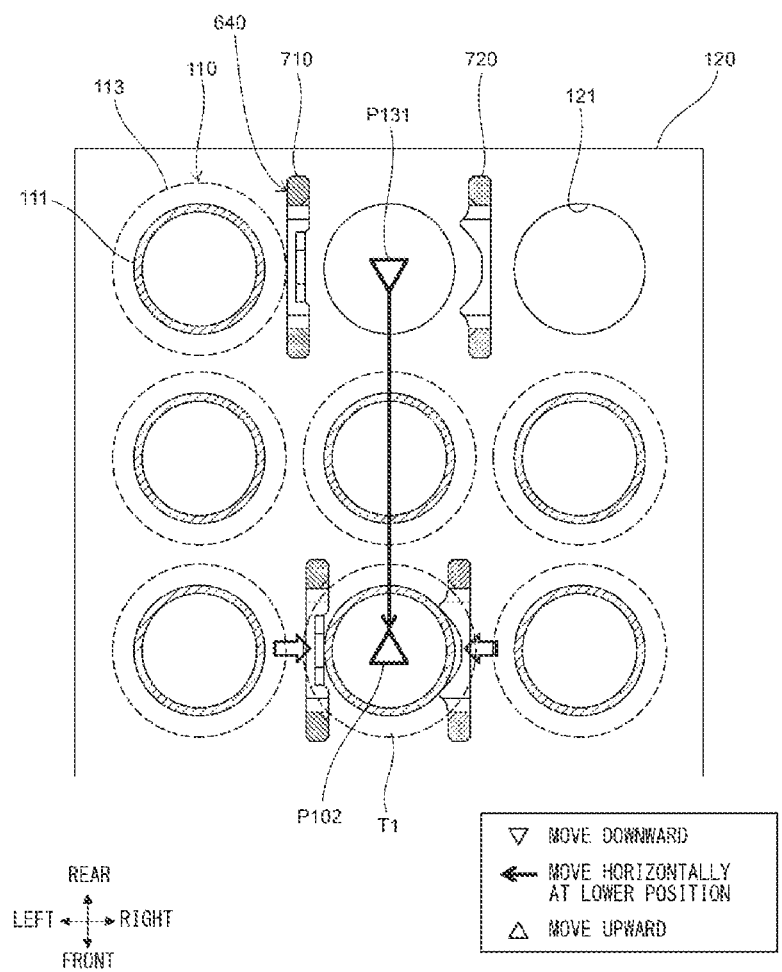
FIG. 24 is a plan view schematically showing an example in which the holding section is moved downward to the position of a hole, on the rack, where no container is held, according to the embodiment.

FIG. 24 is a plan view schematically showing an example in which the holding section 640 is moved downward to the position of a hole 121, on the buffer rack 120, where no container 110 is held.

In the example shown in FIG. 24, no container 110 is held in a hole 121 at a position P131, and the holding section 640 is moved downward at the position P131. In this case, since there is no container 110 at the position P131, the holding section 640 can be smoothly moved downward at the position P131. Also, in this case, the subsequent taking-out operation is similar to that described with reference to FIGS. 19 to 21. When the container T1 is stored by the holding section 640, an operation reverse to the taking-out operation is performed.

In the storage operation for the container T1, as shown in FIG. 22, after the container T1 is stored at the position P102, the holding section 640 in the opened state is horizontally moved to the position P111 and is moved upward at the position P111. In this case, a part of the container T1 may sometimes be caught by the holding members 710, 720, and the container T1 may be unintentionally taken out from the hole 121. In this case, such unintended taking-out of the container T1 can be inhibited by changing the upward movement of the holding section 640 in the opened state, as follows.

FIGS. 25 to 27 are side views each schematically showing an example in which the holding section 640 is moved upward in a stepwise manner at the time of storage.

In the example shown in FIGS. 25 to 27, the container 110 is a container having a label 113a attached to a lid portion 113 thereof. As shown by "position M21 in storage operation" in FIG. 25, after the container T1 is stored in the hole 121, the holding section 640 is opened. Subsequently, as shown by "position M22 in storage operation" in FIG. 25, the holding section 640 is moved to a position between adjacent holes 121. Then, as shown by "position M23 in storage operation" in FIG. 26, the holding section 640 is moved upward. At this time, the label 113a of the lid portion 113 may sometimes be caught by the openings 712, 722 of the holding section 640 (see FIG. 12). In this state, if the holding section 640 is further moved upward, the container T1 may be unintentionally taken out from the hole 121.

Meanwhile, in the embodiment, firstly, as shown by "position M23 in storage operation" in FIG. 26, the holding section 640 is moved upward by a distance d11 smaller than a depth d12 of the hole 121 to a position higher than the container 110. The distance d11 is about ⅓ of the entire length in the height direction of the container 110, for example. Thus, when the label 113a of the container T1 is caught by the holding section 640, the holding section 640 is lifted upward to such an extent that the container T1 is not taken out.

Subsequently, as shown by "position M24 in storage operation" in FIG. 26, the holding section 640 is slightly moved to the rear (in a direction away from the container T1). Thus, as shown by a dotted arrow, the container T1 is removed from the holding section 640 and is stored in the original hole 121. Thereafter, as shown by "position M25 in storage operation" in FIG. 27, the holding section 640 is moved upward. In FIG. 27, the trajectory of the lower end 640a of the holding section 640 at the positions M21 to M25 during the storage operation is shown by a dotted line. Thus, the stepwise upward movement of the holding section 640 prevents the container T1 from being unintentionally taken out.

Figure 28:
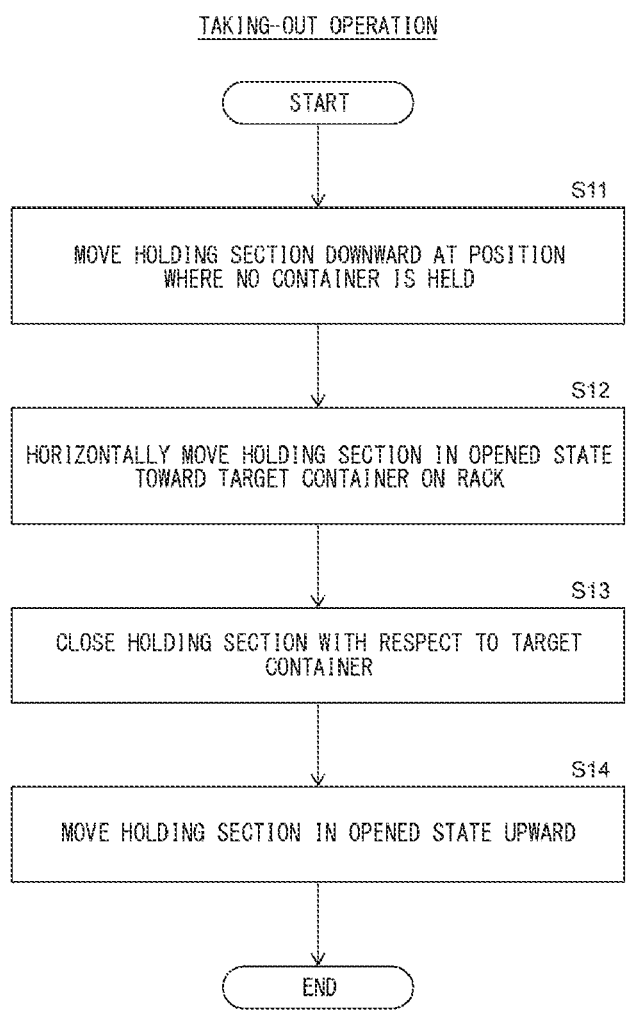
FIG. 28 is a flowchart showing a process of a taking-out operation, according to the embodiment.
Figure 29:
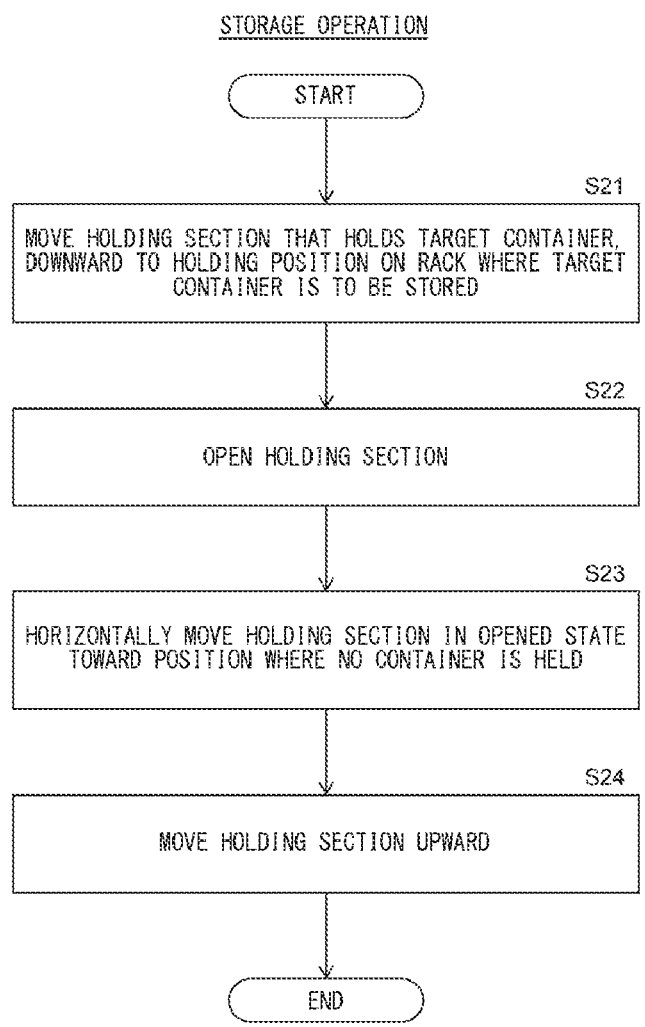
FIG. 29 is a flowchart showing a process of a storage operation, according to the embodiment.
Figure 30:
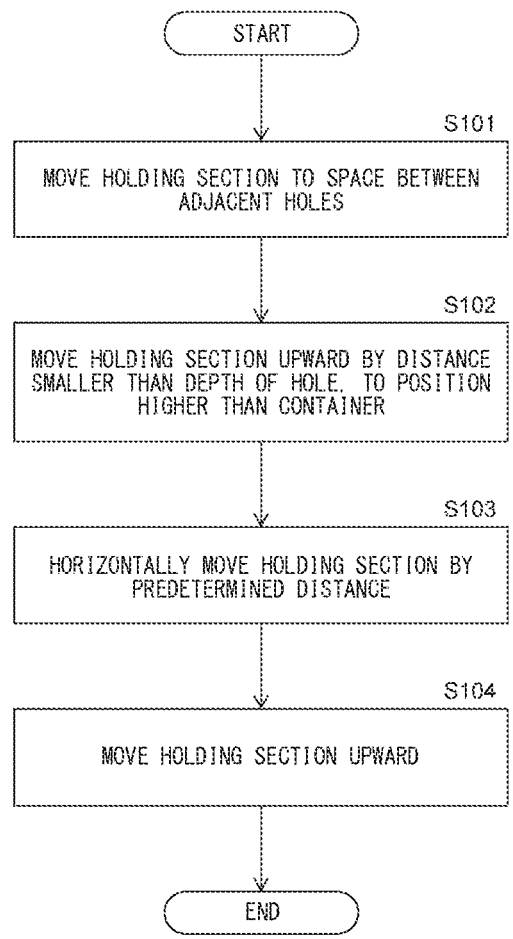
FIG. 30 is a flowchart showing a process of moving the holding section upward in the storage operation, according to the embodiment.

With reference to FIGS. 28 to 30, processes of the taking-out operation and the storage operation will be described.

In the embodiment, the controller 801 of the supply unit 20 controls the container transfer mechanism 26 to perform taking-out and storage of a container 110. The controller 811 of the specimen rearrangement unit 40 controls the container transfer mechanism 45 to perform taking-out and storage of a container 110. The controller 821 of the specimen storage unit 70 controls the container transfer mechanism 74 to perform taking-out and storage of a container 110.

Hereinafter, for convenience sake, a process performed by the controller 811 of the specimen rearrangement unit 40 will be described. However, the other controllers 801, 821 also perform the same process. A container 110 to be taken out and a container 110 to be stored are each referred to as a container T1.

FIG. 28 is a flowchart showing a process of the taking-out operation.

In step S11, the controller 811 of the specimen rearrangement unit 40 controls the container transfer mechanism 45 such that the holding section 640 is moved downward to a position lower than the head portion (lid portion 113) of the container 110, at a position where no container 110 is held in a plan view. Thus, the holding section 640 is moved downward at the position P101 in FIG. 19, the position P111 in FIG. 22, the position P122 in FIG. 23, or the position P131 in FIG. 24, for example. In step S12, the controller 811 controls the container transfer mechanism 45 such that the holding section 640 in the opened state is horizontally moved toward the target container T1 on the buffer rack 120. Thus, the holding section 640 is horizontally moved to the position P102 shown in any of FIGS. 19, 22 to 24, for example.

In step S13, the controller 811 controls the container transfer mechanism 45 such that the holding section 640 is closed with respect to the target container T1. Thus, the holding section 640 holds the container T1. In step S14, the controller 811 controls the container transfer mechanism 45 such that the holding section 640 that is closed and holds the container T1 is moved upward. Thus, the process of the taking-out operation is ended.

FIG. 29 is a flowchart showing a process of the storage operation.

In step S21, the controller 811 of the specimen rearrangement unit 40 controls the container transfer mechanism 45 such that the holding section 640 holding the target container T1 is moved downward to a holding position on the buffer rack 120 where the container T1 is to be stored. Thus, the holding section 640 holding the container T1 is moved downward at the position P102 shown in any of FIGS. 19, 22 to 24, for example. In step S22, the controller 811 controls the container transfer mechanism 45 such that the holding section 640 is opened. Thus, the container T1 is stored in a target hole 121.

In step S23, the controller 811 controls the container transfer mechanism 45 such that the holding section 640 in the opened state is horizontally moved toward a position where no container 110 is held. Thus, the holding section 640 is horizontally moved to the position P101 in FIG. 19, the position P111 in FIG. 22, the position P122 in FIG. 23, or the position P131 in FIG. 24, for example. In step S24, the controller 811 controls the container transfer mechanism 45 such that the holding section 640 is moved upward. Thus, the process of the storage operation is ended.

Before and after the operation shown in FIG. 28 or 29, the holding section 640, having been moved upward, is horizontally moved in the apparatus. The holding section 640 is controlled such that the speed at which the holding section 640 horizontally moves after having moved upward is higher than the speed at which holding section 640 horizontally moves after having moved downward in the taking-out operation and the storage operation.

As described with reference to FIGS. 25 to 27, in the storage operation, when the holding section 640 is moved upward from the position between the adjacent holes 121, the holding section 640 is preferably moved upward in a stepwise manner. A process in this case will be described with reference to FIG. 30.

FIG. 30 is a flowchart showing a process of moving the holding section 640 upward during the storage operation.

In step S101, the controller 811 of the specimen rearrangement unit 40 controls the container transfer mechanism 45 such that the holding section 640, which has stored the container T1 and has been opened, is moved to a position between adjacent holes 121. Thus, the holding section 640 is horizontally moved as shown by "position M22 in storage operation" in FIG. 25, for example. In step S102, the controller 811 controls the container transfer mechanism 45 to move the holding section 640 upward by a distance d11 smaller than a depth d12 of the hole 121 such that the lower end 640a of the holding section 640 becomes higher than the upper end of the container 110. Thus, the holding section 640 is moved upward as shown by "position M23 in storage operation" in FIG. 26, for example.

In step S103, the controller 811 controls the container transfer mechanism 45 such that the holding section 640 is horizontally moved by a predetermined distance. Thus, the holding section 640 is moved to the rear (in the direction away from the container T1) as shown by "position M24 in storage operation" in FIG. 26, for example. In step S104, the controller 811 controls the container transfer mechanism 45 such that the holding section 640 is moved upward. Thus, the holding section 640 is moved upward as shown by "position M25 in storage operation" in FIG. 27, for example.

Next, how the holding section 640 is actually operated in the supply unit 20, the specimen rearrangement unit 40, and the specimen storage unit 70 will be described with reference to FIGS. 31 to 34.

In FIGS. 31 to 34, in the taking-out operation, a position at which the holding section 640 is moved downward is a position represented by a downward-facing triangle, a direction in which the holding section 640 is horizontally moved at the lower position is a direction represented by a thick arrow, and a position at which the holding section 640 holding the container 110 is moved upward is a position represented by an upward-facing triangle. In the storage operation, a position at which the holding section 640 holding the container 110 is moved downward is a position represented by an upward-facing triangle, a direction in which the holding section 640 is horizontally moved at the lower position after storage is a direction opposite to the thick arrow, and a position at which the holding section 640 is moved upward is a position represented by a downward-facing triangle.

The taking-out operation is performed according to FIG. 28. The storage operation is performed according to FIG. 29. The process shown in FIG. 30 is performed in the storage operation of the specimen rearrangement unit 40.

Figure 31:
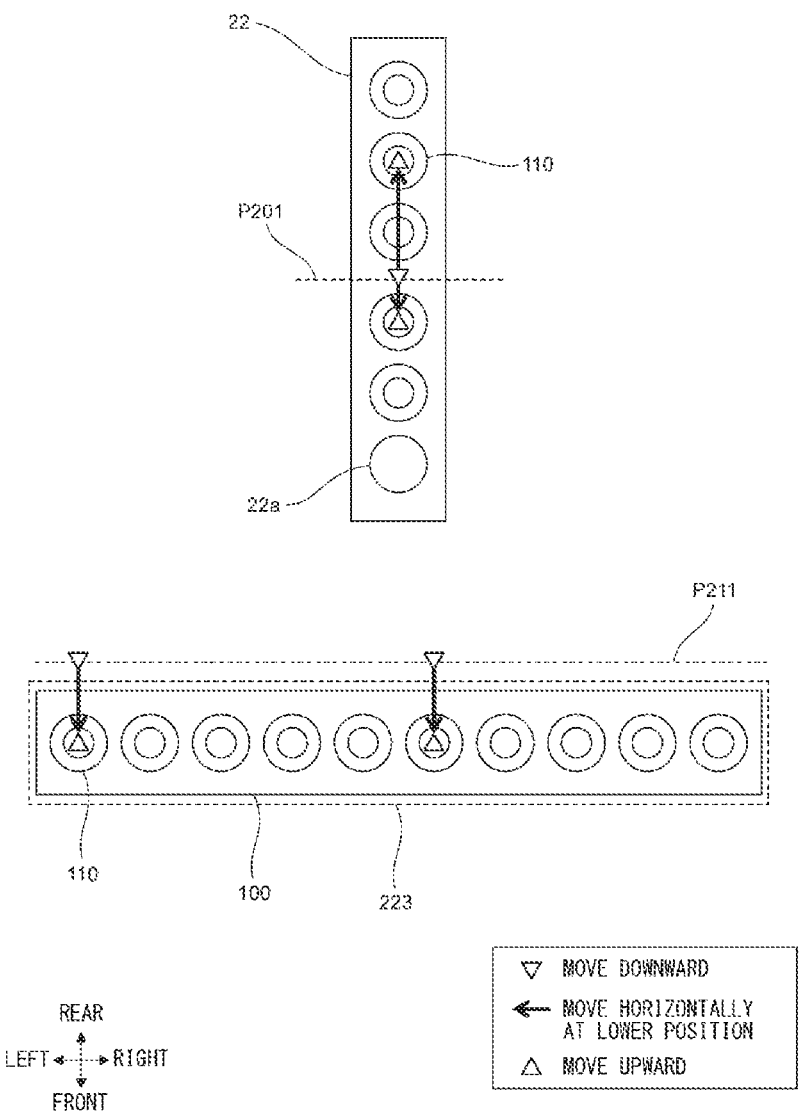
FIG. 31 schematically shows a transfer operation for a container that is performed between a heating section and a rack at a transfer position, in a supply unit, according to the embodiment.

FIG. 31 schematically shows a transfer operation for a container 110 that is performed between the heating section 22 and the rack 100 at the transfer position 223, in the supply unit 20.

In the heating section 22, the distance between the holes 22a at a center position P201 in the front-rear direction of the heating section 22 is wider than that at the other positions. Therefore, in the taking-out operation for the container 110 held in the heating section 22, the holding section 640 is moved downward at the center position P201. Thereafter, the holding section 640 is horizontally moved to the target container 110, and takes out the container 110 upward.

In the taking-out operation for the container 110 held in the rack 100 at the transfer position 223, the holding section 640 is moved downward at a position P211 at the rear of the rack 100. Thereafter, the holding section 640 is horizontally moved forward to the target container 110, and takes out the container 110 upward.

Figure 32:
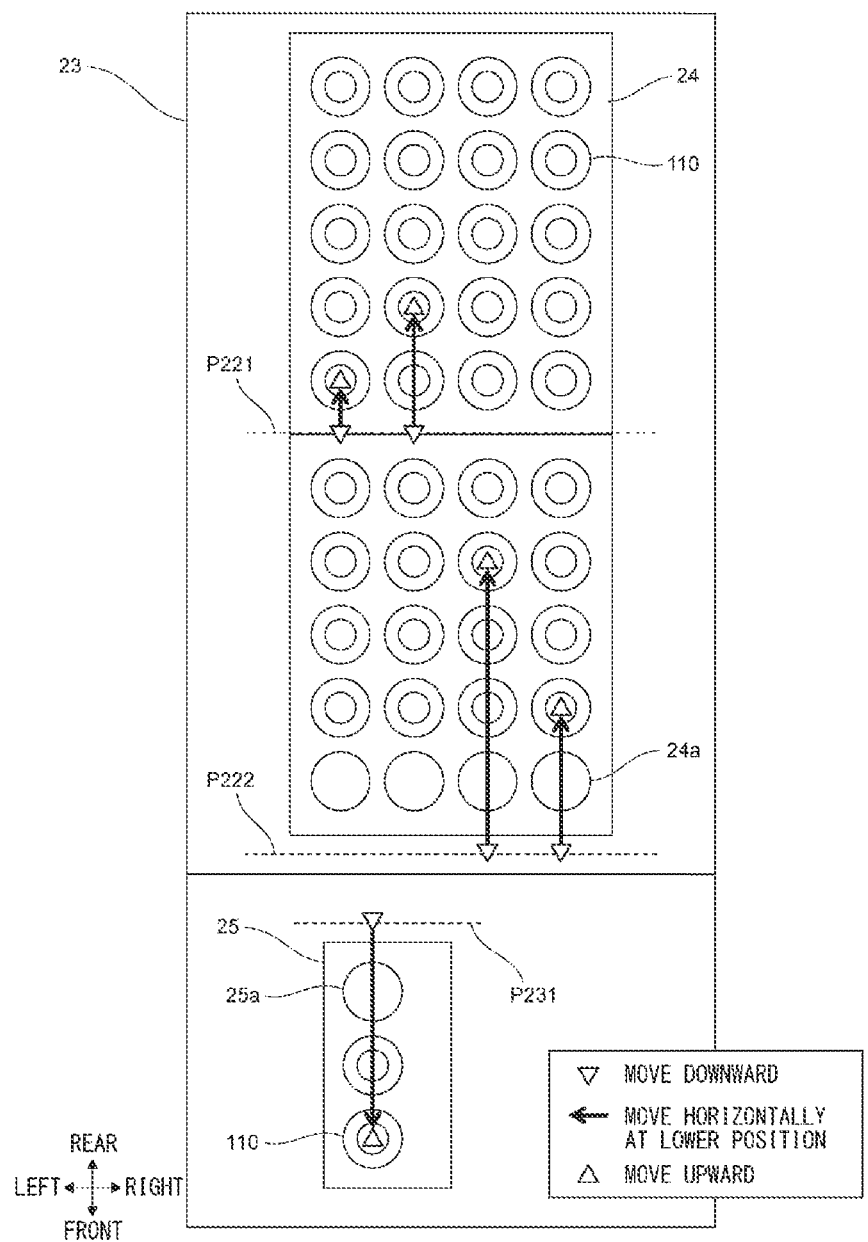
FIG. 32 schematically shows a transfer operation for a container that is performed on a washing liquid rack and a quality control specimen rack, in the supply unit, according to the embodiment.

FIG. 32 schematically shows a transfer operation for a container 110 that is performed on a washing liquid rack 24 and a quality control specimen rack 25 in the supply unit 20.

In the washing liquid rack 24, the distance between holes 24a at a center position P221 in the front-rear direction is wider than that at the other positions, and there is a wide space at a front position P222 of the washing liquid rack 24. Therefore, in the taking-out operation for the container 110 held in the washing liquid rack 24, when the target container 110 is positioned on the rear side of the washing liquid rack 24, the holding section 640 is moved downward at the center position P221, and when the target container 110 is positioned on the front side of the washing liquid rack 24, the holding section 640 is moved downward at the front position P222. Thereafter, the holding section 640 is horizontally moved to the target container 110, and takes out the container 110 upward.

In the taking-out operation for the container 110 held in the quality control specimen rack 25, the holding section 640 is moved downward at a position P231 at the rear of the quality control specimen rack 25. Thereafter, the holding section 640 is horizontally moved forward to the target container 110, and takes out the container 110 upward.

Figure 33:
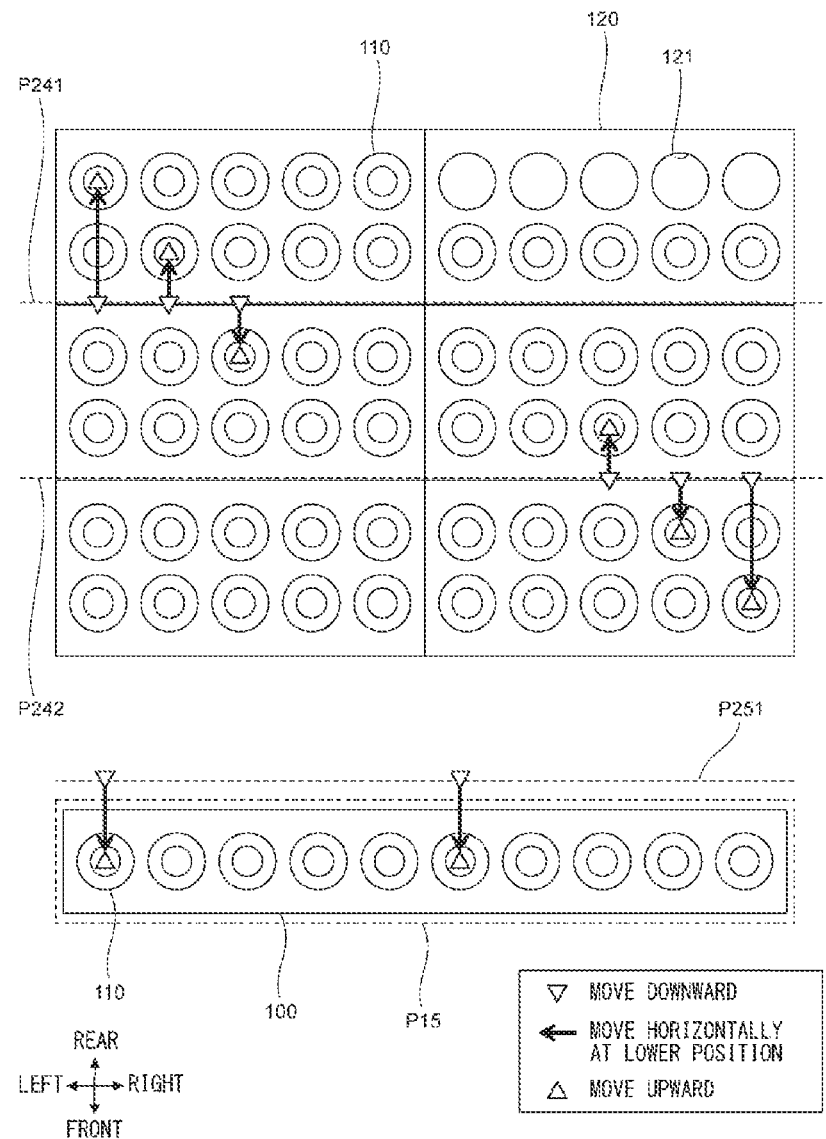
FIG. 33 schematically shows a transfer operation for a container that is performed between a buffer rack and a rack at an ascending/descending position, in a specimen rearrangement unit, according to the embodiment.

FIG. 33 schematically shows a transfer operation for a container 110 that is performed between the buffer rack 120 and the rack 100 at the ascending/descending position P15, in the specimen rearrangement unit 40.

When a position in which holes 121 are arranged in the left-right direction is referred to as a row, in the buffer rack 120, the distance between the holes 121 is wider in a position P241 between the second row and the third row from the rear side and a position P242 between the second row and the third row from the front side, than in the other positions. Therefore, in the taking-out operation for a container 110 held in the buffer rack 120, when the target container 110 is positioned on the rear side of the buffer rack 120, the holding section 640 is moved downward at the position P241, and when the target container 110 is positioned on the front side of the buffer rack 120, the holding section 640 is moved downward at the position P242. Thereafter, the holding section 640 is horizontally moved to the target container 110, and takes out the container 110 upward.

In the taking-out operation for a container 110 held in the rack 100 at the ascending/descending position P15, the holding section 640 is moved downward at a position P251 at the rear of the rack 100. Thereafter, the holding section 640 is horizontally moved forward to the target container 110, and takes out the container 110 upward.

In FIG. 33, in the storage operation for a container 110 into the buffer rack 120, the holding section 640 holding the container 110 is moved downward at a storage position, and the container 110 is stored. Thereafter, the holding section 640 is moved as shown in FIGS. 25 to 27. That is, the holding section 640 is moved to a position between the holes 121 positioned at the rear of the storage position, and the holding section 640 is moved rearward in a stepwise manner. Only when the container 110 is stored in the rearmost row, the holding section 640 is moved forward in a stepwise manner. Thus, in the case where another mechanism present around the rack makes the holding section 640 difficult to move, the direction in which the holding section 640 is horizontally moved is changed as appropriate.

Figure 34:
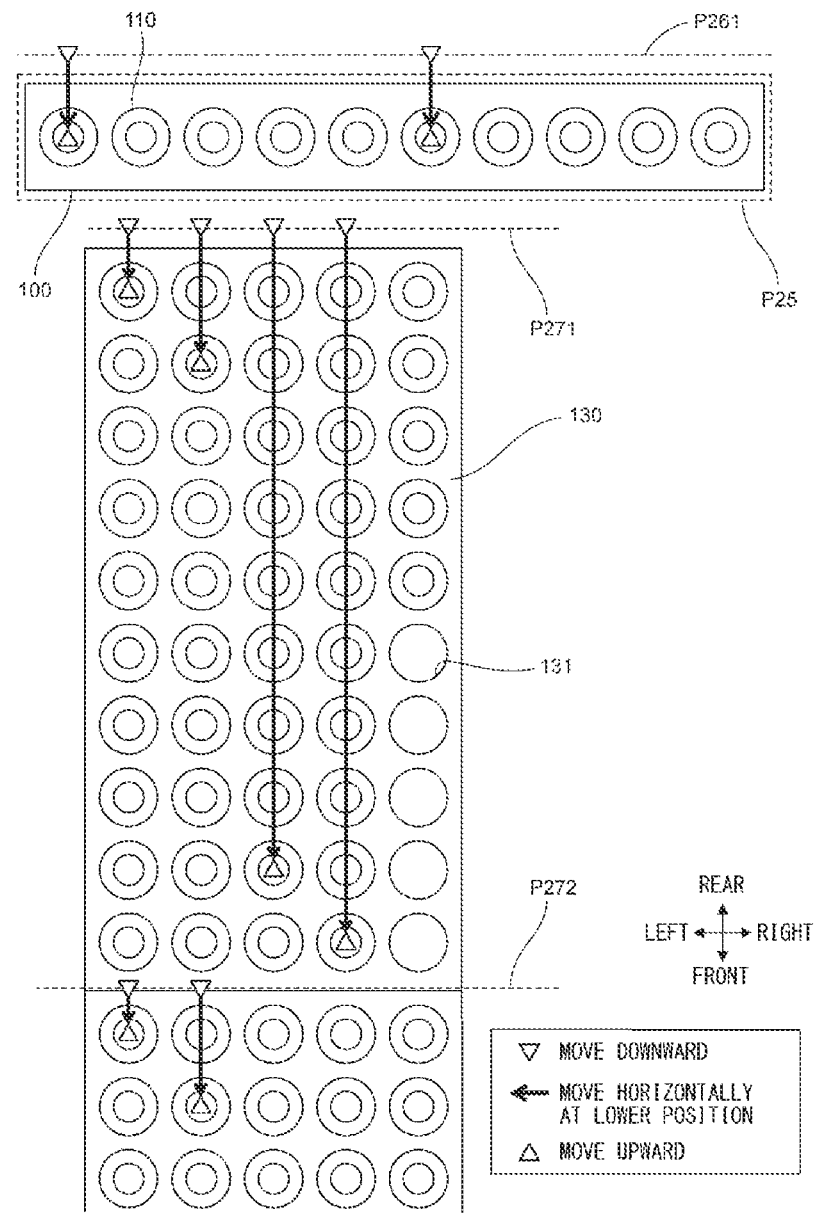
FIG. 34 schematically shows a transfer operation for a container that is performed between the rack at the ascending/descending position and an archive rack, in a specimen storage unit, according to the embodiment.

FIG. 34 schematically shows a transfer operation for a container 110 that is performed between the rack 100 at the ascending/descending position P25 and the archive rack 130, in the specimen storage unit 70.

In the taking-out operation for a container 110 held in the rack 100, the holding section 640 is moved downward at a position P261 at the rear of the rack 100. Thereafter, the holding section 640 is horizontally moved forward to the target container 110, and takes out the container 110 upward.

In the taking-out operation for a container 110 held in the rearmost archive rack 130, the holding section 640 is moved downward at a position P271 at the rear of the rearmost archive rack 130. In the taking-out operation for a container 110 held in another archive rack 130, the holding section 640 is moved downward at a position P272 between the other archive rack 130 and an archive rack 130 adjacent to the rear of the other archive rack 130. Thereafter the holding section 640 is horizontally moved forward to the target container 110, and takes out the container 110 upward.

Effects of Embodiment

Hereinafter, effects of the embodiment will be described using the buffer rack 120 as an example of a container holder, among the heating section 22, the washing liquid rack 24, the quality control specimen rack 25, the rack 100, the buffer rack 120, and the archive rack 130 (container holders). The container holders other than the buffer rack 120 also have the same effects.

As described with reference to FIG. 28, in step S11, the holding section 640 is moved downward to a position lower than the lid portion 113 (head portion) of the container 110, at a position where no container 110 is held in a plan view. In step S12, the holding section 640 in the opened state is horizontally moved toward the target container 110 on the buffer rack 120 (container holder). In step S13, the holding section 640 is closed with respect to the target container 110. In step S14, the holding section 640 in the closed state is moved upward.

According to the above control, when the target container 110 is taken out from the buffer rack 120, the holding section 640 is once moved downward to a position where no container 110 is present. Thus, the holding section 640 being moved downward is prevented from colliding with the target container 110 or another container 110. In addition, after having been moved downward, the holding section 640 in the opened state is moved toward the target container 110. Therefore, even if another container 110 is present in the movement path, the holding section 640 moves to the target container 110 while passing through the side surface of the other container 110, and smoothly reaches the target container 110. Thereafter, the holding section 640 is closed, whereby the target container 110 is held by the holding section 640. Furthermore, the holding section 640 in the closed state is moved upward, whereby the target container 110 is taken out from the buffer rack 120. Therefore, even when a plurality of containers 110 are disposed close to each other in the buffer rack 120, the target container 110 can be smoothly taken out.

Figure 35:
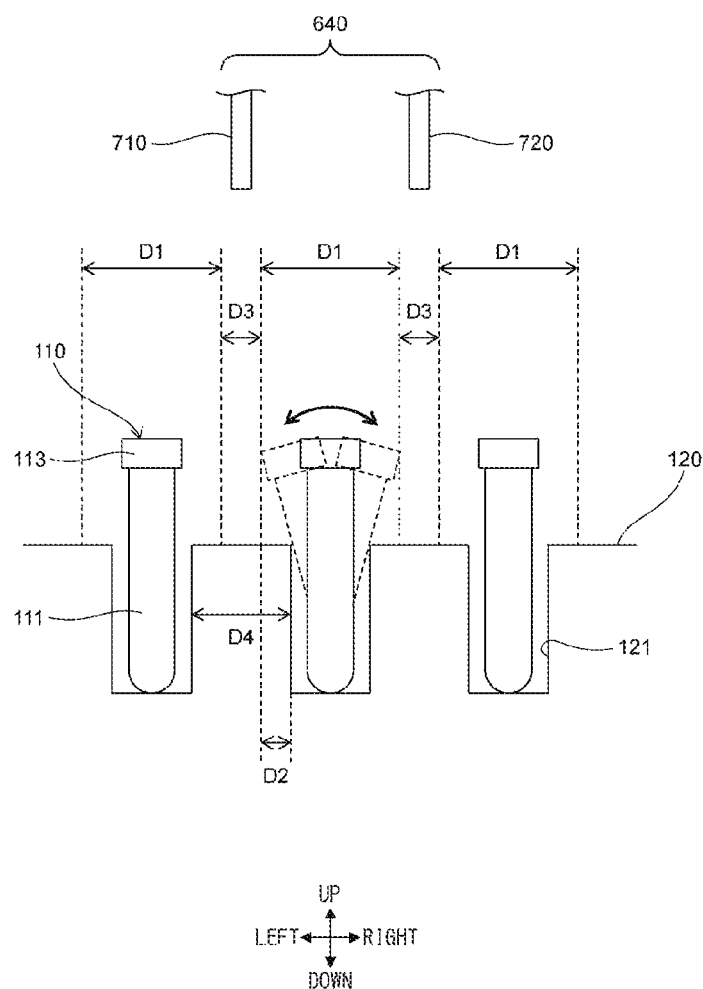
FIG. 35 is a schematic diagram illustrating the effects of the embodiment in more detail.

FIG. 35 is a schematic diagram illustrating the effects of the embodiment in more detail. FIG. 35 shows the buffer rack 120 in which containers 110 are held in holes 121, as viewed from the side of the buffer rack 120. In order to facilitate understanding, the dimensions shown in FIG. 35 are different from the actual dimensions.

As described above, different types of containers 110 have different dimensions, particularly, thicknesses. The holes 121 of the buffer rack 120 are formed to have a diameter larger than the diameter of a general container 110 so as to store different types of containers. Therefore, when a container 110 is stored in a hole 121, the container 110 sometimes does not stand straight but is tilted as shown by broken lines in FIG. 35. In FIG. 35, a width within which the lid portion 113 may be positioned due to tilting of the container 110 is D1. The width D1 is larger than the width of the hole 121 by D2×2.

As in the conventional art, when the holding section 640 in the opened state is moved downward from directly above a container 110, the distance between the holding members 710, 720 in the opened state need to be made larger than the width D1 to prevent the ends of the holding members 710, 720 from colliding with the lid portion 113 from above. Therefore, in the conventional art, a clearance D3 for insertion of the holding section 640 is needed between the width D1 around a certain container 110 and the width D1 around another container 110 adjacent to the certain container 110. Therefore, a distance D4 between adjacent holes 121 is necessarily increased, which imposes a limitation on miniaturization of the buffer rack 120.

An upper view in FIG. 36 is a side view illustrating the effects of the above embodiment. A lower view in FIG. 36 is a plan view illustrating the effects of the above embodiment. The side view in FIG. 36 shows the state of the position M12 in the taking-out operation shown in FIG. 20, as viewed from the front. The side view and the plan view in FIG. 36 each show a state where the end of the holding section 640 is moved downward to a position lower than the lid portion 113 of the container 110.

When the holding section 640 is horizontally moved forward from the state shown in the side view in FIG. 36, the front ends of the holding members 710, 720 come into contact with the lid portion 113, and when the holding section 640 is further moved forward, the holding members 710, 720 are inserted between the lid portions 113 of two adjacent containers 110. At this time, the containers 110 horizontally move as shown in the plan view in FIG. 36 or slightly rotate to form a clearance for the holding members 710, 720 to enter. Since the container 110 is generally cylindrical in shape and there is a clearance between the hole 121 and the container 110, the container 110 is easily moved in the hole 121 when a force is applied thereto in the horizontal direction. Therefore, in contrast to the case where the holding section 640 is moved downward from above the container 110 as in the conventional art, it is possible to position the holding section 640 between the adjacent containers 110 without collision of the holding section 640 with the containers 110.

When the holding section 640 is moved by the method of the embodiment, it is not necessary to provide the clearance D3 between the widths D1 of two adjacent containers 110 (see FIG. 35). Therefore, adjacent holes 121 can be disposed close to each other, thereby realizing miniaturization of the apparatus.

As shown in FIG. 29, in step S21, the holding section 640 holding the container 110 is moved downward to the holding position on the buffer rack 120 (container holder). In step S22, the holding section 640 is opened. In step S23, the holding section 640 in the opened state is horizontally moved toward a position where no container 110 is held. In step S24, the holding section 640 is moved upward.

According to the above control, after the container 110 is stored at the holding position, the holding section 640 in the opened state is horizontally moved toward the position having no container 110, and is moved upward from the position. Therefore, even if another container 110 is present in the horizontal movement path, the holding section 640 passes through the side surface of the other container 110 and moves the position having no container 110. Thereafter, the holding section 640 is moved upward at the position having no container 110. Therefore, it is possible to avoid a situation that the holding section 640 is caught on a container 110 and thus this container 110 unintentionally falls from the buffer rack 120.

The container 110 is held in the hole 121 formed on the buffer rack 120 (container holder). Therefore, the container 110 can be reliably held by the simple configuration.

As shown in FIGS. 22, 23, in the taking-out operation for the container 110, the holding section 640 is moved downward to a position between two adjacent holes 121 on the buffer rack 120 (container holder). According to this control, since there is no container between the two adjacent holes 121, the holding section 640 being moved downward is prevented from colliding with a container 110.

As shown in FIG. 23, of a position between two adjacent holes 121 having a first distance and a position between two adjacent holes 121 having a second distance, the holding section 640 is moved downward to the position (position P122) having the second distance larger than the first distance. According to this control, when the distance between adjacent holes 121 varies, the holding section 640 is moved downward to the position having the wider distance, thereby more reliably avoiding collision of the holding section 640 with the container 110.

As shown in FIG. 19, in the taking-out operation for the container 110, the holding section 640 is moved downward to the position P101 outside the buffer rack 120 (container holder) in a plan view. According to this control, since there is no container 110 outside the buffer rack 120 in a plan view, collision of the holding section 640 with a container 110 can be reliably avoided.

As described with reference to FIGS. 22, 23, in the storage operation for the container 110, after the container 110 is stored, the holding section 640 is horizontally moved to a position between two adjacent holes 121 on the buffer rack 120 (container holder), and thereafter, is moved upward. According to this control, since there is no container 110 between the two adjacent holes 121, when the holding section 640 is moved upward, the holding section 640 is prevented from being caught on a container 110.

As described with reference to FIG. 23, of the position between two adjacent holes 121 having the first distance and the position between two adjacent holes 121 having the second distance, the holding section 640 is moved downward to the position (position P122) having the second distance larger than the first distance. According to this control, when the distance between adjacent holes 121 varies, the holding section 640 is moved upward from the position having the wider distance, whereby the holding section 640 is more reliably prevented from being caught on a container 110.

As shown in FIG. 30, in the storage operation for the container 110, after the container 110 is stored, in step S101, the holding section 640 is moved to a position between adjacent holes 121. In step S102, the holding section 640 is moved upward by the distance d11 smaller than the depth d12 of the hole 121 to a position higher than the container 110. In step S103, the holding section 640 is horizontally moved by the predetermined distance. In step S104, the holding section 640 is moved upward.

When the holding section 640 is moved upward between the adjacent holes 121, the label 113a of the lid portion 113 of the container 110 may sometimes be caught by the holding section 640 and the container 110 may be lifted up, as shown by "position M23 in storage operation" in FIG. 26. According to the above control, when such a situation is anticipated, the holding section 640 releases the container 110 through the subsequent horizontal movement, and the container 110 is dropped into the hole 121. Therefore, the container 110 is inhibited from falling off from the hole 121 due to the upward movement of the holding section 640. Thereafter, the holding section 640 is further moved upward, whereby the subsequent horizontal movement of the holding section 640 can be smoothly performed.

As described with reference to FIG. 19, in the storage operation for the container 110, after the container 110 is stored, the holding section 640 is horizontally moved to the position outside the buffer rack 120 (container holder) in a plan view, and thereafter, is moved upward. According to this control, since there is no container 110 outside the buffer rack 120 in a plan view, the holding section 640 is reliably prevented from being caught on a container 110.

The speed at which the holding section 640 horizontally moves after having moved upward is higher than the speed at which the holding section 640 horizontally moves after having moved downward. In contrast to the case where the holding section 640 horizontally moves after having moved downward, when the holding section 640 horizontally moves after having moved upward, excessive collision of the holding section 640 with a container 110 is not anticipated, and therefore, the moving speed of the holding section 640 can be increased. This enables speedy transfer of the container 110.

The holding section 640 includes two holding members 710, 720 that are disposed opposing each other and are able to move close to and away from each other. In this configuration, the holding members 710, 720 can stably hold the container 110, and the holding section can be realized with the simple configuration.

As shown in FIG. 14, when holding the container 110, the holding section 640 holds the container 110 at three positions. In this configuration, since the holding section 640 can stably hold the container 110, the holding section 640 is prevented from dropping the container 110 while moving.

As shown in FIG. 14, in a plan view, a portion (position P31), of one holding member 710, contacting the container 110 is positioned on a straight line that perpendicularly bisects a straight line connecting two portions (positions P32), of the other holding member 720, contacting the container 110. The three portions provided as described above can stably hold the container 110 to be stably held.

As shown in FIG. 12, on the inner surface of the one holding member 710, two projections 724 are formed so as to be arranged in the direction (front-rear direction) perpendicular to the holding direction (left-right direction) of the holding section 640. The two projections 724 can support the container 110 at two positions from the other holding member 720 side.

As shown in FIG. 13, the flat portion 714 is formed at the inner surface of the one holding member 710. The single flat portion 714 can support the container 110 at one position from the one holding member 710 side.

As shown in FIG. 13, the step 716 extending outward is formed at the upper end of the flat portion 714. In this configuration, even when the container 110 is configured to have the outer diameter that is gradually reduced downward, the container 110 is supported at three points, that is, at a boundary region between the flat portion 714 and the step 716, and the two positions on the other holding member 720 side. Thus, the container 110 can be stably held.

As shown in FIG. 15, in a side view, the step 716 is positioned between the upper ends (positions P32a) and the lower ends (positions P32b) of the two projections 724 formed on the other holding member 720. In this configuration, the container 110 can be inhibited from rotating around the direction parallel to the horizontal direction.

As shown in FIGS. 12, 15, the cutouts 713, 717 are formed by cutting off the corners of the end portion of the one holding member 710, and the cutouts 723, 726, 727 are formed by cutting off the corners of the end portion of the other holding member 720. In this configuration, when the holding section 640 is moved downward, excessive collision of the holding members 710, 720 with a container 110 is avoided.

As shown in FIG. 15, the two holding members 710, 720 each have the opening 712, 722 penetrating therethrough in the holding direction (left-right direction), at a position higher than the portion that holds the container 110. In this configuration, since the lid portion 113 disposed on the container 110 partially enters the two openings 712, 722 from the inner sides, the distance between the outer side of the thin plate portion 711 and the outer side of the thin plate portion 721 can be reduced. That is, the outer shape of the container holding portion of the holding section 640 can be reduced. Therefore, when the holding section 640, having been moved downward, is horizontally moved, the holding section 640 can be smoothly horizontally moved between containers 110.

OTHER MODIFICATIONS

In the embodiment, the holding direction of the holding section 640 is the left-right direction, and the holding section 640 is moved in the front-rear direction at the lower position during the taking-out operation for the container 110. However, the configuration is not limited thereto. The holding direction of the holding section 640 and the direction in which the holding section 640 is moved at the lower position may be tilted with respect to the front-rear and left-right directions.

Figure 37:
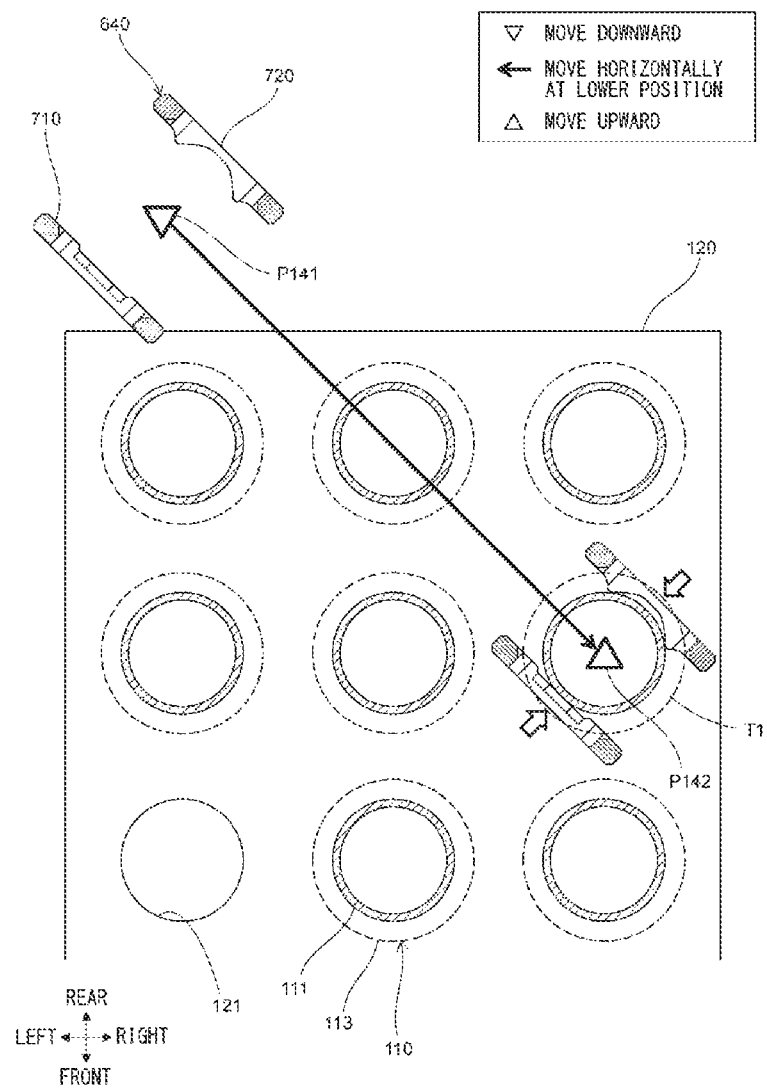
FIG. 37 is a plan view schematically showing an operation of the holding section in a case where a holding direction of the holding section and a direction in which the holding section is moved at a lower position are tilted with respect to front-rear and left-right directions, according to a modification.

FIG. 37 is a plan view schematically showing the operation of the holding section 640 in this case.

In FIG. 37, the holding direction of the holding section 640 and the direction in which the holding section 640 is moved at the lower position, are parallel to the horizontal plane and are tilted at 45° with respect to the front-rear direction and the left-right direction. In addition, an angle formed between the holding direction of the holding section 640 and the direction in which the holding section 640 is moved at the lower position is 90°. In the example shown in FIG. 37, the holding section 640 is moved downward at a position P141 outside the buffer rack 120, and is moved in the diagonal direction to a position P142 of the container T1. Thereafter, the holding section 640 is closed at the position P142 and is moved upward, whereby the container T1 is taken out.

Also, in this case, in the taking-out operation for the container T1, the holding section 640 in the opened state is moved toward the container T1 after having been moved downward, and therefore, the holding section 640 smoothly reaches the container T1. Meanwhile, when the container T1 is stored, an operation reverse to the taking-out operation is performed. Thus, taking-out and storage of the target container 110 can be smoothly performed as in the above embodiment.

In the embodiment, as shown in FIG. 14, when holding the container 110, the holding section 640 holds the container 110 at three positions. However, the holding section 640 may hold the container 110 at four or more positions.

Figure 38:
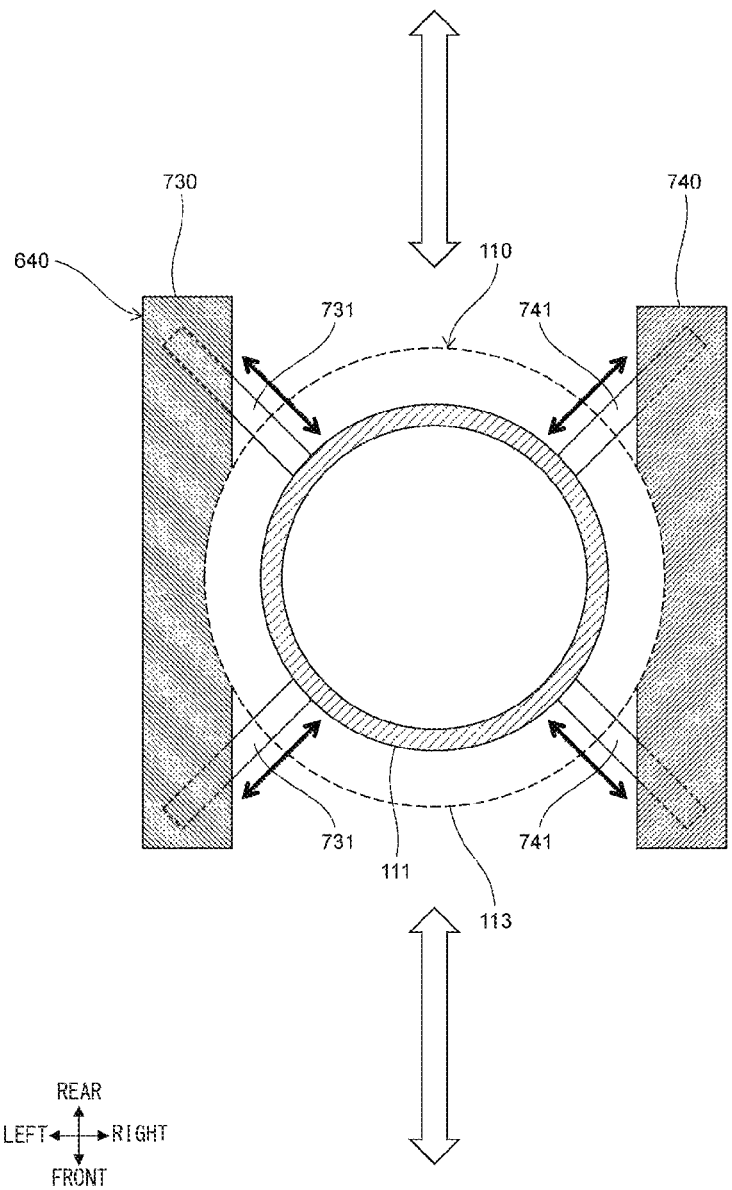
FIG. 38 is a plan view schematically showing a configuration of a holding section that holds a container at four positions, according to a modification.

FIG. 38 is a plan view schematically showing a configuration of a holding section 640 that holds a container 110 at four positions.

The holding section 640 shown in FIG. 38 includes a pair of support members 730, 740 disposed side by side in the left-right direction. The support member 730 includes a pair of holding members 731 that are movable inward and outward with respect to the support member 730, and the support member 740 includes a pair of holding members 741 that are movable inward and outward with respect to the support member 740. The holding members 731, 741 are bar-shaped members. The directions in which the holding members 731, 741 move are tilted by 45° with respect to the front-rear and left-right directions as shown by thick arrows in FIG. 38. When the holding section 640 holds the container 110, the holding members 731, 741 are moved inward. Thus, the ends of the holding members 731, 741 come into contact with the trunk portion 111 of the container 110, whereby the container 110 is held at four positions by the holding members 731, 741.

Also, in this case, the transfer operation for the container 110 is performed in a similar manner to that described with reference to FIGS. 28 to 30. The movement direction of the holding section 640 at the lower position is the front-rear direction as in the embodiment. Thus, as in the embodiment, taking-out and storage of the target container 110 can be smoothly performed.

In the embodiment, as shown in FIG. 13, the flat portion 714 is formed in the holding member 710. However, instead of the flat portion 714, a projection that projects inward may be formed. Even in this case, the holding section 640 can stably hold the container 110 at three positions.

In the embodiment, each of the cutouts 713, 717, 724, and 726 is formed in a flat shape as shown in FIGS. 12, 13, and 15. However, each cutout may be formed in a curved surface shape.

In the embodiment, the supply unit 20, the specimen rearrangement unit 40, and the specimen storage unit 70 are provided with the container transfer mechanisms 26, 45, and 74, and the container transfer mechanisms 26, 45, and 74 are controlled as described in FIGS. 28 to 30, respectively. However, the configuration is not limited thereto. A container transfer mechanism disposed in an apparatus for transferring containers that contain various types of liquids, may be configured similarly to the above container transfer mechanism and controlled as described above.

Various modifications can be made as appropriate to the embodiments of the present invention, without departing from the scope of the technological idea defined by the claims.

What is claimed is:

1. A container transfer method for transferring a container from a container holder capable of holding a plurality of containers, by using a holding section capable of performing an opening/closing operation, vertical movement, and horizontal movement, the method comprising:
   moving the holding section downward to a position lower than a head portion of the container, at a position where the container is not held in a plan view;
   horizontally moving the holding section in an opened state, toward a target container on the container holder;
   after the horizontal movement of the holding section to the target container, closing the holding section with respect to the target container; and
   moving upward the holding section in a closed state.

2. The container transfer method according to claim 1, further comprising:
   moving downward the holding section that holds the container, toward a holding position on the container holder;
   opening the holding section;
   horizontally moving the holding section in an opened state, toward a position where the container is not held; and
   moving the holding section upward.

3. The container transfer method according to claim 1, wherein the container is held in a hole formed on the container holder.

4. The container transfer method according to claim 3, wherein in a taking-out operation for the container, the holding section is moved downward to a position between two adjacent holes on the container holder.

5. The container transfer method according to claim 4, wherein out of a position between two adjacent holes having a first distance and a position between two adjacent holes having a second distance, the holding section is moved downward to the position having the second distance wider than the first distance.

6. The container transfer method according to claim 3, wherein in a taking-out operation for the container, the holding section is moved downward to a position outside the container holder in a plan view.

7. The container transfer method according to claim 3, wherein in a storage operation for the container, after the container is stored, the holding section is horizontally moved to a position between two adjacent holes on the container holder, and thereafter, is moved upward.

8. The container transfer method according to claim 7, wherein out of a position between two adjacent holes having a first distance and a position between two adjacent holes having a second distance, the holding section is moved upward from the position having the second distance wider than the first distance.

9. The container transfer method according to claim 7, wherein in the storage operation for the container, after the container is stored, the holding section is moved to the position between the adjacent holes, is moved upward by a distance smaller than a depth of the holes to a position higher than the container, is horizontally moved by a predetermined distance, and is further moved upward.

10. The container transfer method according to claim 3, wherein in a storage operation for the container, after the container is stored, the holding section is horizontally moved to outside the container holder in a plan view, and thereafter is moved upward.

11. The container transfer method according to claim 1, wherein a speed at which the holding section having been moved upward is horizontally moved, is higher than a speed at which the holding section having been moved downward is horizontally moved.

12. A container transfer method for transferring a container to a holding position on a container holder capable of holding a plurality of containers, by using a holding section capable of performing an opening/closing operation, vertical movement, and horizontal movement, the method comprising:
moving downward the holding section that holds a target container, toward the holding position on the container holder at which the target container is to be stored;
opening the holding section;
horizontally moving the holding section in an opened state toward a position where the container is not held; and
moving the holding section upward.

13. A container transfer apparatus configured to transfer a container from a container holder capable of holding a plurality of containers, the apparatus comprising:
a holding section that is openable and closable;
a movement mechanism configured to vertically and horizontally move the holding section; and
a controller configured to control operations of the holding section and the movement mechanism, wherein
the controller controls the holding section and the movement mechanism to
move the holding section downward to a position in which the container is not held in a plan view and which is lower than a head portion of the container,
horizontally move the holding section in an opened state toward a target container on the container holder,
close the holding section with respect to the target container after the horizontal movement of the holding section to the target container, and
move upward the holding section in a closed state.

14. The container transfer apparatus according to claim 13, wherein
the controller further controls the holding section and the movement mechanism to
move downward the holding section that holds the container, toward a holding position on the container holder,
open the holding section,
horizontally move the holding section in an opened state, toward a position where the container is not held, and
move the holding section upward.

15. The container transfer apparatus according to claim 13, wherein the holding section comprises two holding members that are disposed opposing each other and are able to move close to and away from each other.

16. The container transfer apparatus according to claim 15, wherein when holding the container, the holding section holds the container at three positions.

17. The container transfer apparatus according to claim 16, wherein the holding section holds the container such that one of the holding members is in contact with the container at one position while the other holding member is in contact with the container at two positions.

18. The container transfer apparatus according to claim 17, wherein a portion, of the one holding member, contacting the container is positioned on a straight line that perpendicularly bisects a straight line connecting two portions, of the other holding member, contacting the container.

19. The container transfer apparatus according to claim 17, wherein on an inner surface of the other holding member, two projections are formed so as to be arranged in a direction perpendicular to a holding direction of the holding section.

20. The container transfer apparatus according to claim 17, wherein a flat portion is formed on an inner surface of the one holding member.

21. The container transfer apparatus according to claim 20, wherein a step extending outward is formed at an upper end of the flat portion.

22. The container transfer apparatus according to claim 21, wherein in a side view, the step is positioned between upper ends and lower ends of the two projections formed on the other holding member.

23. The container transfer apparatus according to claim 15, wherein end portions of the two holding members have cutouts that are formed by cutting off corners of the end portions.

24. The container transfer apparatus according to claim 15, wherein each of the two holding members has an opening penetrating therethrough, at a position higher than a portion that holds the container.

\* \* \* \* \*